(12) United States Patent
Canich et al.

(10) Patent No.: US 11,766,669 B2
(45) Date of Patent: Sep. 26, 2023

(54) HEXAHYDROCYCLOPENTA[E]-AS-INDACEN-1-YL AND OCTAHYDROBENZO[E]-AS-INDACEN-1-YL BASED CATALYST COMPLEXES AND PROCESS FOR USE THEREOF

(71) Applicant: ExxonMobil Chemical Patents Inc., Baytown, TX (US)

(72) Inventors: Jo Ann M. Canich, Houston, TX (US); Vyatcheslav V. Izmer, Moscow (RU); Dmitry S. Kononovich, Moscow (RU); Alexander Z. Voskoboynikov, Moscow (RU)

(73) Assignee: ExxonMobil Chemical Patents Inc., Baytown, TX (US)

( * ) Notice: Subject to any disclaimer, the term of this patent is extended or adjusted under 35 U.S.C. 154(b) by 175 days.

(21) Appl. No.: 17/355,866

(22) Filed: Jun. 23, 2021

(65) Prior Publication Data

US 2021/0402384 A1 Dec. 30, 2021

Related U.S. Application Data

(60) Provisional application No. 63/044,726, filed on Jun. 26, 2020.

(51) Int. Cl.
| | | |
|---|---|---|
| *C07F 17/00* | (2006.01) | |
| *C08F 4/6592* | (2006.01) | |
| *C08F 10/00* | (2006.01) | |
| *B01J 31/22* | (2006.01) | |

(52) U.S. Cl.
CPC ........... *B01J 31/2295* (2013.01); *C07F 17/00* (2013.01); *C08F 4/6592* (2013.01); *C08F 4/65927* (2013.01); *B01J 2231/12* (2013.01); *B01J 2531/46* (2013.01); *B01J 2531/48* (2013.01); *B01J 2531/49* (2013.01); *C08F 10/00* (2013.01)

(58) Field of Classification Search
CPC .... C07F 17/00; C08F 4/6592; C08F 4/65927; C08F 10/00
See application file for complete search history.

(56) References Cited

U.S. PATENT DOCUMENTS

| | | | |
|---|---|---|---|
| 6,175,409 B1 | 1/2001 | Nielsen et al. | 356/337 |
| 6,260,407 B1 | 7/2001 | Petro et al. | 73/61.62 |
| 6,294,388 B1 | 9/2001 | Petro | 436/8 |
| 6,406,632 B1 | 6/2002 | Safir et al. | 210/656 |
| 6,436,292 B1 | 8/2002 | Petro | 210/656 |
| 6,454,947 B1 | 9/2002 | Safir et al. | 210/656 |
| 6,461,515 B1 | 10/2002 | Safir et al. | 210/656 |
| 6,475,391 B2 | 11/2002 | Safir et al. | 210/656 |
| 6,491,816 B2 | 12/2002 | Petro | 210/198.2 |
| 6,491,823 B1 | 12/2002 | Safir et al. | 210/656 |
| 9,266,910 B2 | 2/2016 | McCullough | C07F 7/00 |
| 9,458,254 B2 | 10/2016 | Canich et al. | C07F 17/00 |
| 9,796,795 B2 | 10/2017 | Canich et al. | C07F 17/00 |
| 9,803,037 B1 | 10/2017 | Canich et al. | C08F 10/00 |
| 10,280,240 B2 | 5/2019 | Hagadorn et al. | C07F 17/00 |
| 2018/0094088 A1 | 4/2018 | Crowther et al. | C08F 210/02 |
| 2019/0119418 A1 | 4/2019 | Yang et al. | C08F 210/14 |
| 2019/0161560 A1 | 5/2019 | Yang et al. | C08F 4/65927 |
| 2019/0263953 A1 | 8/2019 | Li et al. | C08F 210/16 |
| 2019/0284311 A1 | 9/2019 | Canich et al. | C08F 4/6592 |

FOREIGN PATENT DOCUMENTS

| | | | | |
|---|---|---|---|---|
| KR | 10-1846412 | | 5/2018 | ............ C08F 4/6592 |
| WO | WO 2017/192226 | | 11/2017 | ................ C08F 4/76 |

OTHER PUBLICATIONS

U.S. Appl. No. 63/044,748, filed Jun. 26, 2020, Lin, T. et al.
U.S. Appl. No. 63/044,757, filed Jun. 26, 2020, Lin, T. et al.
Busico et.al. (1994) "Effects of Regiochemical and Stereochemical Errors on the Course of Isotactic Propene Polyinsertion Promoted by Homogeneous Ziegler-Natta Catalysts," *Macromolecules*, v.27, pp. 7538-7543.
Grassi, A. et.al. (1988) "Microstructure of Isotactic Polypropylene Prepared with Homogeneous Catalysis: Stereoregularity, Regioregularity, and 1,3-Insertion," *Macromolecules*, v.21, pp. 617-622.
Izmer, V. et al. (2006) "Palladium-Catalyzed Pathways to Aryl-Substituted Indenes: Efficient Synthesis of Ligands and the Respective ansa-Zirconocenes," *Organometallics* 2006, v.25(5), pp. 1217-1229.
Manxzer, L. E. et al. (1982) "31. Tetragtdrfuran Complexes of Selected Early Transition Metals," *Inorg. Synth.*, v.21, pp. 135-140.
West, R. (1954) "Cyclic Organosilicon Compounds. I. Preparation of Cyclic Silanes," *J. Am. Chem. Soc.* 1954, v.76(23) pp. 6012-6014.

*Primary Examiner* — Caixia Lu

(57) ABSTRACT

This invention relates to hexahydrocyclopenta[e]-as-indacen-1-yl and octahydrobenzo[e]-as-indacen-1-yl based catalyst complexes represented by the formula:

$$T_yLAMX_{n-2}$$

wherein: M is a group 3-6 metal; n is the oxidation state of M; A is a substituted or unsubstituted polycyclic arenyl ligand bonded to M wherein the polycyclic ligand contains an indenyl fragment with two partially unsaturated rings annulated to the phenyl ring of the indenyl ligand fragment; L is a substituted or unsubstituted monocyclic or polycyclic arenyl ligand bonded to M, or a substituted or unsubstituted monocyclic or polycyclic heteroarenyl ligand bonded to M, or is represented by the formula $JR'_{z-y}$, where J is a group 15 or 16 heteroatom bonded to M, R' is a substituted or unsubstituted hydrocarbyl substituent bonded to J, and z is 1 or 2; T is a bridging group; y is 1 or 0; and each X is independently a univalent anionic ligand, or two Xs are joined and bound to the metal atom to form a metallocycle ring, or two Xs are joined to form a chelating ligand, a diene ligand, or an alkylidene ligand.

26 Claims, No Drawings

HEXAHYDROCYCLOPENTA[E]-AS-INDACEN-1-YL AND OCTAHYDROBENZO[E]-AS-INDACEN-1-YL BASED CATALYST COMPLEXES AND PROCESS FOR USE THEREOF

CROSS-REFERENCE TO RELATED APPLICATIONS

This application claims the benefit of and priority to U.S. Provisional Application No. 63/044,726 filed Jun. 26, 2020, the disclosure of which is incorporated herein by reference.

This invention is related to concurrently filed U.S. Ser. No. 63/044,748, entitled "Copolymers Composed of Ethylene, μ-olefin, Non-conjugated Diene, and Substituted Styrene and Articles Therefrom" and U.S. Ser. No. 63/044,757, entitled "Copolymers of Ethylene, α-olefin, Non-conjugated Diene, and Aryl-Substituted Cycloalkene, Methods to Produce, Blends, and Articles Therefrom".

FIELD OF THE INVENTION

This invention relates to novel catalyst compounds comprising hexahydrocyclopenta[e]-as-indacen-1-yl and octahydrobenzo[e]-as-indacen-1-yl type ligands, catalyst systems comprising such, and uses thereof.

BACKGROUND OF THE INVENTION

Olefin polymerization catalysts are of great use in industry. Hence there is interest in finding new catalyst systems that increase the commercial usefulness of the catalyst and allow the production of polymers having improved properties.

U.S. Pat. No. 9,796,795 discloses catalyst compounds comprising substituted tetrahydro-s-indacenyl transition metal complexes where the tetrahydro-s-indacene is substituted in the 5, 6, or 7 position and is substituted in the 2 and/or 3 position.

WO 2018/106028 discloses catalyst compounds comprising 6,7,8,9-tetrahydrocyclopenta[a]naphthalenyl or 5,6,7,8-tetrahydrocyclopenta[b]naphthalenyls ligands bridged to a substituted amido ligand.

US 2016/0244535 discloses transition metal catalyst compounds comprising a tetrahydroindacenyl group which may be substituted or unsubstituted and a heteroatom containing ligand.

U.S. Pat. No. 9,803,037 discloses transition metal catalyst compounds comprising a tetrahydro-as-indacenyl group which may be substituted or unsubstituted and a heteroatom containing ligand.

Other references of interest include: U.S. Pat. Nos. 9,803,037; 9,796,795; 9,266,910; US 2018-0094088; U.S. Ser. No. 10/280,240; US 2019-0161560; US 2019-0263953; US 2019-0119418; U.S. Pat. No. 9,458,254; and US 2019-0284311.

There is still a need in the art for new and improved catalyst systems for the polymerization of olefins that can achieve desired polymer properties, such as high polymer molecular weight and high comonomer incorporation, or high molecular weight homopolymer with high crystallinity.

It is therefore an object of the present invention to provide novel catalyst compounds, catalysts systems comprising such compounds, and processes for the polymerization of olefins using such compounds and systems.

SUMMARY OF THE INVENTION

This invention relates to a polycyclic metallocene transition metal compound represented by the Formula (1):

$$T_y LAMX_{n-2} \tag{1}$$

wherein:

M is a group 3-6 metal, preferably M is a group 4 metal, and n is the oxidation state of M (preferably 2, 3, 4, 5 or 6);

A is a substituted or unsubstituted polycyclic arenyl ligand bonded to M wherein the polycyclic ligand contains an indenyl fragment with two partially unsaturated rings annulated to the phenyl ring of the indenyl ligand fragment;

L is a substituted or unsubstituted monocyclic or polycyclic arenyl ligand bonded to M, or a substituted or unsubstituted monocyclic or polycyclic heteroarenyl ligand bonded to M, or is represented by the formula $JR'_{z-y}$ where J is a group 15 or 16 heteroatom bonded to M, R' is a substituted or unsubstituted hydrocarbyl substituent bonded to J, and z is 2 when J is a group 15 heteroatom and z is 1 when J is a group 16 heteroatom;

T is a bridging group; y is 1 or 0 indicating the presence of absence of T;

each X is independently a univalent anionic ligand, or two Xs are joined and bound to the metal atom to form a metallocycle ring, or two Xs are joined to form a chelating ligand, a diene ligand, or an alkylidene ligand.

This invention relates to a method to polymerize olefins comprising contacting the above catalyst compound with an activator and one or more monomer. This invention further relates to polymer compositions produced by the methods described herein.

DETAILED DESCRIPTION

For the purposes of this invention and the claims thereto, the new numbering scheme for the Periodic Table Groups is used as described in *Chemical And Engineering News*, v. 63(5), pg. 27 (1985). Therefore, a "group 4 metal" is an element from group 4 of the Periodic Table, e.g. Hf, Ti, or Zr.

Catalyst activity" is a measure of how active the catalyst is and is reported as the mass (g) of product polymer (P) produced per mmole of catalyst (cat) used per unit of time (hr), (g P/mmol cat·hr).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

The term "alpha-olefin" or "α-olefin" refers to an olefin having a terminal carbon-to-carbon double bond in the structure thereof ((R$^1$R$^2$)—C=CH$_2$, where R$^1$ and R$^2$ can be independently hydrogen or any hydrocarbyl group; preferably R$^1$ is hydrogen and R$^2$ is an alkyl group). A "linear alpha-olefin" is an alpha-olefin defined in this paragraph wherein R$^1$ is hydrogen, and R$^2$ is hydrogen or a linear alkyl group. For the purposes of this invention, ethylene shall be considered an α-olefin.

As used herein, and unless otherwise specified, the term "Cn" means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cm-Cy" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthalenyl, and the like.

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, —CF$_3$ and the like, where q is 1 to 10, or a heteroatom-containing group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$—, —Si(R*)$_2$—, and the like, and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted aromatic," means an aromatic group having 1 or more hydrogen groups replaced by a hydrocarbyl, substituted hydrocarbyl, heteroatom or heteroatom containing group.

The term "hydrocarbyl substituted phenyl" means a phenyl group having 1, 2, 3, 4 or 5 hydrogen groups replaced by a hydrocarbyl or substituted hydrocarbyl group. Preferably the "hydrocarbyl substituted phenyl" group is represented by the formula:

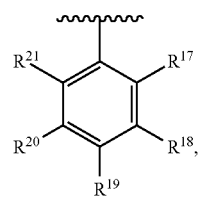

where each of R$^{17}$, R$^{18}$, R$^{19}$, R$^{20}$, and R$^{21}$ is independently selected from hydrogen, $C_1$-$C_{40}$ hydrocarbyl or $C_1$-$C_{40}$ substituted hydrocarbyl, a heteroatom or a heteroatom-containing group (provided that at least one of R$^{17}$, R$^{18}$, R$^{19}$, R$^{20}$, and R$^{21}$ is not H), or two or more of R$^{17}$, R$^{18}$, R$^{19}$, R$^{20}$, and R$^{21}$ are joined together to form a $C_4$-$C_{62}$ cyclic or polycyclic ring structure, or a combination thereof.

The term "substituted phenyl," mean a phenyl group having 1 or more hydrogen groups replaced by a hydrocarbyl, substituted hydrocarbyl, heteroatom or heteroatom containing group.

Silylcarbyl radicals are radicals in which one or more hydrocarbyl hydrogen atoms have been substituted with at least one SiR*$_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Silylcarbyl radicals can be bonded via a carbon or silicon atom.

Substituted silylcarbyl radicals are radicals in which at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR*$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$—, and the like, where R* is independently a hydrocarbyl or halocarbyl radical, and two or more R* may join together to form a substituted or unsubstituted saturated, partially unsaturated or aromatic cyclic or polycyclic ring structure. Substituted silylcarbyl radicals are only bonded via a carbon or silicon atom.

Germylcarbyl radicals are radicals in which one or more hydrocarbyl hydrogen atoms have been substituted with at least one GeR*$_3$ containing group or where at least one —Ge(R*)$_2$— has been inserted within the hydrocarbyl radical where R* independently a hydrocarbyl or halocarbyl radical, and two or more R* may join together to form a substituted or unsubstituted saturated, partially unsaturated or aromatic cyclic or polycyclic ring structure. Germylcarbyl radicals can be bonded via a carbon or germanium atom.

Substituted germylcarbyl radicals are radicals in which at least one hydrogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $SnR^*3$, $PbR^*_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$—, and the like, where R* is independently a hydrocarbyl or halocarbyl radical, and two or more R* may join together to form a substituted or unsubstituted saturated, partially unsaturated or aromatic cyclic or polycyclic ring structure. Substituted germylcarbyl radicals are only bonded via a carbon or germanium atom.

Halocarbyl radicals are radicals in which one or more hydrocarbyl hydrogen atoms have been substituted with at least one halogen (e.g., F, Cl, Br, I) or halogen-containing group (e.g., $CF_3$).

Substituted halocarbyl radicals are radicals in which at least one halocarbyl hydrogen or halogen atom has been substituted with at least one functional group such as $NR^*_2$, $OR^*$, $SeR^*$, $TeR^*$, $PR^*_2$, $AsR^*_2$, $SbR^*_2$, $SR^*$, $BR^*_2$, and the like, or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure. Substituted halocarbyl radicals are only bonded via a carbon atom.

The terms "alkoxy" or "alkoxide" and aryloxy or aryloxide mean an alkyl or aryl group bound to an oxygen atom, such as an alkyl ether or aryl ether group/radical connected to an oxygen atom and can include those where the alkyl group is a $C_1$ to $C_{10}$ hydrocarbyl. The alkyl group may be straight chain, branched, or cyclic. The alkyl group may be saturated or unsaturated. Examples of suitable alkoxy and aryloxy radicals can include methoxy, ethoxy, n-propoxy, iso-propoxy, n-butoxy, iso-butoxy, sec-butoxy, tert-butoxy, phenoxyl, and the like.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as $—NR^*_2$, $—OR^*$, $—SeR^*$, $—TeR^*$, $—PR^*_2$, $—AsR^*_2$, $—SbR^*_2$, $—SR^*$, $—BR^*_2$, $—SiR^*_3$, $—GeR^*_3$, $—SnR^*_3$, $—PbR^*_3$, $—(CH_2)q-SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring (typically made of 6 carbon atoms) and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic. The term "substituted aryl" means: 1) an aryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group. The term "substituted heteroaryl" means: 1) a heteroaryl group where a hydrogen has been replaced by a substituted or unsubstituted hydrocarbyl group, a substituted or unsubstituted halocarbyl group, a substituted or unsubstituted silylcarbyl group, or a substituted or unsubstituted germylcarbyl group.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tertbutyl).

The following numbering schemes are used herein for catalyst complexes containing cyclopentadienyl, indenyl, fluorenyl, and cyclopentanaphthalenyl (also termed benzindenyl) ligands. It should be noted that indenyl can be considered a cyclopentadienyl fused with a benzene ring. Analogously, fluorenyl can be considered a cyclopentadienyl with two phenyl rings fused onto the cyclopentadienyl ring. Each structure below is drawn and named as an anion.

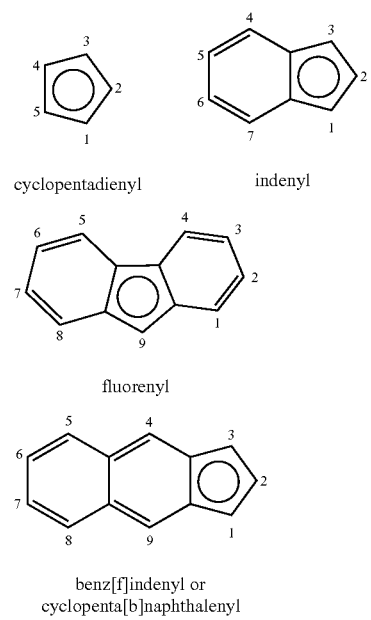

cyclopentadienyl    indenyl fluorenyl benz[f]indenyl or
cyclopenta[b]naphthalenyl

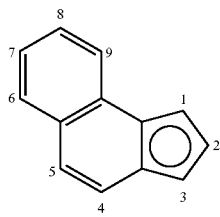

benz[e]indenyl or
cyclopenta[a]naphthalenyl

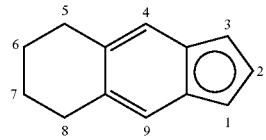

3a,5,6,7,8,9a-hexahydro-1H-benz[f]indenyl or
5,6,7,8-tetrahydro-1H-cyclopenta[b]naphthalenyl

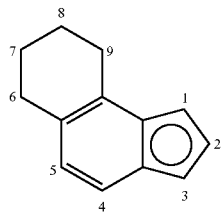

3a,6,7,8,9,9b-hexahydro-1H-benz[e]indenyl or
(6,7,8,9-tetrahydro-1H-cyclopenta[a]naphthalenyl)

For catalyst complex nomenclature purposes, the following numbering schemes are used for tetrahydro-s-indacenyl and tetrahydro-as-indacenyl ligands.

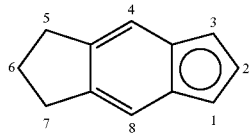 

1,5,6,7-tetrahydro-s-indacenyl    1,6,7,8-tetrahydro-as-indacenyl

For catalyst complex nomenclature purposes, the following numbering schemes are used for hexahydro-cyclopenta[e]-as-indacenyl, octahydrobenzo[e]-as-indacenyl and octahydro-cyclopenta[l]phenanthrenyl ligands.

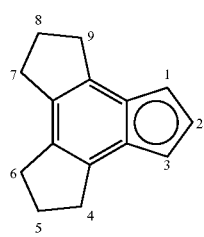

4,5,6,7,8,9-hexahydro-cyclopenta[e]-as-indacenyl

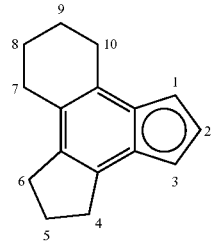

1,4,5,6,7,8,9,10-octahydrobenzo[e]-as-indacenyl

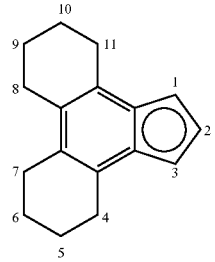

4,5,6,7,8,9,10,11-octahydro-cyclopenta[l]phenanthrenyl

The term "arenyl" ligand is used herein to mean a substituted or unsubstituted unsaturated cyclic hydrocarbyl ligand that can consist of one ring, or two or more fused or catenated rings. Cyclopentadienyl ligands, indenyl ligands, and fluorenyl ligands are all examples of arenyl ligands. The term "heteroarenyl" ligand is used herein to mean a heteroatom substituted arenyl ligand wherein one or more heteroatom(s) are part of the ring structure. Common heteroatoms include B, N, O, Si, P, and S.

The term "monocyclic heteroarenyl ligand" is used herein to mean a substituted or unsubstituted monoanionic $C_5$ to $C_{100}$ hydrocarbyl ligand that contains an aromatic five-membered single hydrocarbyl ring (also referred to as a cyclopentadienyl ring) wherein one or more heteroatom(s) are part of the ring structure.

The term "polycyclic heteroarenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl ring structures which may be fused to additional saturated, partially unsaturated, or aromatic hydrocarbyl rings wherein one or more heteroatom(s) are part of the ring structure.

In using the terms "substituted or unsubstituted monocyclic heteroarenyl ligand," or "substituted or unsubstituted polycyclic heteroarenyl ligand," the substitution to the aforementioned ligand is on a bondable ring position, and each occurrence is selected from hydrocarbyl, substituted hydrocarbyl, halocarbyl, substituted halocarbyl, silylcarbyl, substituted silylcarbyl, germylcarbyl, substituted germylcarbyl, a halogen radical, or a polar group.

The term "monocyclic arenyl ligand" is used herein to mean a substituted or unsubstituted monoanionic $C_5$ to $C_{100}$ hydrocarbyl ligand that contains an aromatic five-membered single hydrocarbyl ring (also referred to as a cyclopentadienyl ring).

The term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl ring structures which may be fused to additional saturated, partially unsaturated, or aromatic hydrocarbyl rings.

Non-limiting examples of polycyclic arenyl ligands, are those listed in U.S. Pat. No. 7,446,216 at column 12, line 61 to column 14, line 31.

Partially hydrogenated polycyclic arenyl ligands retain the numbering scheme of the parent polycyclic arenyl ligand, namely the numbering schemes defined for indenyl, fluorenyl, cyclopenta[b]naphthalenyl, and cyclopenta[a]naphthalenyl ligands.

A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom).

In using the terms "substituted or unsubstituted monocyclic arenyl ligand," or "substituted or unsubstituted polycyclic arenyl ligand," the substitution to the aforementioned ligand is on a bondable ring position, and each occurrence is selected from hydrocarbyl, substituted hydrocarbyl, halocarbyl, substituted halocarbyl, silylcarbyl, substituted silylcarbyl, germylcarbyl, substituted germylcarbyl, a halogen radical, or a polar group.

A "hexahydro-cyclopenta[e]-as-indacenyl" ligand is defined to mean a substituted or unsubstituted unsaturated cyclic hydrocarbyl ligand that consists of at least one cyclopentadienyl ring fused to at least one six membered aromatic ring which is fused to two partially unsaturated five membered rings, typically represented by the formula:

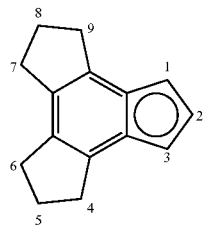

4,5,6,7,8,9-hexahydro-cyclopenta[e]-as-indacenyl where 1, 2, 3, 4, 5, 6, 7, 8 and 9 indicate bondable ring positions and represent the typical numbering scheme.

Substituted and unsubstituted hexahydro-cyclopenta[e]-as-indacene compounds are typically named with the numbering scheme illustrated below:

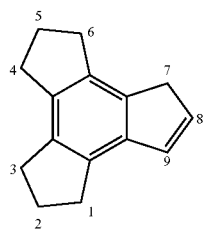

2,3,4,5,6,7-hexahydro-1H-cyclopenta[e]-as-indacene

A "octahydrobenzo[e]-as-indacenyl" ligand is defined to mean a substituted or unsubstituted unsaturated cyclic hydrocarbyl ligand that consists of at least one cyclopentadienyl ring fused to at least one six membered aromatic ring which is fused to one partially unsaturated five membered ring and one partially unsaturated six membered ring, typically represented by the formula:

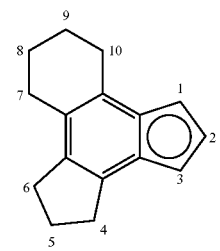

1,4,5,6,7,8,9,10-octahydrobenzo[e]-as-indacenyl where 1, 2, 3, 4, 5, 6, 7, 8, 9 and 10 indicate bondable ring positions and represent the typical numbering scheme.

Substituted and unsubstituted octahydrobenzo[e]-as-indacene compounds are typically named with the numbering scheme illustrated below:

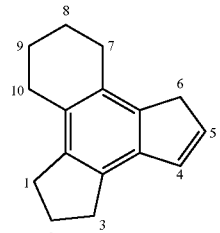

1,2,3,6,7,8,9,10-octahydrobenzo[e]-as-indacene

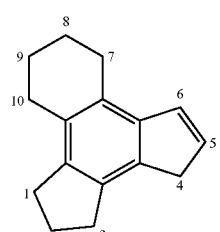

1,2,3,4,7,8,9,10-octahydrobenzo[e]-as-indacene

A "octahydro-cyclopenta[l]phenanthrenyl" ligand is defined to mean a substituted or unsubstituted unsaturated cyclic hydrocarbyl ligand that consists of at least one cyclopentadienyl ring fused to at least one six membered aromatic ring which is fused to two partially unsaturated six membered rings, typically represented by the formula:

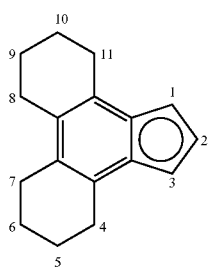

4,5,6,7,8,9,10,11-octahydro-cyclopenta[l]phenanthrenyl where 1, 2, 3, 4, 5, 6, 7, 8, 9 10 and 11 indicate bondable ring positions and represent the typical numbering scheme.

Substituted and unsubstituted octahydro-TH-cyclopenta [l]phenanthrene compounds are typically named with the numbering scheme illustrated below:

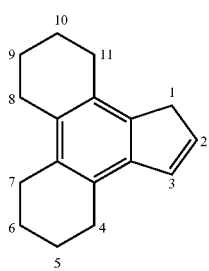

4,5,6,7,8,9,10,11-octahydro-1H-
cyclopenta[l]phenanthrene

A "metallocene" catalyst compound is a transition metal catalyst compound having one, two or three, typically one or two, substituted or unsubstituted cyclopentadienyl ligands bound to the transition metal, typically a metallocene catalyst is an organometallic compound containing at least one π-bound cyclopentadienyl moiety (or substituted cyclopentadienyl moiety). Substituted or unsubstituted cyclopentadienyl ligands include substituted or unsubstituted indenyl, fluorenyl, tetrahydro-s-indacenyl, tetrahydro-as-indacenyl, benz[f]indenyl (cyclopenta[b]naphthalenyl), benz[e]indenyl (cyclopenta[a]naphthalenyl), tetrahydrocyclopenta[b]naphthalenyl, tetrahydrocyclopenta[a]naphthalenyl, hexahydrocyclopenta[e]-as-indacenyl, octahydrobenzo[e]-as-indacenyl, octahydro-cyclopenta[l]phenanthrenyl and the like. For purposes of this invention and claims thereto in relation to metallocene catalyst compounds, the term "substituted" means that one or more hydrogen atoms have been replaced with a hydrocarbyl, heteroatom (such as a halide), or a heteroatom containing group, (such as silylcarbyl, germylcarbyl, halocarbyl, etc.). For example, bis(2-methylindenyl) $ZrCl_2$ is a substituted metallocene (i.e., a substituted indenyl, also referred to as a substituted indacene) because a hydrogen group from the indenyls has been replaced with a methyl group.

The term "independently," when referenced to selection of multiple items from within a given group, means that the selected choice for a first item does not necessarily influence the choice of any second or subsequent item. That is, independent selection of multiple items within a given group means that the individual items may be the same or different from one another.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in units of g/mol (g mol-1).

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, MAO is methylalumoxane, dme is 1,2-dimethoxyethane, p-tBu is para-tertiary butyl, TMS is trimethylsilyl, TIBAL is triisobutylaluminum, TNOAL or TnOAl is tri(n-octyl)aluminum, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, and Cy is cyclohexyl.

A "catalyst system" is a combination of at least one catalyst compound, at least one activator, and an optional co-activator. In some embodiments a "catalyst system" also includes an optional support material. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst, a catalyst precursor, a pre-catalyst compound, catalyst compound, catalyst complex or a transition metal compound, and these terms are used interchangeably.

An "anionic ligand" is a negatively charged ligand which donates one or more pairs of electrons to a metal ion.

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "continuous" means a system that operates without interruption or cessation. For example a continuous process to produce a polymer would be one where the reactants are continually introduced into one or more reactors and polymer product is continually withdrawn.

Catalyst Compounds

This invention relates to polycyclic metallocene transition metal compounds represented by the Formula (1):

$$T_yLAMX_{n-2} \qquad (1)$$

wherein:

M is a group 3-6 metal, preferably M is a group 4 metal, preferably M is Hf, Ti or Zr, and n is the oxidation state of M (preferably n is 2, 3, 4, 5, or 6, preferably 2, 3, 4, or 5, preferably 4);

A is a substituted or unsubstituted polycyclic arenyl ligand bonded to M wherein the polycyclic ligand contains an indenyl fragment with two partially unsaturated rings annulated to the phenyl ring of the indenyl ligand fragment, preferably at least one of the annulated partially unsaturated rings is a 5 membered ring, alternately at least one of the annulated partially unsaturated rings is a 6 membered ring, alternately one of the annulated partially unsaturated rings is a 5 membered ring and one of the annulated partially unsaturated rings is a 6 membered ring, alternately both of the rings are 5 membered rings, alternately both of the rings are 6 membered rings;

L is a substituted or unsubstituted monocyclic or polycyclic arenyl ligand bonded to M, or a substituted or unsubstituted monocyclic or polycyclic heteroarenyl ligand bonded to M, or is represented by the formula $JR'_{z-y}$ where J is a group 15 or 16 heteroatom (preferably N, O, S or P) bonded to M, R' is a substituted or unsubstituted hydrocarbyl substituent bonded to J, and z is 2 when J is a group 15 heteroatom and z is 1 when J is a group 16 heteroatom;

T is a bridging group;

y is 1 or 0 indicating the presence of absence of the bridging group T;

each X is independently a univalent anionic ligand, or two Xs are joined and bound to the metal atom to form a metallocycle ring, or two Xs are joined to form a chelating ligand, a diene ligand, or an alkylidene ligand.

In any embodiment of Formula (1) described herein, A is a substituted or unsubstituted hexahydro-cyclopenta[e]-as-indacenyl, octahydrobenzo[e]-as-indacenyl or octahydro-cyclopenta[1]phenanthrenyl ligand.

In any embodiment of Formula (1) described herein, L is a substituted or unsubstituted cyclopentadienyl, indenyl, fluorenyl, and cyclopenta[a]naphthalenyl (also called benz[e]indenyl), cyclopenta[b]naphthalenyl (also called benz[l]indenyl), tetrahydrocyclopenta[a]naphthalenyl, tetrahydro-cyclopenta[b]naphthalenyl, tetrahydro-s-indacenyl, tetrahydro-as-indacenyl, hexahydro-cyclopenta[e]-as-indacenyl, octahydrobenzo[e]-as-indacenyl and octahydro-cyclopenta[l]phenanthrenyl ligand. In some embodiments of the invention, L is the same as A.

Alternatively, in any embodiment of Formula (1) described herein, L is substituted or unsubstituted hydrocarbyl amido or hydrocarbyl phosphido, oxo (—O—), or thio (—S—) when y is 1 or is substituted or unsubstituted dihydrocarbyl amido or dihydrocarbyl phosphido, hydrocarbyloxy, or hydrocarbylthio when y is 0.

Non-limiting examples of A in formula 1 include hexahydro-cyclopenta[e]-as-indacenyl, 2-methyl-hexahydro-cyclopenta[e]-as-indacenyl, 2-ethyl-hexahydro-cyclopenta[e]-as-indacenyl, 2-propyl-hexahydro-cyclopenta[e]-as-indacenyl, 2,5,5-trimethyl-hexahydro-cyclopenta[e]-as-indacenyl, 2,5,5,8,8-pentamethyl-hexahydro-cyclopenta[e]-as-indacenyl, 2-ethyl-5,5-dimethyl-hexahydro-cyclopenta[e]-as-indacenyl, 2-ethyl-5,5,8,8-tetramethyl-hexahydro-cyclopenta[e]-as-indacenyl, 2-propyl-5,5-dimethyl-hexahydro-cyclopenta[e]-as-indacenyl, 2-propyl-5,5,8,8-tetramethyl-hexahydro-cyclopenta[e]-as-indacenyl, 2,5,5,8,8-pentaethyl-hexahydro-cyclopenta[e]-as-indacenyl, 2-methyl-5,5,8,8-tetraethyl-hexahydro-cyclopenta[e]-as-indacenyl, 5,5,8,8-tetramethyl-hexahydro-cyclopenta[e]-as-indacenyl, 5,5,8,8-tetraethyl-hexahydro-cyclopenta[e]-as-indacenyl, octahydrobenzo[e]-as-indacenyl, 2-methyl-octahydrobenzo[e]-as-indacenyl, 2-ethyl-octahydrobenzo[e]-as-indacenyl, 2-propyl-octahydrobenzo[e]-as-indacenyl, 2,5,5-trimethyl-octahydrobenzo[e]-as-indacenyl, 2-ethyl-5,5-dimethyl-octahydrobenzo[e]-as-indacenyl, 2-propyl-5,5-dimethyl-octahydrobenzo[e]-as-indacenyl, 2,5,5-triethyl-octahydrobenzo[e]-as-indacenyl, 2-methyl-5,5-diethyl-octahydrobenzo[e]-as-indacenyl, 5,5-dimethyl-octahydrobenzo[e]-as-indacenyl, 5,5-diethyl-octahydrobenzo[e]-as-indacenyl, 2,5,5,7,7,10,10-heptamethyl-octahydrobenzo[e]-as-indacenyl, 5,5,7,7,10,10-hexamethyl-octahydrobenzo[e]-as-indacenyl, octahydro-cyclopenta[l]phenanthrenyl, 2-methyl-octahydro-cyclopenta[l]phenanthrenyl, 2-ethyl-octahydro-cyclopenta[l]phenanthrenyl, 2-propyl-octahydro-cyclopenta[l]phenanthrenyl, 2,4,4,7,7-pentamethyl-octahydro-cyclopenta[l]phenanthrenyl, 2,4,4,7,7,8,8,11,11-nonamethyl-octahydro-cyclopenta[l]phenanthrenyl, 2,5,5,6,6,9,9,10,10-nonamethyl-octahydro-cyclopenta[l]phenanthrenyl, 4,4,7,7-tetramethyl-octahydro-cyclopenta[l]phenanthrenyl, 4,4,7,7,8,8,11,11-octamethyl-octahydro-cyclopenta[l]phenanthrenyl, 5,5,6,6,9,9,10,10-octamethyl-octahydro-cyclopenta[l]phenanthrenyl, and the like.

Non limiting examples of L include those listed above for A. Non-limiting additional examples of L include cyclopentadienyl, methylcyclopentadienyl, ethylcyclopentadienyl, propylcyclopentadienyl, neopentylcyclopentadienyl, 1,3-dimethylcyclopentadienyl, 1-methyl-3-butylcyclopentadienyl, tetramethylcyclopentadienyl, trimethylcyclopentadienyl, indenyl, 2-methylindenyl, 2-ethylindenyl, 2-propylindenyl, 2-methyl-4-phenylindenyl, 2-methyl-4-tolylindenyl, 2-methyl-4-(anthracenyl)indenyl, 2-propyl-4-phenylindenyl, 2-methyl-4-(carbazol-9-yl)indenyl, 2-methyl-4-(3',5'-di-tert-butylphenyl)indenyl, 2-methyl-4-(4'-tert-butylphenyl)indenyl, 2-methyl-4-(3',5'-di-tert-butylphenyl)-5-methoxyindenyl, 2-methyl-4-(3',5'-di-tert-butylphenyl)-6-methoxyindenyl, 2,4,7-trimethylindenyl, fluorenyl, 2,7-dimethylfluorenyl, 2,7-di-tert-butylfluorenyl, 3,6-di-tert-butylfluorenyl, 3,6-dimethylfluorenyl, 4,5-dimethylfluorenyl, 2,3,4,7,8,9,10,12-octahydro-dibenzo[b,h]fluorenyl, cyclopenta[b]naphthalenyl, 2-methyl-cyclopenta[b]naphthalenyl, 2-ethyl-cyclopenta[b]naphthalenyl, 2-methyl-4-phenyl-cyclopenta[b]naphthalenyl, 2,4,9-trimethyl-cyclopenta[b]naphthalenyl, cyclopenta[a]naphthalenyl, 2-methyl-cyclopenta[a]naphthalenyl, 2-ethyl-cyclopenta[a]naphthalenyl, 2-methyl-4-phenyl-cyclopenta[a]naphthalenyl, 2,4-dimethylcyclopenta[a]naphthalenyl, 5,6,7,8-tetrahydro-cyclopenta[b]naphthalenyl, 2-methyl-5,6,7,8-tetrahydro-cyclopenta[b]naphthalenyl, 2-ethyl-5,6,7,8-tetrahydro-cyclopenta[b]naphthalenyl, 2-methyl-4-phenyl-5,6,7,8-tetrahydro-cyclopenta[b]naphthalenyl, 2,4,9-trimethyl-5,6,7,8-tetrahydro-cyclopenta[b]naphthalenyl, 6,7,8,9-tetrahydro-cyclopenta[a]naphthalenyl, 2-methyl-6,7,8,9-tetrahydro-cyclopenta[a]naphthalenyl, 2-ethyl-6,7,8,9-tetrahydro-cyclopenta[a]naphthalenyl, 2-methyl-4-phenyl-6,7,8,9-tetrahydro-cyclopenta[a]naphthalenyl, 2,4-dimethyl-6,7,8,9-tetrahydro-cyclopenta[a]naphthalenyl, 1,5,6,7-tetrahydro-s-indacenyl, 2-methyl-1,5,6,7-tetrahydro-s-indacenyl, 2-ethyl-1,5,6,7-tetrahydro-s-indacenyl, 2-propyl-1,5,6,7-tetrahydro-s-indacenyl, 2,4,8-trimethyl-1,5,6,7-tetrahydro-s-indacenyl, 4,8-dimethyl-1,5,6,7-tetrahydro-s-indacenyl, 4,8-diethyl-1,5,6,7-tetrahydro-s-indacenyl, 2,6,6-trimethyl-1,5,6,7-tetrahydro-s-indacenyl, 2-ethyl-6,6-dimethyl-1,5,6,7-tetrahydro-s-indacenyl, 2,6,6-triethyl-1,5,6,7-tetrahydro-s-indacenyl, 3-methyl-1,5,6,7-tetrahydro-s-indacenyl, 3-isobutyl-1,5,6,7-tetrahydro-s-indacenyl, 3-ethyl-1,5,6,7- tetrahydro-s-indacenyl, 3-neopentyl-1,5,6,7-tetrahydro-s-indacenyl, 3,6,6-trimethyl-1,5,6,7-tetrahydro-s-indacenyl, 3-isobutyl-6,6-dimethyl-1,5,6,7-tetrahydro-s-indacenyl, 1,6,7,8-tetrahydro-as-indacenyl, 2-methyl-1,6,7,8-tetrahydro-as-indacenyl, 2-ethyl-1,6,7,8-tetrahydro-as-indacenyl, 2-propyl-1,6,7,8-tetrahydro-as-indacenyl, 2,7,7-trimethyl-1,6,7,8-tetrahydro-as-indacenyl, 2,7,7-triethyl-1,6,7,8-tetrahydro-as-indacenyl, 2-ethyl-7,7-dimethyl-1,6,7,8-tetrahydro-as-indacenyl, 7,7-dimethyl-1,6,7,8-tetrahydro-as-indacenyl, 7,7-diethyl-1,6,7,8-tetrahydro-as-indacenyl, 1-methyl-1,6,7,8-tetrahydro-as-indacenyl, 1-ethyl-1,6,7,8-tetrahydro-as-indacenyl, 1-propyl-1,6,7,8-tetrahydro-as-indacenyl, 1-isobutyl-1,6,7,8-tetrahydro-as-indacenyl, 1-neopentyl-1,6,7,8-tetrahydro-as-indacenyl, t-butylamido, methylamido, ethylamido, n-propylamido, n-butylamido, n-pentylamido, neopentylamido, isopropylamido, n-propylamido, cyclopropylamido, cyclobutylamido, cyclopentyl, cyclohexylamido, cycloheptylamido, cyclooctylamido, cyclodecylamido, cyclododecylamido, adamant-1-ylamido, 3,5-dimethyladamant-1-ylamido, 3,5,7-trimethyladamant-1-ylamido, benzylamido, phenethylamido, phenylamido, norbornylamido, cyclohexylmethylamido, trimethylsilylmethylamido, 3,3-dimethylbutanylamido, t-butylphosphido, phenylphosphido, and the like.

This inventive also relates to a metallocene transition metal compounds represented by Formulas (2a) and (2b):

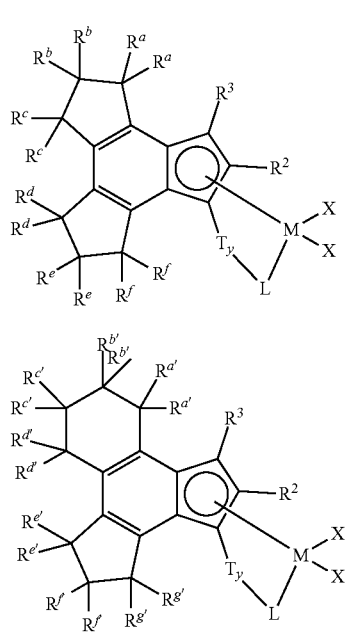

(2a)

(2b)

wherein M is a group 4 metal, preferably Hf, Ti or Zr;

L is a substituted or unsubstituted monocyclic or polycyclic arenyl ligand bonded to M, or a substituted or unsubstituted monocyclic or polycyclic heteroarenyl ligand bonded to M, or is represented by the formula $JR'_{z-y}$ where J is a group 15 or 16 heteroatom bonded to M, R' is a substituted or unsubstituted hydrocarbyl substituent bonded to J, and z is 2 when J is a group 15 heteroatom and z is 1 when J is a group 16 heteroatom;

T is a bridging group;

y is 1 or 0, indicating the presence of absence of T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently hydrogen or a $C_1$-$C_{10}$ alkyl (such as methyl, ethyl, propyl, butyl, pentyl, hexyl, heptyl, octyl, nonyl, decyl, or an isomer thereof); and each X is independently a univalent anionic ligand, or two Xs are joined and bound to the metal atom to form a metallocycle ring, or two Xs are joined to form a chelating ligand, a diene ligand, or an alkylidene ligand.

This invention also relates to metallocene transition metal compounds represented by Formulas (3a) and (3b):

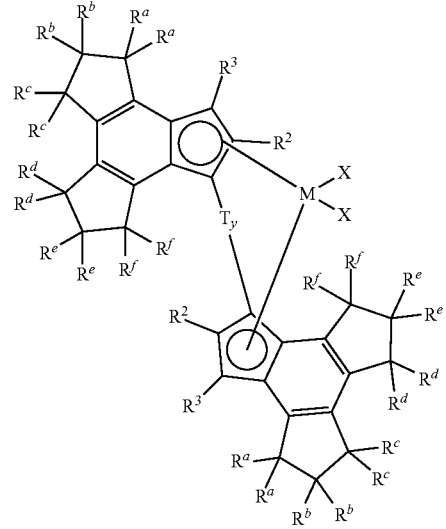

(3a)

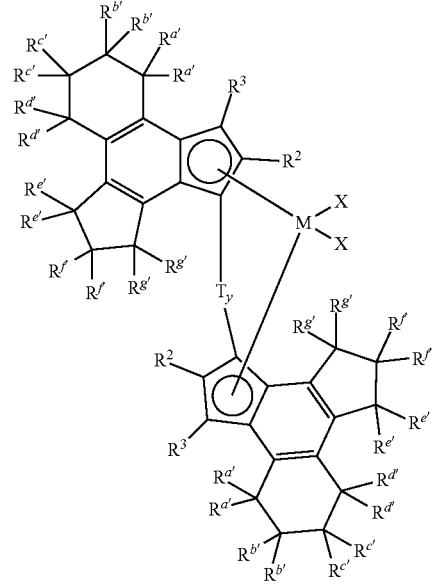

(3b)

wherein M is a group 4 metal, preferably Zr or Hf;

T is a bridging group;

y is 1 or 0 indicating the presence of absence of T;

each $R^2$ and $R^3$ is independently hydrogen, or a $C_1$-$C_{50}$ substituted or unsubstituted hydrocarbyl, halocarbyl or silylcarbyl (preferably hydrogen, or a linear, branched, or cyclic $C_1$ to $C_{20}$ alkyl);

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently a hydrogen or $C_1$-$C_{10}$ alkyl (such as methyl, ethyl, propyl, butyl, pentyl, hexyl, heptyl, octyl, nonyl, decyl, or an isomer thereof); and each X is independently a univalent anionic ligand, or two Xs are joined and bound to the metal atom to form a metallocycle ring, or two Xs are joined to form a chelating ligand, a diene ligand, or an alkylidene ligand.

This invention also relates to metallocene transition metal compounds represented by Formula (4a) and (4b):

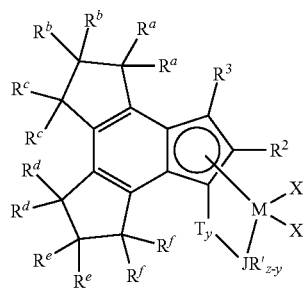

(4a)

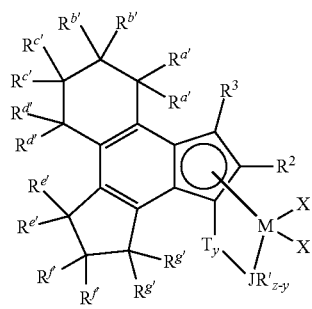

(4b)

wherein M is a group 4 metal, such as Ti, Zr or Hf;

T is a bridging group; y is 1 or 0 indicating the presence of absence of T;

each $R^2$ and $R^3$ is independently hydrogen, or a $C_1$-$C_{50}$ substituted or unsubstituted hydrocarbyl, halocarbyl or silylcarbyl (preferably hydrogen, or a linear, branched, or cyclic $C_1$ to $C_{20}$ alkyl);

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently hydrogen or a $C_1$-$C_{10}$ alkyl (such as methyl, ethyl, propyl, butyl, pentyl, hexyl, heptyl, octyl, nonyl, decyl, or an isomer thereof);

J is a group 15 or 16 heteroatom bonded to M, preferrably N, O, S or P, most preferably N;

R' is a substituted or unsubstituted hydrocarbyl substituent bonded to J, and z is 2 when J is a group 15 heteroatom and z is 1 when J is a group 16 heteroatom; and each X is independently a univalent anionic ligand, or two Xs are joined and bound to the metal atom to form a metallocycle ring, or two Xs are joined to form a chelating ligand, a diene ligand, or an alkylidene ligand.

This invention also relates to ligands represented by Formula (5a) and (5b) as illustrated below:

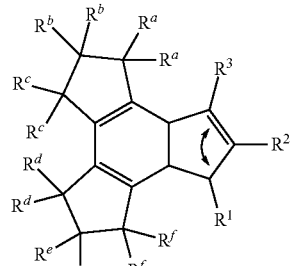

(5a)

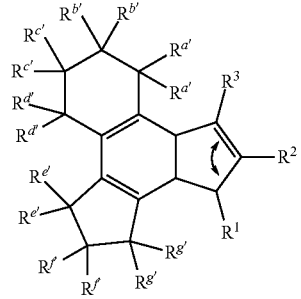

(5b)

wherein the double ended arrow indicates the two isomeric forms, each $R^2$ and $R^3$ is independently hydrogen, or a $C_1$-$C_{50}$ substituted or unsubstituted hydrocarbyl, halocarbyl or silylcarbyl (preferably hydrogen, or a linear, branched, or cyclic $C_1$ to $C_{20}$ alkyl);

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently hydrogen or a $C_1$-$C_{10}$ alkyl (such as methyl, ethyl, propyl, butyl, pentyl, hexyl, heptyl, octyl, nonyl, decyl, or an isomer thereof); and $R^1$ is hydrogen or hydrocarbyl, such as $C_1$-$C_{50}$ substituted or unsubstituted hydrocarbyl, halocarbyl or silylcarbyl (preferably $R^1$ is hydrogen).

Preferably, in any embodiment of any of Formulas (2a), (2b), (3a), (3b), (4a), (4b), (5a), or (5b) at least one of $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is not hydrogen.

In any embodiment of any of Formulas (1), (2a), (2b), (3a), (3b), (4a) or (4b) described herein, M is Hf, Zr or Ti.

In any embodiment of any of Formulas (2a), (2b), (3a), (3b), (4a), (4b), (5a), or (5b) described herein, each $R^2$ is independently hydrogen or a $C_1$-$C_{10}$ hydrocarbyl, preferably hydrogen or a $C_1$-$C_{10}$ alkyl (such as methyl, ethyl, propyl, butyl, pentyl, hexyl, heptyl, octyl, nonyl, decyl, or an isomer thereof). Alternately each $R^2$ is independently selected from hydrogen, methyl, ethyl, n-propyl, isopropyl, cyclopropyl, n-butyl, sec-butyl, iso-butyl, cyclobutyl, methylcyclopropyl, n-pentyl, 2-methylbutyl, 3-methylbutyl, cyclopentyl, 1-methylcyclobutyl, 2-methylcyclobutyl, ethylcyclopropyl, n-hexyl, 2-methylpentyl, 3-methylpentyl, 4-methylpentyl, 2-ethylbutyl, cyclohexyl, 2-methylcyclopentyl, 3-methylcyclopentyl, 2-ethylcyclobutyl, 3-ethylcyclobutyl, propylcyclopropyl, n-heptyl, 2-methylhexyl, 3-methylhexyl, 4-methylhexyl, 5-methylhexyl, 2-ethylpentyl, 3-ethylpentyl, cycloheptyl, n-octyl, 2-methylheptyl, 3-methylheptyl, 4-methylheptyl, 5-methylheptyl, 6-methylheptyl, 2-ethylhexyl, 3-ethylhexyl, 4-ethylhexyl, 3-propylpentyl, cyclooctyl, n-nonyl, 2-methyloctyl, 3-methyloctyl, 4-methyloctyl, 5-methyloctyl, 6-methyloctyl, 7-methyloctyl, 2-ethylheptyl, 3-ethylheptyl, 4-ethylheptyl, 5-ethylhepty, 2-propylhexyl, 3-propylhexyl, cyclononyl, n-decyl, 2-methylnonyl, 3-methylnonyl, 4-methylnonyl, 5-methylnonyl, 6-methylnonyl, 7-methylnonyl, 8-methylnonyl, 2-ethyloctyl, 3-ethyloctyl, 4-ethyloctyl, 5-ethyloctyl, 6-ethyloctyl, 3-propylheptyl, 4-propylheptyl, 2-butylhexyl, cyclodecyl, and benzyl, phenethyl.

In any embodiment of any of Formulas (2a), (2b), (3a), (3b), (4a), (4b), (5a), or (5b) described herein, each $R^3$ is independently hydrogen or a $C_1$-$C_{10}$ hydrocarbyl, preferably hydrogen or a $C_1$-$C_{10}$ alkyl (such as methyl, ethyl, propyl, butyl, pentyl, hexyl, heptyl, octyl, nonyl, decyl, or an isomer thereof). Alternately each $R^3$ is independently selected from hydrogen, methyl, ethyl, n-propyl, isopropyl, cyclopropyl, n-butyl, sec-butyl, iso-butyl, cyclobutyl, methylcyclopropyl, n-pentyl, 2-methylbutyl, 3-methylbutyl, cyclopentyl, 1-methylcyclobutyl, 2-methylcyclobutyl, ethylcyclopropyl, n-hexyl, 2-methylpentyl, 3-methylpentyl, 4-methylpentyl, 2-ethylbutyl, cyclohexyl, 2-methylcyclopentyl, 3-methylcyclopentyl, 2-ethylcyclobutyl, 3-ethylcyclobutyl, propylcyclopropyl, n-heptyl, 2-methylhexyl, 3-methylhexyl, 4-methylhexyl, 5-methylhexyl, 2-ethylpentyl, 3-ethylpentyl, cycloheptyl, n-octyl, 2-methylheptyl, 3-methylheptyl, 4-methylheptyl, 5-methylheptyl, 6-methylheptyl, 2-ethylhexyl, 3-ethylhexyl, 4-ethylhexyl, 3-propylpentyl, cyclooctyl, n-nonyl, 2-methyloctyl, 3-methyloctyl, 4-methyloctyl, 5-methyloctyl, 6-methyloctyl, 7-methyloctyl, 2-ethylheptyl, 3-ethylheptyl, 4-ethylheptyl, 5-ethylhepty, 2-propylhexyl, 3-propylhexyl, cyclononyl, n-decyl, 2-methylnonyl, 3-methylnonyl, 4-methylnonyl, 5-methylnonyl, 6-methylnonyl, 7-methylnonyl, 8-methylnonyl, 2-ethyloctyl, 3-ethyloctyl, 4-ethyloctyl, 5-ethyloctyl, 6-ethyloctyl, 3-propylheptyl, 4-propylheptyl, 2-butylhexyl, cyclodecyl, and benzyl, phenethyl.

In any embodiment of any of Formulas (2a), (2b), (3a), (3b), (4a), (4b), (5a), or (5b) described herein, each $R^2$ is independently hydrogen or a $C_1$-$C_{10}$ hydrocarbyl, preferably hydrogen or a $C_1$-$C_{10}$ alkyl (such as methyl, ethyl, propyl, butyl, pentyl, hexyl, heptyl, octyl, nonyl, decyl, or an isomer thereof) and $R^3$ is hydrogen.

In any embodiment of any of Formulas (2a), (2b), (3a), (3b), (4a), (4b), (5a), or (5b) described herein, each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently hydrogen or a $C_1$-$C_{10}$ alkyl (such as methyl, ethyl, propyl, butyl, pentyl, hexyl, heptyl, octyl, nonyl, decyl, or an isomer thereof).

In any embodiment of any of Formulas (1), (2a), (2b), (3a), (3b), (4a) or (4b) described herein, y is 1.

In any embodiment of any of Formulas (1), (2a), (2b), (3a), (3b), (4a) or (4b) described herein, y is 0.

In embodiments of the invention in Formulas (2a), (3a), (4a), or (5a), each $R^b$ and each $R^e$ are independently a $C_1$-$C_{10}$ alkyl (such as methyl, ethyl, propyl, butyl, pentyl, hexyl, heptyl, octyl, nonyl, decyl, or an isomer thereof), or hydrogen, and each $R^a$, $R^c$, $R^d$, $R^f$ are hydrogen.

In embodiments of the invention in Formulas (2a), (3a), (4a) or (5a), each $R^b$ and each $R^e$ are independently a $C_1$-$C_{10}$ alkyl (such as methyl, ethyl, propyl, butyl, pentyl, hexyl, heptyl, octyl, nonyl, decyl, or an isomer thereof), and each $R^a$, $R^c$, $R^d$, $R^f$ are hydrogen.

In embodiments of the invention in Formulas (2a), (3a), (4a) or (5a), each $R^b$ and each $R^e$ are independently methyl, ethyl, propyl, butyl, pentyl or hexyl, preferably methyl, and each $R^a$, $R^c$, $R^d$, $R^f$ are hydrogen.

In embodiments of the invention in Formulas (2a), (3a), (4a) or (5a), each $R^b$ and each $R^e$ are independently methyl, ethyl, or propyl, preferably methyl, and each $R^a$, $R^c$, $R^d$, $R^f$ are hydrogen.

In embodiments of the invention in Formulas (2a), (3a), (4a), or (5a), each $R^2$, $R^b$ and $R^e$ are independently methyl, ethyl, or propyl, preferably methyl, and each $R^3$, $R^a$, $R^c$, $R^d$, $R^f$ are hydrogen.

In embodiments of the invention in Formulas (2a), (3a), (4a) or (5a), each $R^2$, $R^b$ and $R^e$ are methyl, and each $R^3$, $R^a$, $R^c$, $R^d$, $R^f$ are hydrogen.

In some embodiments of the invention in Formulas (2b), (3b), (4b) or (5b), each $R^{f'}$ is independently a $C_1$-$C_{10}$ alkyl (such as methyl, ethyl, propyl, butyl, pentyl, hexyl, heptyl, octyl, nonyl, decyl, or an isomer thereof), or hydrogen, and each $R^{a'}$, $R^{b'}$, $R^{c'}$, $R^{d'}$, $R^{e'}$, $R^{g'}$ are hydrogen.

In embodiments of the invention in Formulas (2b), (3b), (4b) or (5b), each $R^{f'}$ is independently a $C_1$-$C_{10}$ alkyl (such as methyl, ethyl, propyl, butyl, pentyl, hexyl, heptyl, octyl, nonyl, decyl, or an isomer thereof), and each $R^{a'}$, $R^{b'}$, $R^{c'}$, $R^{d'}$, $R^{e'}$, $R^{g'}$ are hydrogen.

In embodiments of the invention in Formulas (2b), (3b), (4b) or (5b), each $R^{f'}$ is independently methyl, ethyl, propyl or butyl, pentyl or hexyl, preferably methyl, and each $R^{a'}$, $R^{b'}$, $R^{c'}$, $R^{d'}$, $R^{e'}$, $R^{g'}$ are hydrogen.

In embodiments of the invention in Formulas (2b), (3b), (4b) or (5b), each $R^{f'}$ is independently methyl, ethyl, or propyl, preferably methyl, and each $R^{a'}$, $R^{b'}$, $R^{c'}$, $R^{d'}$, $R^{e'}$, $R^{g'}$ are hydrogen.

In embodiments of the invention in Formulas (2b), (3b), (4b) or (5b), each $R^2$ and Rr is independently methyl, ethyl, or propyl, preferably methyl, and each $R^3$, $R^{a'}$, $R^{b'}$, $R^{c'}$, $R^{d'}$, $R^{e'}$, $R^{g'}$ are hydrogen.

In embodiments of the invention in Formulas (2b), (3b), (4b) or (5b), each $R^2$ and Rr are methyl, and each $R^3$, $R^{a'}$, $R^{b'}$, $R^{c'}$, $R^{d'}$, $R^{e'}$, $R^{g'}$ are hydrogen.

In any embodiment of any of Formulas (1), (2a), (2b), (4a), or (4b) described herein, R' is $C_1$-$C_{30}$ substituted or unsubstituted alkyl (linear, branched, or cyclic), aryl, alkaryl, or heterocyclic group.

In any embodiment of any of Formulas (1), (2a), (2b), (4a), or (4b) described herein, R' is $C_1$-$C_{30}$ linear, branched or cyclic alkyl group.

In any embodiment of any of Formulas (1), (2a), (2b), (4a), or (4b) herein, R' is methyl, ethyl, or any isomer of propyl, butyl, pentyl, hexyl, heptyl, octyl, nonyl, decyl, undecyl, or dodecyl.

In any embodiment of any of Formulas (1), (2a), (2b), (4a), or (4b) herein, R' is a cyclic or polycyclic hydrocarbyl.

In any embodiment of any of Formulas (1), (2a), (2b), (4a), or (4b) herein, R' is selected from tert-butyl, neopentyl, cyclopentyl, cyclohexyl, cycloheptyl, cyclooctyl, cyclononyl, cyclodecyl, cycloundecyl, cyclododecyl, adamantyl, 3,5-dimethyladamantyl, 3,5,7-trimethyladamantyl, benzy, phenethyl, phenyl, cyclohexylmethl, trimethylsilylmethyl and norbornyl.

In any embodiment of any of Formulas (1), (2a), (2b), (3a), (3b), (4a) or (4b) herein, T is selected from $(CR^8R^9)_x$, $(SiR^8R^9)_x$, $CR^8R^9SiR^8R^9$, $GeR^{10}R^{11}$, $P(=S)R^{12}$, $P(=Se)R^{12}$, $P(=O)R^{12}$, $R*C=CR*$, $R*C=CR*CR*_2$, $R*_2CCR*=CR*CR*_2$, $R*C=CR*CR*=CR*$, $R*C=CR*CR*_2CR*_2$, $R*_2CSiR*_2$, $R*_2SiOSiR*_2$, $R*_2CSiR*_2CR*_2$, $R*_2SiCR*_2SiR*_2$, $R*C=CR*SiR*_2$, $R*_2CGeR*_2$, $R*_2GeGeR*_2$, $R*_2CGeR*_2CR*_2$, $R*_2GeCR*_2GeR*_2$, $R*_2SiGeR*_2$, $R*C=CR*GeR*_2$, $R*_2C-BR*$, $R*_2C-BR*-CR*_2$, $R*_2C-O-CR*_2$, $R*_2CR*_2C-O-CR*_2CR*_2$, $R*_2C-O-CR*_2CR*_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, BR$^{12}$, NR$^{12}$, PR$^{12}$, AsR$^{12}$, SbR$^{12}$, O—O, S—S, R$^{12}$N—NR$^{12}$, R$^{12}$P—PR$^{12}$, O—S, O—NR$^{12}$, O—PR$^{12}$, S—NR$^{12}$, S—PR$^{12}$, and R$^{12}$N—PR$^{12}$ where x is 1, 2, 3 or 4; each R$^8$, R$^9$ and R* are independently selected from hydrogen, substituted or unsubstituted hydrocarbyl, halocarbyl, and silylcarbyl; each R$^{10}$, R$^{11}$ and R$^{12}$ are independently selected from substituted or unsubstituted hydrocarbyl, halocarbyl, and silylcarbyl; and any two or more adjacent R$^8$, R$^9$, R$^{10}$, R$^{11}$ or R* may optionally be bonded together to form a substituted or unsubstituted, saturated, partially unsaturated or aromatic, cyclic or polycyclic ring structure.

In any embodiment of any of Formulas (1), (2a), (2b), (3a), (3b), (4a) or (4b) herein, T is selected from (CR$^8$R$^9$)$_x$, (SiR$^{10}$11$^9$)$_x$, GeR$^{10}$R$^{11}$ where x is 1 or 2; and R$^8$, R$^9$, R$^{10}$ and R$^{11}$ are as defined above.

In any embodiment of any of Formulas (1), (2a), (2b), (3a), (3b), (4a), or (4b) herein, T is selected from diphenylmethylene, dimethylmethylene, 1,2-ethylene, cyclotrimethylenesilylene, cyclotetramethylenesilylene, cyclopentamethylenesilylene, dimethylsilylene, diethylsilylene, methylethylsilylene, methylphenylsilylene, diphenylsilylene, dipropylsilylene and 1,1,2,2-tetramethyldisilylene.

In any embodiment of the invention, T is selected from cyclotetramethylenesilylene and dimethylsilylene.

In any embodiment of any of Formulas (1), (2a), (2b), (3a), (3b), (4a), or (4b) described herein, each X is, independently, selected from the group consisting of substituted or unsubstituted radicals (typically having from 1 to 20 carbon atoms), hydrides, amides, alkoxides, sulfides, phosphides, halides, amines, phosphines, ethers, and a combination thereof, (two X's may form a part of a fused ring or a ring system, or form a diene or alkylidene), preferably each X is independently selected from halides and C$_1$ to C$_{20}$ hydrocarbyl groups (such as C$_1$ to C$_{20}$ alkyl groups, such as C$_1$ to C$_5$ alkyl groups), preferably each X is a methyl group. Alternatively, each X may be, independently, a halide, a hydride, an alkyl group, an alkenyl group or an arylalkyl group. Alternatively, each X is, independently, selected from halides, aryls and C$_1$ to C$_5$ alkyl groups, preferably each X is a phenyl, methyl, ethyl, propyl, butyl, pentyl, benzyl, fluoro, bromo or chloro group.

In any embodiment of any of Formulas (1), (2a), (2b), (3a), (3b), (4a), or (4b) described herein, each X, independently, is hydrocarbyl, halocarbyl, or substituted hydrocarbyl or halocarbyl.

In any embodiment of any of Formulas (1), (2a), (2b), (3a), (3b), (4a), or (4b) described herein, each X is independently methyl, benzyl, ethyl, propyl, butyl, pentyl, hexyl, heptyl, octyl, nonyl, decyl, or an isomer thereof, or halo, where halo includes fluoride, chloride, bromide and iodide.

Catalyst compounds that are particularly useful in this invention include one or more of the compounds represented by the formulas below:

Complex A

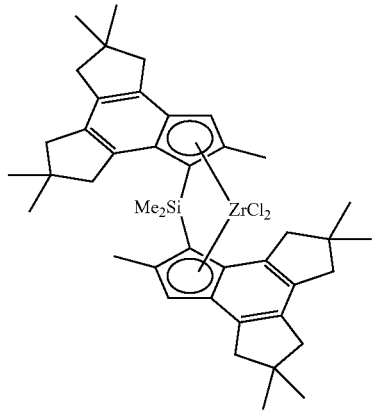

Complex B

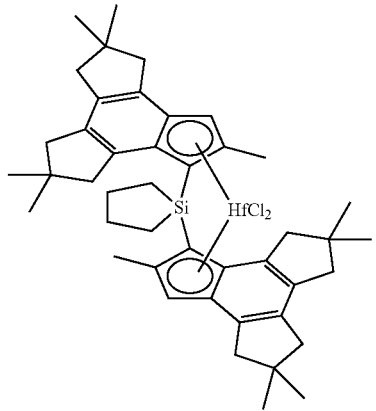

Complex C

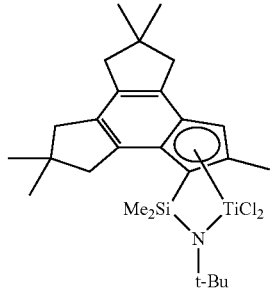

Complex D

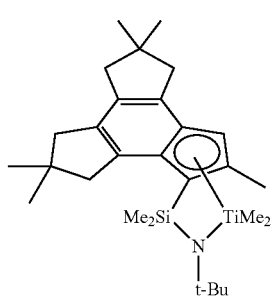

-continued

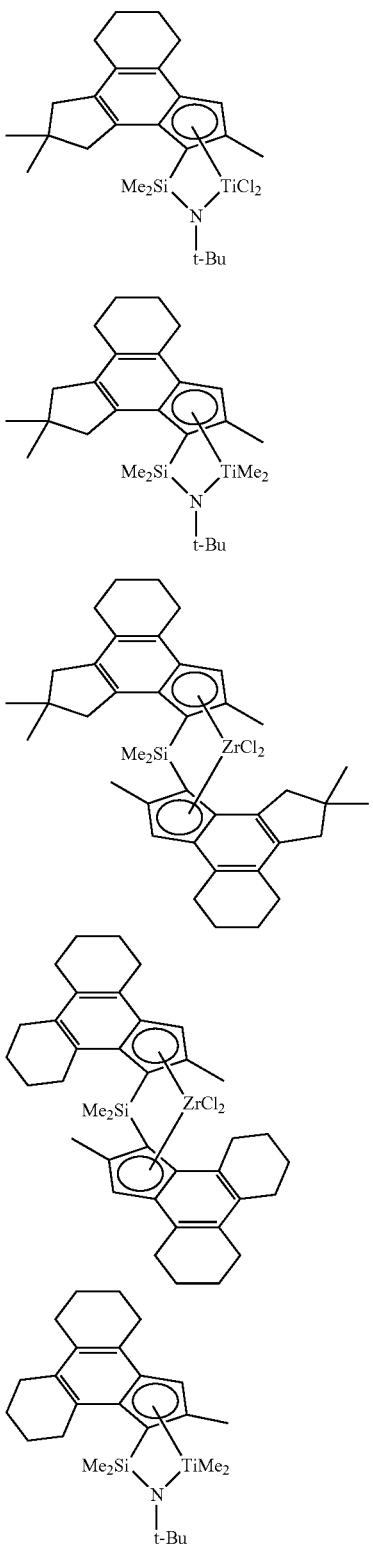

Non-limiting examples of compounds of the invention include:

rac-dimethylsilanediylbis[η$^5$-2,5,5,8,8-pentamethyl-4,5,6,7,8,9-hexahydrocyclopenta[e]as-indacen-1-yl]zirconium dichloride,
rac-dimethylsilanediylbis[η$^5$-2,5,5,8,8-pentamethyl-4,5,6,7,8,9-hexahydrocyclopenta[e]as-indacen-1-yl]zirconium dimethyl,
rac-dimethylsilanediylbis[η$^5$-2,5,5,8,8-pentamethyl-4,5,6,7,8,9-hexahydrocyclopenta[e]as-indacen-1-yl]hafnium dichloride,
rac-dimethylsilanediylbis[η$^5$-2,5,5,8,8-pentamethyl-4,5,6,7,8,9-hexahydrocyclopenta[e]as-indacen-1-yl]hafnium dimethyl,
rac-dimethylsilanediylbis[η$^5$-5,5,8,8-tetramethyl-4,5,6,7,8,9-hexahydrocyclopenta[e]as-indacen-1-yl]zirconium dichloride,
rac-dimethylsilanediylbis[η$^5$-5,5,8,8-tetramethyl-4,5,6,7,8,9-hexahydrocyclopenta[e]as-indacen-1-yl]zirconium dimethyl,
rac-dimethylsilanediylbis[η$^5$-5,5,8,8-tetramethyl-4,5,6,7,8,9-hexahydrocyclopenta[e]as-indacen-1-yl]hafnium dichloride,
rac-dimethylsilanediylbis[η$^5$-5,5,8,8-tetramethyl-4,5,6,7,8,9-hexahydrocyclopenta[e]as-indacen-1-yl]hafnium dimethyl,
rac-1,1-silolanediylbis(η$^5$-2,5,5,8,8-pentamethyl-4,5,6,7,8,9-hexahydrocyclopenta[e]as-indacen-1-yl)hafnium dichloride,
rac-1,1-silolanediylbis(η$^5$-2,5,5,8,8-pentamethyl-4,5,6,7,8,9-hexahydrocyclopenta[e]as-indacen-1-yl)hafnium dimethyl,
rac-1,1-silolanediylbis(η$^5$-2,5,5,8,8-pentamethyl-4,5,6,7,8,9-hexahydrocyclopenta[e]as-indacen-1-yl)zirconium dichloride,
rac-1,1-silolanediylbis(η$^5$-2,5,5,8,8-pentamethyl-4,5,6,7,8,9-hexahydrocyclopenta[e]as-indacen-1-yl)zirconium dimethyl,
rac-1,1-silolanediylbis(η$^5$-5,5,8,8-tetramethyl-4,5,6,7,8,9-hexahydrocyclopenta[e]as-indacen-1-yl)hafnium dichloride,
rac-1,1-silolanediylbis(η$^5$-5,5,8,8-tetramethyl-4,5,6,7,8,9-hexahydrocyclopenta[e]as-indacen-1-yl)hafnium dimethyl,
rac-1,1-silolanediylbis(η$^5$-5,5,8,8-tetramethyl-4,5,6,7,8,9-hexahydrocyclopenta[e]as-indacen-1-yl)zirconium dichloride,
rac-1,1-silolanediylbis(η$^5$-5,5,8,8-tetramethyl-4,5,6,7,8,9-hexahydrocyclopenta[e]as-indacen-1-yl)zirconium dimethyl,
dimethylsilanediyl(η$^5$-2,5,5,8,8-pentamethyl-4,5,6,7,8,9-hexahydro-cyclopenta[e]as-indacen-1-yl)(tert-butylamido)titanium dichloride,
dimethylsilanediyl(η$^5$-2,5,5,8,8-pentamethyl-4,5,6,7,8,9-hexahydro-cyclopenta[e]as-indacen-1-yl)(tert-butylamido)zirconium dichloride,
dimethylsilanediyl(η$^5$-2,5,5,8,8-pentamethyl-4,5,6,7,8,9-hexahydro-cyclopenta[e]as-indacen-1-yl)(tert-butylamido)hafnium dichloride,
dimethylsilanediyl(η$^5$-2,5,5,8,8-pentamethyl-4,5,6,7,8,9-hexahydro-cyclopenta[e]as-indacen-1-yl)(tert-butylamido)titanium dimethyl,
dimethylsilanediyl(η$^5$-2,5,5,8,8-pentamethyl-4,5,6,7,8,9-hexahydro-cyclopenta[e]as-indacen-1-yl)(tert-butylamido)zirconium dimethyl,
dimethylsilanediyl(η$^5$-2,5,5,8,8-pentamethyl-4,5,6,7,8,9-hexahydro-cyclopenta[e]as-indacen-1-yl)(tert-butylamido)hafnium dimethyl,
dimethylsilanediyl(η$^5$-5,5,8,8-tetramethyl-4,5,6,7,8,9-hexahydro-cyclopenta[e]as-indacen-1-yl)(tert-butylamido)titanium dichloride, dimethylsilanediyl(η⁵-5,5,8,8-tetramethyl-4,5,6,7,8,9-hexahydro-cyclopenta[e]as-indacen-1-yl)(tert-butylamido)zirconium dichloride,
dimethylsilanediyl(η⁵-5,5,8,8-tetramethyl-4,5,6,7,8,9-hexahydro-cyclopenta[e]as-indacen-1-yl)(tert-butylamido)hafnium dichloride,
dimethylsilanediyl(η⁵-5,5,8,8-tetramethyl-4,5,6,7,8,9-hexahydro-cyclopenta[e]as-indacen-1-yl)(tert-butylamido)titanium dimethyl,
dimethylsilanediyl(η⁵-5,5,8,8-tetramethyl-4,5,6,7,8,9-hexahydro-cyclopenta[e]as-indacen-1-yl)(tert-butylamido)zirconium dimethyl,
dimethylsilanediyl(η⁵-5,5,8,8-tetramethyl-4,5,6,7,8,9-hexahydro-cyclopenta[e]as-indacen-1-yl)(tert-butylamido)hafnium dimethyl,
dimethylsilanediyl(η⁵-5,5,8,8-tetramethyl-4,5,6,7,8,9-hexahydro-cyclopenta[e]as-indacen-1-yl)(adamantylamido)titanium dimethyl,
dimethylsilanediyl(η⁵-5,5,8,8-tetramethyl-4,5,6,7,8,9-hexahydro-cyclopenta[e]as-indacen-1-yl)(cyclohexylamido)titanium dimethyl,
dimethylsilanediyl(η⁵-5,5,8,8-tetramethyl-4,5,6,7,8,9-hexahydro-cyclopenta[e]as-indacen-1-yl)(cyclooctylamido)titanium dimethyl,
dimethylsilanediyl(η⁵-5,5,8,8-tetramethyl-4,5,6,7,8,9-hexahydro-cyclopenta[e]as-indacen-1-yl)(cyclodecylamido)titanium dimethyl,
dimethylsilanediyl(η⁵-5,5,8,8-tetramethyl-4,5,6,7,8,9-hexahydro-cyclopenta[e]as-indacen-1-yl)(cyclododecylamido)titanium dimethyl,
dimethylsilanediyl(η⁵-5,5,8,8-tetramethyl-4,5,6,7,8,9-hexahydro-cyclopenta[e]as-indacen-1-yl)(neopentylamido)titanium dimethyl,
dimethylsilanediyl(η⁵-5,5,8,8-tetramethyl-4,5,6,7,8,9-hexahydro-cyclopenta[e]as-indacen-1-yl)(trimethylsilylmethanamido)titanium dimethyl,
dimethylsilanediyl(η⁵-2,5,5,8,8-pentamethyl-4,5,6,7,8,9-hexahydro-cyclopenta[e]as-indacen-1-yl)(adamantylamido)titanium dimethyl,
dimethylsilanediyl(η⁵-2,5,5,8,8-pentamethyl-4,5,6,7,8,9-hexahydro-cyclopenta[e]as-indacen-1-yl)(cyclohexylamido)titanium dimethyl,
dimethylsilanediyl(η⁵-2,5,5,8,8-pentamethyl-4,5,6,7,8,9-hexahydro-cyclopenta[e]as-indacen-1-yl)(cyclooctylamido)titanium dimethyl,
dimethylsilanediyl(η⁵-2,5,5,8,8-pentamethyl-4,5,6,7,8,9-hexahydro-cyclopenta[e]as-indacen-1-yl)(cyclodecylamido)titanium dimethyl,
dimethylsilanediyl(η⁵-2,5,5,8,8-pentamethyl-4,5,6,7,8,9-hexahydro-cyclopenta[e]as-indacen-1-yl)(cyclododecylamido)titanium dimethyl,
dimethylsilanediyl(η⁵-2,5,5,8,8-pentamethyl-4,5,6,7,8,9-hexahydro-cyclopenta[e]as-indacen-1-yl)(neopentylamido)titanium dimethyl,
dimethylsilanediyl(η⁵-2,5,5,8,8-pentamethyl-4,5,6,7,8,9-hexahydro-cyclopenta[e]as-indacen-1-yl)(trimethylsilylmethanamido)titanium dimethyl,
dimethylsilanediyl(η⁵-2,5,5-trimethyl-3,4,5,6,7,8,9,10-octahydrobenzo[e]as-indacen-3-yl)(tert-butylamido)titanium dichloride,
dimethylsilanediyl(η⁵-2,5,5-trimethyl-3,4,5,6,7,8,9,10-octahydrobenzo[e]as-indacen-3-yl)(tert-butylamido)zirconium dichloride,
dimethylsilanediyl(η⁵-2,5,5-trimethyl-3,4,5,6,7,8,9,10-octahydrobenzo[e]as-indacen-3-yl)hafnium dichloride,
dimethylsilanediyl(η⁵-2,5,5-trimethyl-3,4,5,6,7,8,9,10-octahydrobenzo[e]as-indacen-3-yl)(tert-butylamido)titanium dimethyl,
dimethylsilanediyl(η⁵-2,5,5-trimethyl-3,4,5,6,7,8,9,10-octahydrobenzo[e]as-indacen-3-yl)(tert-butylamido)zirconium dimethyl,
dimethylsilanediyl(η⁵-2,5,5-trimethyl-3,4,5,6,7,8,9,10-octahydrobenzo[e]as-indacen-3-yl)(tert-butylamido)hafnium dimethyl,
dimethylsilanediyl(η⁵-5,5-dimethyl-3,4,5,6,7,8,9,10-octahydrobenzo[e]as-indacen-3-yl)(tert-butylamido)titanium dichloride,
dimethylsilanediyl(η⁵-5,5-dimethyl-3,4,5,6,7,8,9,10-octahydrobenzo[e]as-indacen-3-yl)(tert-butylamido)zirconium dichloride,
dimethylsilanediyl(η⁵-5,5-dimethyl-3,4,5,6,7,8,9,10-octahydrobenzo[e]as-indacen-3-yl)(tert-butylamido)hafnium dichloride,
dimethylsilanediyl(η⁵-5,5-dimethyl-3,4,5,6,7,8,9,10-octahydrobenzo[e]as-indacen-3-yl)(tert-butylamido)titanium dimethyl,
dimethylsilanediyl(η⁵-5,5-dimethyl-3,4,5,6,7,8,9,10-octahydrobenzo[e]as-indacen-3-yl)(tert-butylamido)zirconium dimethyl,
dimethylsilanediyl(η⁵-5,5-dimethyl-3,4,5,6,7,8,9,10-octahydrobenzo[e]as-indacen-3-yl)(tert-butylamido)hafnium dimethyl,
dimethylsilanediyl(η⁵-5,5-dimethyl-3,4,5,6,7,8,9,10-octahydrobenzo[e]as-indacen-3-yl)(adamantylamido)titanium dimethyl,
dimethylsilanediyl(η⁵-5,5-dimethyl-3,4,5,6,7,8,9,10-octahydrobenzo[e]as-indacen-3-yl)(cyclohexylamido)titanium dimethyl,
dimethylsilanediyl(η⁵-5,5-dimethyl-3,4,5,6,7,8,9,10-octahydrobenzo[e]as-indacen-3-yl)(cyclooctylamido)titanium dimethyl,
dimethylsilanediyl(η⁵-5,5-dimethyl-3,4,5,6,7,8,9,10-octahydrobenzo[e]as-indacen-3-yl)(cyclodecylamido)titanium dimethyl,
dimethylsilanediyl(η⁵-5,5-dimethyl-3,4,5,6,7,8,9,10-octahydrobenzo[e]as-indacen-3-yl)(cyclododecylamido)titanium dimethyl,
dimethylsilanediyl(η⁵-5,5-dimethyl-3,4,5,6,7,8,9,10-octahydrobenzo[e]as-indacen-3-yl)(neopentylamido)titanium dimethyl,
dimethylsilanediyl(η⁵-5,5-dimethyl-3,4,5,6,7,8,9,10-octahydrobenzo[e]as-indacen-3-yl)(trimethylsilylmethanamido)titanium dimethyl,
dimethylsilanediyl(η⁵-2,5,5-trimethyl-3,4,5,6,7,8,9,10-octahydrobenzo[e]as-indacen-3-yl)(adamantylamido)titanium dimethyl,
dimethylsilanediyl(η⁵-2,5,5-trimethyl-3,4,5,6,7,8,9,10-octahydrobenzo[e]as-indacen-3-yl)(cyclohexylamido)titanium dimethyl,
dimethylsilanediyl(η⁵-2,5,5-trimethyl-3,4,5,6,7,8,9,10-octahydrobenzo[e]as-indacen-3-yl)(cyclooctylamido)titanium dimethyl,
dimethylsilanediyl(η⁵-2,5,5-trimethyl-3,4,5,6,7,8,9,10-octahydrobenzo[e]as-indacen-3-yl)(cyclodecylamido)titanium dimethyl,
dimethylsilanediyl(η⁵-2,5,5-trimethyl-3,4,5,6,7,8,9,10-octahydrobenzo[e]as-indacen-3-yl)(cyclododecylamido)titanium dimethyl,
dimethylsilanediyl(η⁵-2,5,5-trimethyl-3,4,5,6,7,8,9,10-octahydrobenzo[e]as-indacen-3-yl)(neopentylamido)titanium dimethyl, dimethylsilanediyl($\eta^5$-2,5,5-trimethyl-3,4,5,6,7,8,9,10-octahydrobenzo[e]as-indacen-3-yl)(trimethylsilylmethanamido)titanium dimethyl,
rac-dimethylsilanediylbis[$\eta^5$-2,5,5-trimethyl-3,4,5,6,7,8,9,10-octahydrobenzo[e]as-indacen-3-yl]zirconium dichloride,
rac-dimethylsilanediylbis[$\eta^5$-2,5,5-trimethyl-3,4,5,6,7,8,9,10-octahydrobenzo[e]as-indacen-3-yl]hafnium dichloride,
rac-dimethylsilanediylbis[$\eta^5$-2,5,5-trimethyl-3,4,5,6,7,8,9,10-octahydrobenzo[e]as-indacen-3-yl]zirconium dimethyl,
rac-dimethylsilanediylbis[$\eta^5$-2,5,5-trimethyl-3,4,5,6,7,8,9,10-octahydrobenzo[e]as-indacen-3-yl]hafnium dimethyl,
rac-dimethylsilanediylbis[$\eta^5$-5,5-dimethyl-3,4,5,6,7,8,9,10-octahydrobenzo[e]as-indacen-3-yl]zirconium dichloride,
rac-dimethylsilanediylbis[$\eta^5$-5,5-dimethyl-3,4,5,6,7,8,9,10-octahydrobenzo[e]as-indacen-3-yl]hafnium dichloride,
rac-dimethylsilanediylbis[$\eta^5$-5,5-dimethyl-3,4,5,6,7,8,9,10-octahydrobenzo[e]as-indacen-3-yl]zirconium dimethyl,
rac-dimethylsilanediylbis[$\eta^5$-5,5-dimethyl-3,4,5,6,7,8,9,10-octahydrobenzo[e]as-indacen-3-yl]hafnium dimethyl,
rac-dimethylsilanediylbis[$\eta^5$-4,5,6,7,8,9,10,11-octahydro-cyclopenta[l]phenanthren-1-yl]zirconium dichloride,
rac-dimethylsilanediylbis[$\eta^5$-4,5,6,7,8,9,10,11-octahydro-cyclopenta[l]phenanthren-1-yl]hafnium dichloride,
rac-dimethylsilanediylbis[$\eta^5$-4,5,6,7,8,9,10,11-octahydro-cyclopenta[l]phenanthren-1-yl]zirconium dimethyl,
rac-dimethylsilanediylbis[$\eta^5$-4,5,6,7,8,9,10,11-octahydro-cyclopenta[l]phenanthren-1-yl]hafnium dimethyl,
rac-dimethylsilanediylbis[$\eta^5$-2-methyl-4,5,6,7,8,9,10,11-octahydro-cyclopenta[l]phenanthren-1-yl]zirconium dichloride,
rac-dimethylsilanediylbis[$\eta^5$-2-methyl-4,5,6,7,8,9,10,11-octahydro-cyclopenta[l]phenanthren-1-yl]hafnium dichloride,
rac-dimethylsilanediylbis[$\eta^5$-2-methyl-4,5,6,7,8,9,10,11-octahydro-cyclopenta[l]phenanthren-1-yl]zirconium dimethyl,
rac-dimethylsilanediylbis[$\eta^5$-2-methyl-4,5,6,7,8,9,10,11-octahydro-cyclopenta[l]phenanthren-1-yl]hafnium dimethyl,
dimethylsilanediyl($\eta^5$-2-methyl-4,5,6,7,8,9,10,11-octahydro-cyclopenta[l]phenanthren-1-yl)(tert-butylamido)titanium dichloride,
dimethylsilanediyl($\eta^5$-2-methyl-4,5,6,7,8,9,10,11-octahydro-cyclopenta[l]phenanthren-1-yl)(tert-butylamido)zirconium dichloride,
dimethylsilanediyl($\eta^5$-2-methyl-4,5,6,7,8,9,10,11-octahydro-cyclopenta[l]phenanthren-1-yl)hafnium dichloride,
dimethylsilanediyl($\eta^5$-2-methyl-4,5,6,7,8,9,10,11-octahydro-cyclopenta[l]phenanthren-1-yl)(tert-butylamido)titanium dimethyl,
dimethylsilanediyl($\eta^5$-2-methyl-4,5,6,7,8,9,10,11-octahydro-cyclopenta[l]phenanthren-1-yl)(tert-butylamido)zirconium dimethyl,
dimethylsilanediyl($\eta^5$-2-methyl-4,5,6,7,8,9,10,11-octahydro-cyclopenta[l]phenanthren-1-yl)(tert-butylamido)hafnium dimethyl,
dimethylsilanediyl($\eta^5$-4,5,6,7,8,9,10,11-octahydro-cyclopenta[l]phenanthren-1-yl)(tert-butylamido)titanium dichloride,
dimethylsilanediyl($\eta^5$-4,5,6,7,8,9,10,11-octahydro-cyclopenta[l]phenanthren-1-yl)(tert-butylamido)zirconium dichloride,
dimethylsilanediyl($\eta^5$-4,5,6,7,8,9,10,11-octahydro-cyclopenta[l]phenanthren-1-yl)(tert-butylamido)hafnium dichloride,
dimethylsilanediyl($\eta^5$-4,5,6,7,8,9,10,11-octahydro-cyclopenta[l]phenanthren-1-yl)(tert-butylamido)titanium dimethyl,
dimethylsilanediyl($\eta^5$-4,5,6,7,8,9,10,11-octahydro-cyclopenta[l]phenanthren-1-yl)(tert-butylamido)zirconium dimethyl,
dimethylsilanediyl($\eta^5$-4,5,6,7,8,9,10,11-octahydro-cyclopenta[l]phenanthren-1-yl)(tert-butylamido)hafnium dimethyl,
dimethylsilanediyl($\eta^5$-4,5,6,7,8,9,10,11-octahydro-cyclopenta[l]phenanthren-1-yl)(adamantylamido)titanium dimethyl,
dimethylsilanediyl($\eta^5$-4,5,6,7,8,9,10,11-octahydro-cyclopenta[l]phenanthren-1-yl)(cyclohexylamido)titanium dimethyl,
dimethylsilanediyl($\eta^5$-4,5,6,7,8,9,10,11-octahydro-cyclopenta[l]phenanthren-1-yl)(cyclooctylamido)titanium dimethyl,
dimethylsilanediyl($\eta^5$-4,5,6,7,8,9,10,11-octahydro-cyclopenta[l]phenanthren-1-yl)(cyclodecylamido)titanium dimethyl,
dimethylsilanediyl($\eta^5$-4,5,6,7,8,9,10,11-octahydro-cyclopenta[l]phenanthren-1-yl)(cyclododecylamido)titanium dimethyl,
dimethylsilanediyl($\eta^5$-4,5,6,7,8,9,10,11-octahydro-cyclopenta[l]phenanthren-1-yl)(neopentylamido)titanium dimethyl,
dimethylsilanediyl($\eta^5$-4,5,6,7,8,9,10,11-octahydro-cyclopenta[l]phenanthren-1-yl)(trimethylsilylmethanamido)titanium dimethyl,
dimethylsilanediyl($\eta^5$-2-methyl-4,5,6,7,8,9,10,11-octahydro-cyclopenta[l]phenanthren-1-yl)(adamantylamido) titanium dimethyl,
dimethylsilanediyl($\eta^5$-2-methyl-4,5,6,7,8,9,10,11-octahydro-cyclopenta[l]phenanthren-1-yl)(cyclohexylamido) titanium dimethyl,
dimethylsilanediyl($\eta^5$-2-methyl-4,5,6,7,8,9,10,11-octahydro-cyclopenta[l]phenanthren-1-yl)(cyclooctylamido) titanium dimethyl,
dimethylsilanediyl($\eta^5$-2-methyl-4,5,6,7,8,9,10,11-octahydro-cyclopenta[l]phenanthren-1-yl)(cyclodecylamido) titanium dimethyl,
dimethylsilanediyl($\eta^5$-2-methyl-4,5,6,7,8,9,10,11-octahydro-cyclopenta[l]phenanthren-1-yl)(cyclododecylamido)titanium dimethyl,
dimethylsilanediyl($\eta^5$-2-methyl-4,5,6,7,8,9,10,11-octahydro-cyclopenta[l]phenanthren-1-yl)(neopentylamido) titanium dimethyl,
dimethylsilanediyl($\eta^5$-2-methyl-4,5,6,7,8,9,10,11-octahydro-cyclopenta[l]phenanthren-1-yl)(trimethylsilylmethanamido)titanium dimethyl, and the like.

In a preferred embodiment in any of the processes described herein one catalyst compound is used, e.g. the catalyst compounds are not different. For purposes of this invention one catalyst compound is considered different from another if they differ by at least one atom. For example "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes if this invention, e.g., rac-dimethylsilylbis(2-methyl 4-phenyl)hafnium dimethyl is considered to be the same as meso-dimethylsilylbis(2-methyl 4-phenyl)hafnium dimethyl.

In some embodiments, two or more different catalyst compounds are present in the catalyst system used herein. In some embodiments, two or more different catalyst compounds are present in the reaction zone where the process(es) described herein occur. When two transition metal compound based catalysts are used in one reactor as a mixed catalyst system, the two transition metal compounds are preferably chosen such that the two are compatible. A simple screening method such as by $^1$H or $^{13}$C NMR, known to those of ordinary skill in the art, can be used to determine which transition metal compounds are compatible. It is preferable to use the same activator for the transition metal compounds, however, two different activators, such as a non-coordinating anion activator and an alumoxane, can be used in combination. If one or more transition metal compounds contain an X ligand which is not a hydride, hydrocarbyl, or substituted hydrocarbyl, then the alumoxane is typically contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds.

There are two general synthetic methods for the preparation of metal complexes of Formulas (1), (2a), (2b), (3a), (3b), (4a) and (4b). The first method involves a transmetallation reaction between a metal halide (MX$_n$) and either a salt or non-transition metal derivative of the ligand HA-T$_y$-LH. Preferable metal halides include TiCl$_4$, TiCl$_3$, ZrCl$_4$, ZrBr$_4$, ZrI$_4$, HfCl$_4$, LnCl$_3$, LnBr$_3$, LnI$_3$ (where Ln is Sc, Y, La, or lanthanide group metal), VCl$_3$, NbCl$_5$, TaCl$_5$, CrCl$_3$, MoCl$_5$, WCl$_6$, and the like. Preferable salts (M'X'$_p$ salts) of monocyclic or polycyclic arenes include Li, Na, K, Tl, and Mg salts, and the like. Preferable non-transition metal derivatives of monocyclic or polycyclic arenes include Si and Sn derivatives, and the like (Q derivatives). Two general examples of this first synthetic method are shown below.

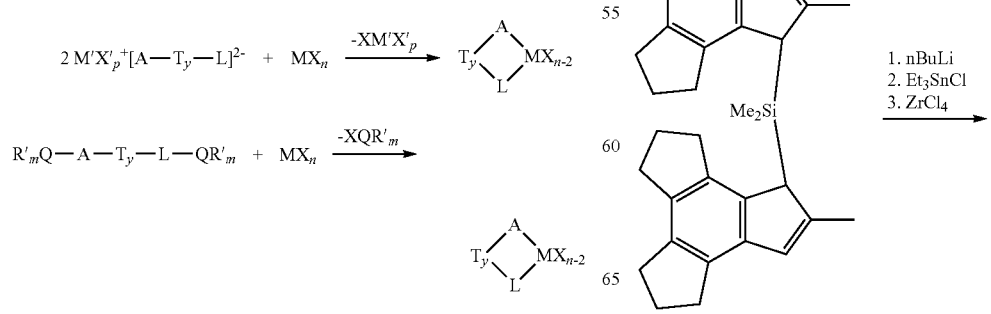

The following three representative examples further illustrate this method.

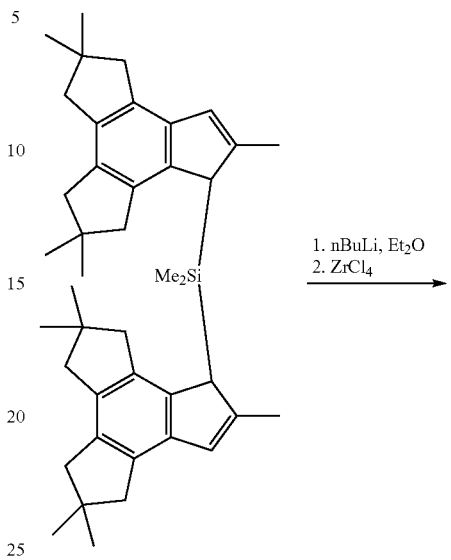

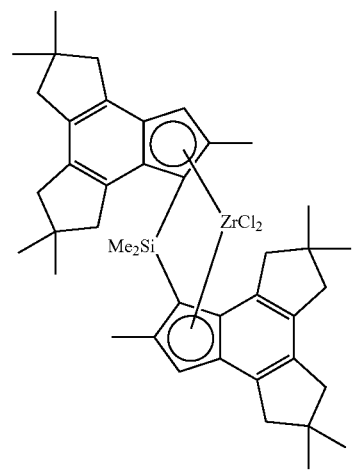

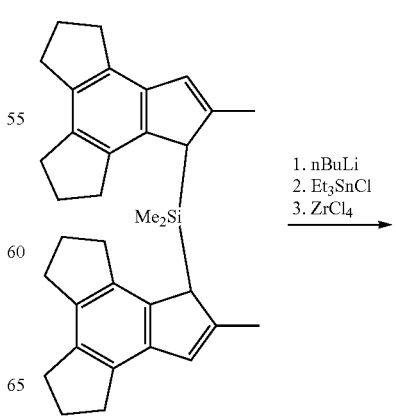

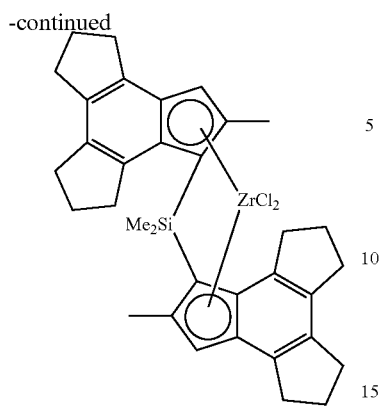

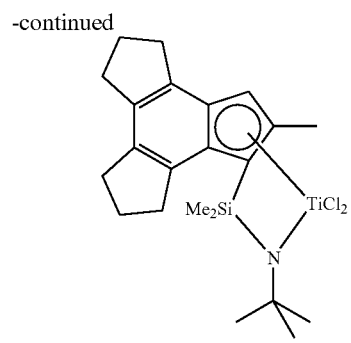

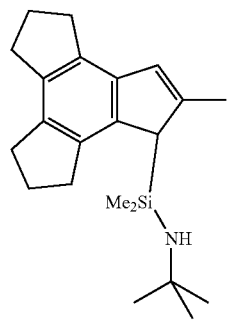

The second general procedure involves metalation of the compounds of the following general formula HA-T$_y$-LH by the respective transition metal derivatives, as shown below.

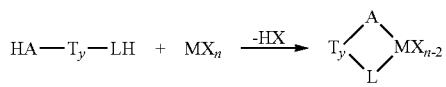

The following representative example illustrates this method.

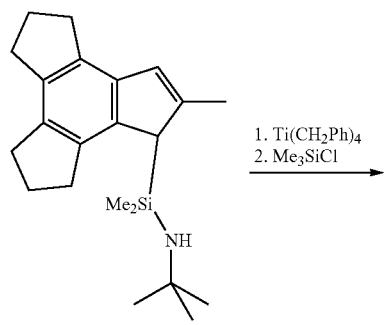

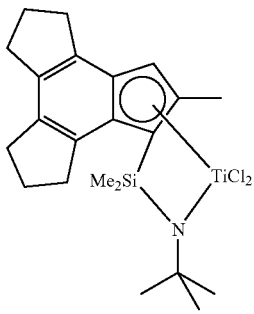

Activators

The terms "cocatalyst" and "activator" are used herein interchangeably.

The catalyst systems described herein typically comprises a catalyst complex, such as the transition metal or Lanthanide bis(phenolate) complexes described above, and an activator such as alumoxane or a non-coordinating anion. These catalyst systems may be formed by combining the catalyst components described herein with activators in any manner known from the literature. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, ionizing activators, which may be neutral or ionic, and conventional-type cocatalysts. Preferred activators typically include alumoxane compounds, modified alumoxane compounds, and ionizing anion precursor compounds that abstract a reactive metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), typically the maximum amount of activator is at up to a 5,000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced, typically by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (III):

$$(Z)_d^+(A^{d-}) \quad (III)$$

wherein Z is (L'-H) or a reducible Lewis Acid, L' is an neutral Lewis base; H is hydrogen; (L'-H)$^+$ is a Bronsted acid; A$^{d-}$ is a non-coordinating anion having the charge d−; and d is an integer from 1 to 3 (such as 1, 2 or 3). Optionally, Z is (Ar$_3$C$^+$), where Ar is aryl or aryl substituted with a heteroatom, a $C_1$ to $C_{40}$ hydrocarbyl, or a substituted $C_1$ to $C_{40}$ hydrocarbyl. The anion component A$^{d-}$ includes those having the formula [M$^{k+}$Q$_n$]$^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 30, such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable A$^{d-}$ also include diboron compounds as disclosed in U.S. Pat. No. 5,447,895, which is fully incorporated herein by reference.

When Z is the activating cation (L'-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

$$[R^{1'}R^{2'}R^{3'}EH]_{d^+}[Mt^{k+}Q_n]^{d-} \quad (V)$$

wherein:
E is nitrogen or phosphorous;
d is 1, 2 or 3; k is 1, 2, or 3; n is 1, 2, 3, 4, 5, or 6; n−k=d (preferably d is 1, 2 or 3; k is 3; n is 4, 5, or 6);
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups,
wherein $R^{1'}$, $R^{2'}$, and $R^{3'}$ together comprise 15 or more carbon atoms;
Mt is an element selected from group 13 of the Periodic Table of the Elements, such as B or Al; and
each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

$$[R^{1'}R^{2'}R^{3'}EH]^+[BR^{4'}R^{5'}R^{6'}R^{7'}]^- \quad (VI)$$

wherein: E is nitrogen or phosphorous; $R^{1'}$ is a methyl group; $R^{2'}$ and $R^{3'}$ are independently is $C_4$-$C_{50}$ hydrocarbyl group optionally substituted with one or more alkoxy groups, silyl groups, a halogen atoms, or halogen containing groups wherein $R^{2'}$ and $R^{3'}$ together comprise 14 or more carbon atoms; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

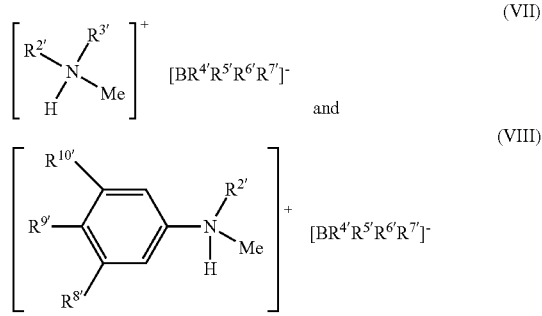

wherein:

N is nitrogen;

$R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms;

$R^{8'}$, $R^{9'}$, and $R^{10'}$ are independently a $C_4$-$C_{30}$ hydrocarbyl or substituted $C_4$-$C_{30}$ hydrocarbyl group;

B is boron;

and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII) or (VIII) herein, $R^{4'}$, $R^{5'}$, $R^{6'}$, and $R^{7'}$ are pentafluorophenyl.

Optionally, in any of Formulas (V), (VI), (VII) or (VIII) herein, $R^{4'}$, $R^{5'}$, $R^{6'}$, and $R^{7'}$ are pentafluoronaphthalenyl.

Optionally, in any embodiment of Formula (VIII) herein, $R^{8'}$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{1'}$, $R^{6'}$, and $R^{1'}$ is an aryl group (such as phenyl or naphthalenyl), wherein at least one of $R^{4'}$, $R^{8'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably R 2' is not an optionally substituted $C_1$-$C_{40}$ linear alkyl group (alternately when Q is a substituted phenyl group, then $R^{2'}$ is not a $C_1$-$C_{40}$ linear alkyl group, preferably $R^2$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$ is not methyl, $R^{2'}$ is not $C_{18}$ alkyl and $R^{3'}$ is not $C_{18}$ alkyl, alternately $R^{1'}$ is not methyl, $R^{2'}$ is not $C_{18}$ alkyl and $R^{3'}$ is not $C_{15}$ alkyl and at least one Q is not substituted phenyl, optionally all Q are not substituted phenyl.

Useful cation components in Formulas (III) and (V) to (VIII) include those represented by the formula:

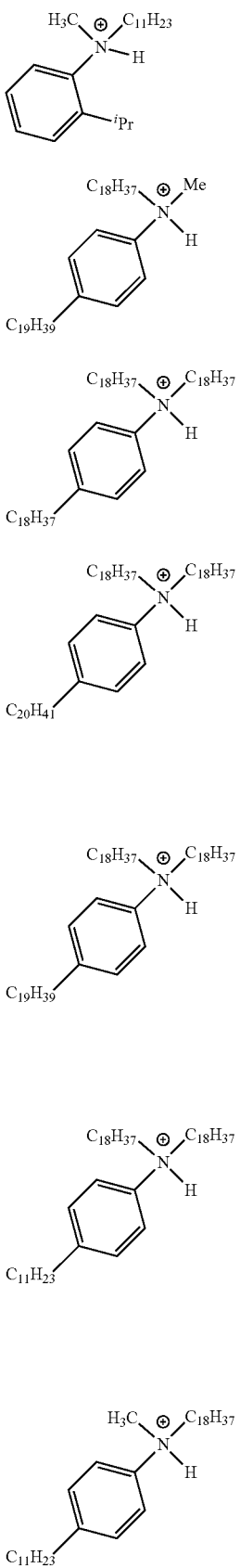

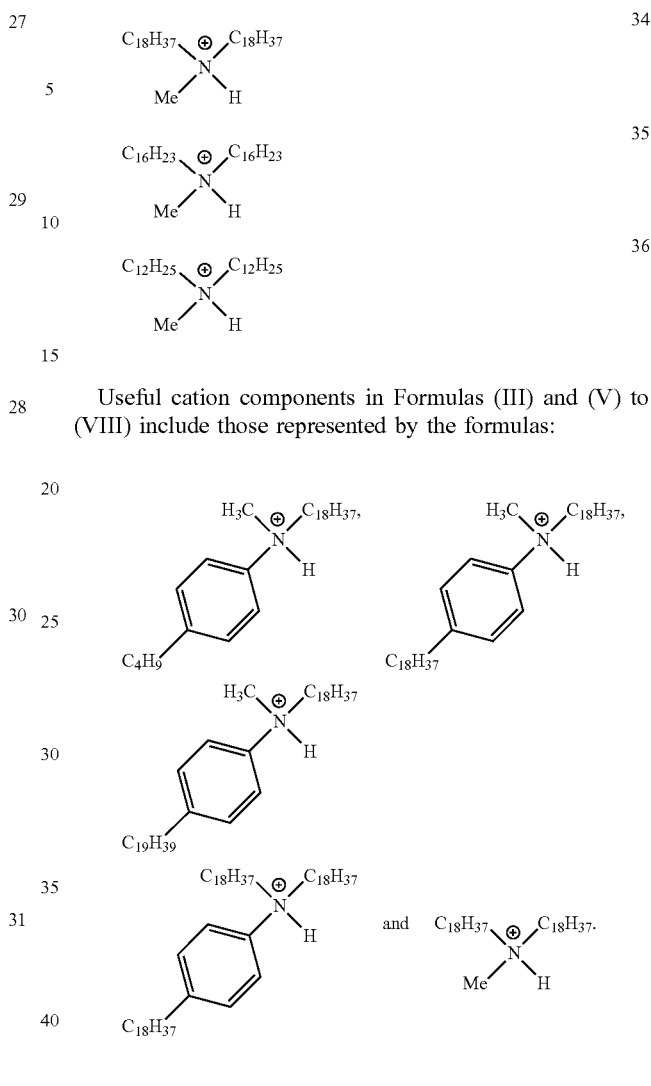

Useful cation components in Formulas (III) and (V) to (VIII) include those represented by the formulas:

The anion component of the activators described herein includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the provision that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphthalen-2-yl)borate.

In one embodiment, the borate activator comprises tetrakis(pentafluorophenyl)borate.

Anions for use in the non-coordinating anion activators described herein also include those represented by Formula (7), below:

Formula (7)

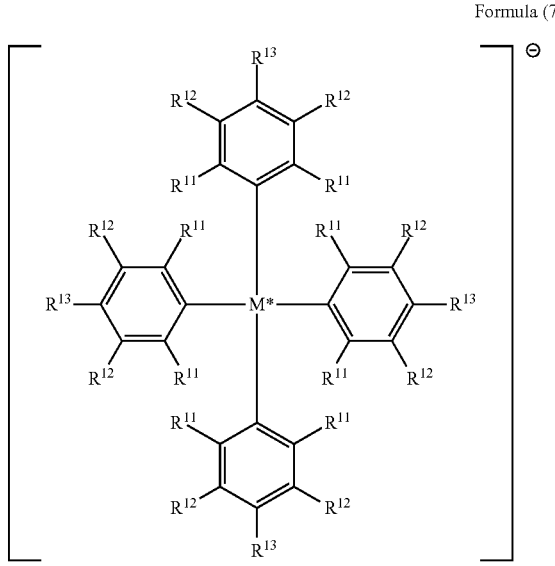

wherein:
M* is a group 13 atom, preferably B or Al, preferably B;
each $R^{11}$ is, independently, a halide, preferably a fluoride;
each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;
each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;
wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic A.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," *Journal of Chemical Education*, v. 71(11), November 1994, pp. 962-964. Molecular volume (MV), in units of cubic A, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 $Å^3$, and the Calculated Total MV for tetrakis(perfluorophenyl)borate is four times 183 $Å^3$, or 732 $Å^3$.

TABLE A

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | $V_S$ | MV Per subst. ($Å^3$) | Calculated Total MV ($Å^3$) |
| --- | --- | --- | --- | --- | --- |
| tetrakis(perfluorophenyl)borate | | $C_6F_5$ | 22 | 183 | 732 |
| tris(perfluorophenyl)-(perfluoronaphthalenyl)borate | | $C_6F_5$ $C_{10}F_7$ | 22 34 | 183 261 | 810 |

TABLE B-continued

| Ion | Structure of Boron Substituents | Molecular Formula of Each Substituent | $V_S$ | MV Per subst. (Å³) | Calculated Total MV (Å³) |
|---|---|---|---|---|---|
| (perfluorophenyl)tris-(perfluoronaphthalenyl)borate | 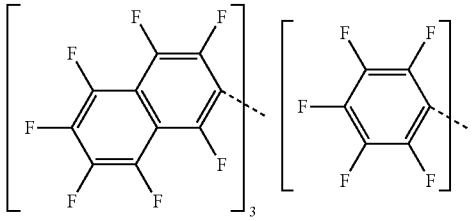 | $C_6F_5$<br>$C_{10}F_7$ | 22<br>34 | 183<br>261 | 966 |
| tetrakis(perfluoronaphthalenyl)borate | 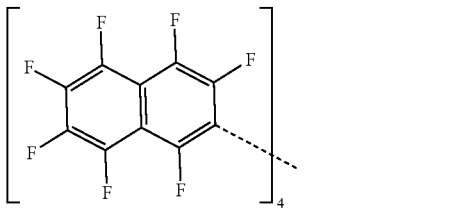 | $C_{10}F_7$ | 34 | 261 | 1044 |
| tetrakis(perfluorobiphenyl)borate | 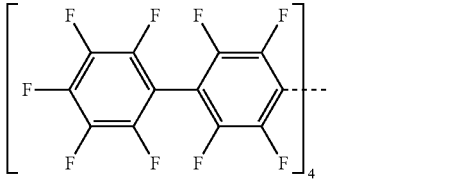 | $C_{12}F_9$ | 42 | 349 | 1396 |
| $[(C_6F_3(C_6F_5)_2)_4B]$ | 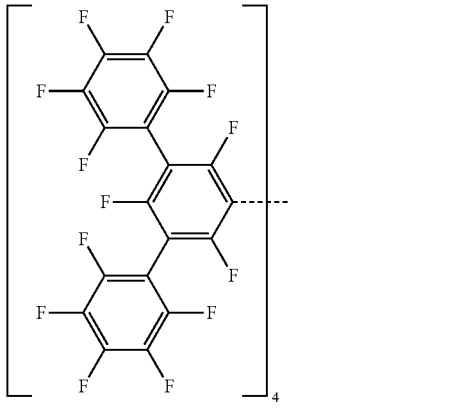 | $C_{18}F_{13}$ | 62 | 515 | 2060 |

The activators may be added to a polymerization in the form of an ion pair using, for example, [M2HTH]+[NCA]− in which the di(hydrogenated tallow)methylamine ("M2HTH") cation reacts with a basic leaving group on the transition metal complex to form a transition metal complex cation and [NCA]−. Alternatively, the transition metal complex may be reacted with a neutral NCA precursor, such as $B(C_6F_5)_3$, which abstracts an anionic group from the complex to form an activated species. Useful activators include di(hydrogenated tallow)methylammonium[tetrakis(pentafluorophenyl)borate] (i.e., [M2HTH]$B(C_6F_5)_4$) and di(octadecyl)tolylammonium [tetrakis(pentafluorophenyl)borate] (i.e., [DOdTH]$B(C_6F_5)_4$).

Activator compounds that are particularly useful in this invention include one or more of: N,N-di(hydrogenated tallow)methylammonium [tetrakis(perfluorophenyl) borate], N-methyl-4-nonadecyl-N-octadecylanilinium [tetrakis(perfluorophenyl)borate], N-methyl-4-hexadecyl-N-octadecylanilinium [tetrakis(perfluorophenyl)borate], N-methyl-4-tetradecyl-N-octadecylanilinium [tetrakis(perfluorophenyl)borate], N-methyl-4-dodecyl-N-octadecylanilinium [tetrakis(perfluorophenyl)borate], N-methyl-4-decyl-N-octadecylanilinium [tetrakis(perfluorophenyl)borate], N-methyl-4-octyl-N-octadecylanilinium [tetrakis(perfluorophenyl)borate], N-methyl-4-hexyl-N-octadecylanilinium [tetrakis(perfluorophenyl)borate], N-methyl-4-butyl-N-octadecylanilinium [tetrakis(perfluorophenyl)borate], N-methyl-4-octadecyl-N-decylanilinium [tetrakis(perfluorophenyl)borate], N-methyl-4-nonadecyl-N-dodecylanilinium [tetrakis(perfluorophenyl)borate], N-methyl-4-nonadecyl-N-tetradecylanilinium [tetrakis(perfluorophenyl) borate], N-methyl-4-nonadecyl-N-hexadecylanilinium [tetrakis(perfluorophenyl)borate], N-ethyl-4-nonadecyl-N-octadecylanilinium [tetrakis(perfluorophenyl)borate], N-methyl-N,N-dioctadecylammonium [tetrakis(perfluorophenyl)borate], N-methyl-N,N-dihexadecylammonium [tetrakis(perfluorophenyl)borate], N-methyl-N,N-ditetradecylammonium [tetrakis(perfluorophenyl)borate], N-methyl-N,N-didodecylammonium [tetrakis(perfluorophenyl)borate], N-methyl-N,N-didecylammonium [tetrakis(perfluorophenyl)borate], N-methyl-N,N-dioctylammonium [tetrakis(perfluorophenyl)borate], N-ethyl-N,N-dioctadecylammonium [tetrakis(perfluorophenyl)borate], N,N-di(octadecyl)tolylammonium [tetrakis(perfluorophenyl)borate], N,N-di(hexadecyl)tolylammonium [tetrakis(perfluorophenyl)borate], N,N-di(tetradecyl)tolylammonium [tetrakis(perfluorophenyl)borate], N,N-di(dodecyl)tolylammonium [tetrakis(perfluorophenyl)borate], N-octadecyl-N-hexadecyl-tolylammonium [tetrakis(perfluorophenyl)borate], N-octadecyl-N-hexadecyl-tolylammonium [tetrakis(perfluorophenyl)borate], N-octadecyl-N-tetradecyl-tolylammonium [tetrakis(perfluorophenyl)borate], N-octadecyl-N-dodecyl-tolylammonium [tetrakis(perfluorophenyl)borate], N-octadecyl-N-decyl-tolylammonium [tetrakis(perfluorophenyl)borate], N-hexadecyl-N-tetradecyl-tolylammonium [tetrakis(perfluorophenyl)borate], N-hexadecyl-N-dodecyl-tolylammonium [tetrakis(perfluorophenyl)borate], N-hexadecyl-N-decyl-tolylammonium [tetrakis(perfluorophenyl)borate], N-tetradecyl-N-dodecyl-tolylammonium [tetrakis(perfluorophenyl)borate], N-tetradecyl-N-decyl-tolylammonium [tetrakis(perfluorophenyl)borate], N-dodecyl-N-decyl-tolylammonium [tetrakis(perfluorophenyl)borate], N-methyl-N-octadecylanilinium [tetrakis(perfluorophenyl)borate], N-methyl-N-hexadecylanilinium [tetrakis(perfluorophenyl)borate], N-methyl-N-tetradecylanilinium [tetrakis(perfluorophenyl)borate], N-methyl-N-dodecylanilinium [tetrakis(perfluorophenyl)borate], N-methyl-N-decylanilinium [tetrakis(perfluorophenyl)borate], and N-methyl-N-octylanilinium [tetrakis(perfluorophenyl)borate].

Additional useful activators and the synthesis non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred activators for use herein also include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalenyl)borate, N,N-dimethylanilinium tetrakis(perfluoronaphthalenyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis(perfluoronaphthalenyl)borate, N,N-dimethyl-(2,4,6-trimethylanilinium) tetrakis(pentafluorophenyl)borate, trialkylammonium tetrakis-(2,3,4,6-tetrafluorophenyl)borate, N,N-dialkylanilinium tetrakis-(2,3,4,6-tetrafluorophenyl)borate, trialkylammonium tetrakis(perfluoronaphthalenyl)borate, N,N-dialkylanilinium tetrakis(perfluoronaphthalenyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 (the disclosures of which are incorporated herein by reference in their entirety) which discuss the use of an alumoxane in combination with an ionizing activator).

Particularly useful activators include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of particularly useful activators that can be used in the practice of this invention may be found at page 72, paragraph [00177] to page 74, paragraph [00178] of WO 2004/046214.

Particularly useful activators include those disclosed in US 2019/0330139 and US 2019/0330392.

Optional Scavengers, Co-Activators, Chain Transfer Agents

In addition to activator compounds, scavengers or co-activators may be used. Aluminum or zinc alkyls or organoaluminum or organozinc compounds may be utilized as scavengers or co-activators and include, for example, trimethylaluminum, triethylaluminum, triisobutylaluminum, tri-n-hexylaluminum, tri-n-octylaluminum, and diethyl zinc.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Chain transfer agents may be used in the compositions and or processes described herein. Useful chain transfer agents are typically alkylalumoxanes, a compound represented by the formula $AlR_3$, $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 μm. More preferably, the surface area of the support material is in the range of from about 50 to about 500 $m^2/g$, pore volume of from about 0.5 to about 3.5 cc/g and average particle size of from about 10 to about 200 m. Most preferably the surface area of the support material is in the range is from about 100 to about 400 $m^2/g$, pore volume from about 0.8 to about 3.0 cc/g and average particle size is from about 5 to about 100 μm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Preferred silicas are marketed under the tradenames of DAVISON™ 952 or DAVISON™ 955 by the Davison Chemical Division of W.R. Grace and Company. In other embodiments DAVISON™ 948 is used.

The support material should be dry, that is, free of absorbed water. Drying of the support material can be effected by heating or calcining at about 100° C. to about 1,000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

In embodiments herein, the invention relates to polymerization processes where monomer (such as propylene), and optionally comonomer, are contacted with a catalyst system comprising an activator and at least one catalyst compound, as described above. The catalyst compound and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %. Typically, a bulk process is one where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

In another embodiment, the process is a solution process. A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, *Ind. Eng. Chem. Res.*, v. 9, 2000, pg. 4627.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 110° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In an alternate embodiment, the activity of the catalyst is at least 500 g/mmol/hour, preferably 5,000 or more g/mmol/hour, preferably 50,000 or more g/mmol/hr, preferably 100,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In a preferred embodiment, little or no scavenger is used in the process to produce the ethylene polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, little or no aromatic solvent, such as toluene, is used in the process to produce the polymers. Preferably, aromatic solvent, such as toluene, is present at zero mol %, alternately the aromatic solvent, such as toluene, is present at a molar ratio of solvent to transition metal less than 500:1, preferably less than 300:1, preferably less than 100:1, preferably less than 1:1.

In a preferred embodiment, the polymerization:

1) is conducted at temperatures of 0 to 300° C. (preferably 25 to 150° C., preferably 40 to 120° C., preferably 45 to 110° C.);

2) is conducted at a pressure of atmospheric pressure to 16 MPa (preferably 0.35 to 16 MPa, preferably from 0.45 to 10 MPa, preferably from 0.5 to 6 MPa);

3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are preferably present in the solvent at less than 1 wt %, preferably less than 0.5 wt %, preferably at 0 wt % based upon the weight of the solvents);

4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1;

5) wherein the catalyst system used in the polymerization comprises less than 0.5 mol %, preferably 0 mol % aromatic solvent (such as toluene), alternately the aromatic solvent (such as toluene) is present at a molar ratio of aromatic solvent to transition metal less than 500:1, preferably less than 300:1, preferably less than 100:1, preferably less than 1:1;

6) the polymerization preferably occurs in one reaction zone;

7) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr);

8) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 9) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof).

Polyolefin Products

This invention also relates to compositions of matter produced by the methods described herein.

In a preferred embodiment, the process described herein produces propylene homopolymers or propylene copolymers, such as propylene-ethylene and/or propylene-alphaolefin (preferably $C_3$ to $C_{20}$) copolymers (such as propylene-hexene copolymers or propylene-octene copolymers) having: a Mw/Mn of greater than 1 to 4 (preferably greater than 1 to 3).

Likewise, the process of this invention produces olefin polymers, preferably polyethylene and polypropylene homopolymers and copolymers. In a preferred embodiment, the polymers produced herein are homopolymers of ethylene or propylene, are copolymers of ethylene preferably having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mole % (alternately from 0.5 to 20 mole %, alternately from 1 to 15 mole %, preferably from 3 to 10 mole %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 1 to 15 mole % hexene, alternately 1 to 10 mole %.

In a preferred embodiment, the monomer is ethylene and the comonomer is octene, preferably from 1 to 20 mole % octene, alternately 1 to 15 mole %, alternatively 1 to 10 mole %.

Typically, the polymers produced herein have an Mw of 5,000 to 5,000,000 g/mol (preferably 25,000 to 2,500,000 g/mol, preferably 50,000 to 1,000,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In a preferred embodiment the copolymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 1993/003093, published Feb. 18, 1993, specifically columns 7 and 8, as well as in Wild et al, *J. Poly. Sci., Poly. Phys. Ed.*, v. 20, p. 441 (1982) and U.S. Pat. No. 5,008,204, including that fractions having a weight average molecular weight (Mw) below 15,000 g/mol are ignored when determining CDBI. A homopolymer is defined to have a CDBI of 100%.

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOXT™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

In another embodiment, this invention relates to:
1. A transition metal compound represented by the Formula (1):

$$T_y LAMX_{n-2} \tag{1}$$

wherein:

M is a group 3-6 metal; n is the oxidation state of M (preferably 2, 3, 4, or 5);

A is a substituted or unsubstituted polycyclic arenyl ligand bonded to M wherein the polycyclic ligand contains an indenyl fragment with two partially unsaturated rings annulated to the phenyl ring of the indenyl ligand fragment;

L is substituted or unsubstituted monocyclic or polycyclic arenyl ligand bonded to M, or a substituted or unsubstituted monocyclic or polycyclic heteroarenyl ligand bonded to M, or is represented by the formula: $JR'_{z-y}$ where J is a group 15 or 16 heteroatom bonded to M, R' is a substituted or unsubstituted hydrocarbyl substituent bonded to J, and z is 2 when J is a group 15 heteroatom and z is 1 when J is a group 16 heteroatom;

T is a bridging group; y is 1 or 0, indicating the presence of absence of bridging group T;

each X is independently a univalent anionic ligand, or two Xs are joined and bound to the metal atom to form a metallocycle ring, or two Xs are joined to form a chelating ligand, a diene ligand, or an alkylidene ligand.

2. The transition metal compound of paragraph 1, wherein A is a substituted or unsubstituted hexahydro-cyclopenta[e]-as-indacenyl, octahydrobenzo[e]-as-indacenyl or octahydro-cyclopenta[l]phenanthrenyl ligand.

3. The transition metal compound of paragraph 1, wherein L is a substituted or unsubstituted cyclopentadienyl, indenyl, fluorenyl, cyclopenta[a]naphthalenyl (also called benz[e]indenyl), cyclopenta[b]naphthalenyl (also called benz[l]indenyl), tetrahydrocyclopenta[a]naphthalenyl, tetrahydrocyclopenta[b]naphthalenyl, tetrahydro-s-indacenyl, tetrahydro-as-indacenyl, hexahydro-cyclopenta[e]-as-indacenyl, octahydrobenzo[e]-as-indacenyl or octahydro-cyclopenta[l]phenanthrenyl ligand.

4. The transition metal compound of paragraph 1 wherein L is substituted or unsubstituted hydrocarbyl amido or hydrocarbyl phosphido, oxo (—O—), or thio (—S—) when y is 1, or is a substituted or unsubstituted dihydrocarbyl amido or dihydrocarbyl phosphido, hydrocarbyloxy, or hydrocarbylthio when y is 0.

5. The transition metal compound of paragraph 1 wherein, L is the same as A.

6. The transition metal compound of paragraph 1 wherein M is a group 4 metal.

7. A transition metal compound represented by Formula (2a) or (2b):

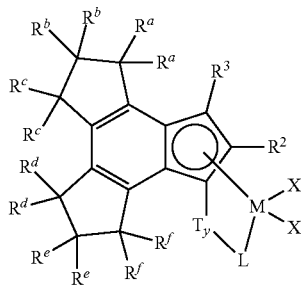

(2a)

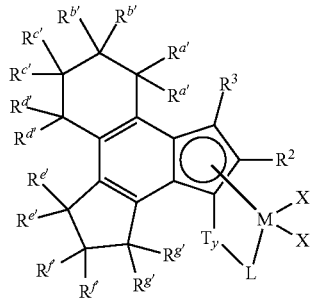

(2b)

wherein M is a group 4 metal;

L is a substituted or unsubstituted monocyclic or polycyclic arenyl ligand bonded to M, or a substituted or unsubstituted monocyclic or polycyclic heteroarenyl ligand bonded to M, or is represented by the formula JR'z-y where J is a group 15 or 16 heteroatom bonded to M, R' is a substituted or unsubstituted hydrocarbyl substituent bonded to J, and z is 2 when J is a group 15 heteroatom and z is 1 when J is a group 16 heteroatom;

T is a bridging group; y is 1 or 0, indicating the presence or absence of bridging group T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently $C_1$-$C_{10}$ alkyl, or hydrogen; and each X is independently a univalent anionic ligand, or two Xs are joined and bound to the metal atom to form a metallocycle ring, or two Xs are joined to form a chelating ligand, a diene ligand, or an alkylidene ligand.

8. The transition metal compound of any of the above paragraphs wherein, L is a substituted or unsubstituted cyclopentadienyl, indenyl, fluorenyl, and cyclopenta[a]naphthalenyl (also called benz[e]indenyl), cyclopenta[b]naphthalenyl (also called benz[m]indenyl), tetrahydrocyclopenta[a]naphthalenyl, tetrahydrocyclopenta[b]naphthalenyl, tetrahydro-s-indacenyl, tetrahydro-as-indacenyl, hexahydro-cyclopenta[e]-as-indacenyl, octahydrobenzo[e]-as-indacenyl and octahydro-cyclopenta[l]phenanthrenyl ligand.

9. The transition metal compound of any of the above paragraphs wherein, L is a substituted or unsubstituted hydrocarbyl amido or hydrocarbyl phosphido, oxo (—O—), or thio (—S—) when y is 1 or is substituted or unsubstituted dihydrocarbyl amido or dihydrocarbyl phosphido, hydrocarbyloxy, or hydrocarbylthio when y is 0.

10. A transition metal compound represented by Formula (4a) or (4b):

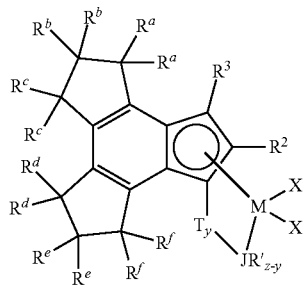

(4a)

-continued

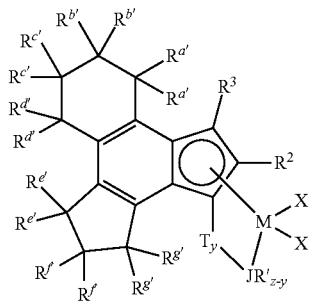

(4b)

wherein M is a group 4 metal;

T is a bridging group; y is 1 or 0, indicating the presence or absence of T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a\prime}$, $R^{b\prime}$, $R^{c\prime}$, $R^{d\prime}$, $R^{e\prime}$, $R^{f\prime}$, $R^{g\prime}$ is independently $C_1$-$C_{10}$ alkyl or hydrogen;

J is a group 15 or 16 heteroatom bonded to M;

R' is a substituted or unsubstituted hydrocarbyl substituent bonded to J, and z is 2 when J is a group 15 heteroatom and z is 1 when J is a group 16 heteroatom; and each X is independently a univalent anionic ligand, or two Xs are joined and bound to the metal atom to form a metallocycle ring, or two Xs are joined to form a chelating ligand, a diene ligand, or an alkylidene ligand.

11. The transition metal compound of any of paragraphs 1 to 10 wherein J is N, S, O or P.

12. The transition metal compound of any paragraphs 1 to 10 wherein R' is a $C_1$ to $C_{20}$ substituted or unsubstituted hydrocarbyl.

13. The transition metal compound of any of the above paragraphs 6 to 12 wherein each $R^a$, $R^b$, $R^c$, $R^d$, $R^e$, $R^f$, $R^{a\prime}$, $R^{b\prime}$, $R^{c\prime}$, $R^{d\prime}$, $R^{e\prime}$, $R^{f\prime}$, $R^{g\prime}$ is independently is independently hydrogen, methyl, ethyl, propyl, butyl, pentyl, hexyl, heptyl, octyl, nonyl, decyl, or an isomer thereof.

14. The transition metal compound of any of the above paragraphs 6 to 13 wherein M is Hf or Zr;

T is a bridging group; y is 1, indicating the presence T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a\prime}$, $R^{b\prime}$, $R^{c\prime}$, $R^{d\prime}$, $R^{e\prime}$, $R^{f\prime}$, $R^{g\prime}$ is independently hydrogen, methyl, ethyl, propyl, butyl, pentyl, hexyl, heptyl, octyl, nonyl, decyl, or an isomer thereof;

J is a N or P;

R' is a substituted or unsubstituted hydrocarbyl substituent bonded to J, and z is 2; and each X is, independently, selected from halides, aryls and $C_1$ to $C_{20}$ alkyl groups.

15. A transition metal compound represented by Formula (3a) or (3b):

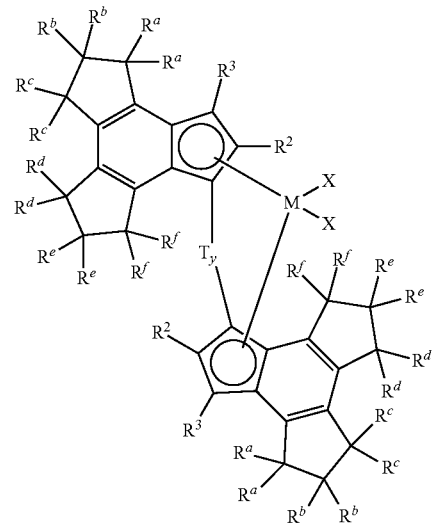

(3a)

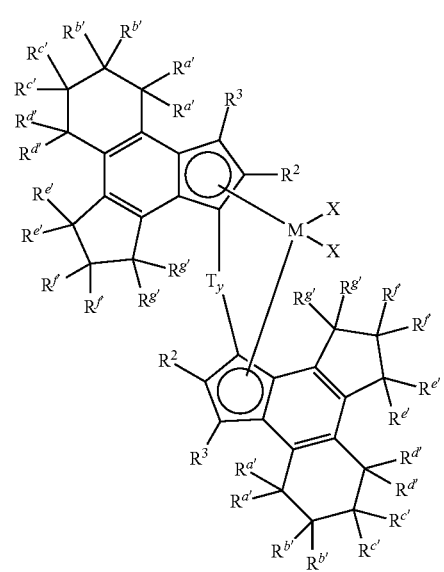

(3b)

wherein M is a group 4 metal;

T is a bridging group;

y is 1 or 0, indicating the presence or absence of T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a\prime}$, $R^{b\prime}$, $R^{c\prime}$, $R^{d\prime}$, $R^{e\prime}$, $R^{f\prime}$, $R^{g\prime}$ is independently $C_1$-$C_{10}$ alkyl or hydrogen; and each X is independently a univalent anionic ligand, or two Xs are joined and bound to the metal atom to form a metallocycle ring, or two Xs are joined to form a chelating ligand, a diene ligand, or an alkylidene ligand.

16. The transition metal compound of paragraph 15, wherein each $R^a$, $R^b$, $R^c$, $R^d$, $R^e$, $R^f$, $R^{a\prime}$, $R^{b\prime}$, $R^{c\prime}$, $R^{d\prime}$, $R^{e\prime}$, $R^{F}$, $R^{g\prime}$ is independently hydrogen, methyl, ethyl, propyl, butyl, pentyl, hexyl, heptyl, octyl, nonyl, decyl, or an isomer thereof.

17. The transition metal compound of paragraph 15, wherein M is Hf or Zr;

T is a bridging group; y is 1, indicating the presence T;

each $R^2$ and $R^3$ is independently hydrogen, or a $C_1$-$C_{50}$ substituted or unsubstituted hydrocarbyl, halocarbyl or silylcarbyl; and each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$, $R^{g'}$ is independently hydrogen, methyl, ethyl, propyl, butyl, pentyl, hexyl, heptyl, octyl, nonyl, decyl, or an isomer thereof.

18. The transition metal compound of any of the above paragraphs 6 to 17 wherein $R^2$ and $R^3$ are independently linear, branched, or cyclic $C_1$ to $C_{20}$ alkyl.

19. The transition metal compound of any of the above paragraphs 6 to 18 wherein $R^a$ to $R^f$, are independently hydrogen, methyl, ethyl, propyl, butyl, pentyl, hexyl, heptyl, octyl, nonyl, decyl, or an isomer thereof.

20. The transition metal compound of any of the above paragraphs 6 to 19 wherein $R^{a'}$ to $R^{g'}$ are independently hydrogen, methyl, ethyl, propyl, butyl, pentyl, hexyl, heptyl, octyl, nonyl, decyl, or an isomer thereof.

21. The transition metal compound or catalyst system of any of the above paragraphs wherein each X is independently selected from the group consisting of substituted or unsubstituted hydrocarbyl radicals, hydrides, amides, alkoxides, sulfides, phosphides, halides, amines, phosphines, ethers, and a combination thereof.

22. The transition metal compound of any of the above paragraphs wherein M is Hf, Ti and/or Zr.

23. The transition metal compound of any of the above paragraphs wherein T is selected from $(CR^8R^9)_x$, $(SiR^8R^9)_x$, $CR^8R^9SiR^8R^9$, $GeR^{10}R^{11}$, $P(=S)R^{12}$, $P(=Se)R^{12}$, $P(=O)R^{12}$, $R^*C=CR^*$, $R^*C=CR^*CR^*_2$, $R^*_2CCR^*=CR^*_2$, $R^*C=CR^*CR^*=CR^*$, $R^*C=CR^*CR^*_2CR^*_2$, $R^*_2CSiR^*_2$, $R^*_2SiOSiR^*_2$, $R^*_2CSiR^*_2CR^*_2$, $R^*_2SiCR^*_2SiR^*_2$, $R^*C=CR^*SiR^*_2$, $R^*_2CGeR^*_2$, $R^*_2GeGeR^*_2$, $R^*_2CGeR^*_2CR^*_2$, $R^*_2GeCR^*_2GeR^*_2$, $R^*_2SiGeR^*_2$, $R^*C=CR^*GeR^*_2$, $R^*_2C—BR^*$, $R^*_2C—BR^*—CR^*_2$, $R^*_2C—O—CR^*_2$, $R^*_2CR^*_2C—O—CR^*_2CR^*_2$, $R^*_2C—O—CR^*_2CR^*_2$, $R^*_2C—O—CR^*=CR^*$, $R^*_2C—S—CR^*_2$, $R^*_2CR^*_2C—S—CR^*_2CR^*_2$, $R^*_2C—S—CR^*_2CR^*_2$, $R^*_2C—S—CR^*=CR^*$, $R^*_2C—Se—CR^*_2$, $R^*_2CR^*_2C—Se—CR^*_2CR^*_2$, $R^*_2C—Se—CR^*_2CR^*_2$, $R^*_2C—Se—CR^*=CR^*$, $R^*_2C—N=CR^*$, $R^*_2C—NR^*—CR^*_2$, $R^*_2C—NR^*—CR^*_2CR^*_2$, $R^*_2C—NR^*—CR^*=CR^*$, $R^*_2CR^*_2C—NR^*—CR^*_2CR^*_2$, $R^*_2C—P=CR^*$, $R^*_2C—PR^*—CR^*_2$, O, S, Se, Te, $BR^{12}$, $NR^{12}$, $PR^{12}$, $AsR^{12}$, $SbR^{12}$, O—O, S—S, $R^{12}N—NR^{12}$, $R^{12}P—PR^{12}$, O—S, O—$NR^{12}$, O—$PR^{12}$, S—$NR^{12}$, S—$PR^{12}$, and $R^{12}N—PR^{12}$ where x is 1, 2, 3 or 4; each $R^8$, $R^9$ and $R^*$ are independently selected from hydrogen, substituted or unsubstituted hydrocarbyl, halocarbyl, and silylcarbyl; each $R^{10}$, $R^{11}$ and $R^{12}$ are independently selected from substituted or unsubstituted hydrocarbyl, halocarbyl, and silylcarbyl; and any two or more adjacent $R^8$, $R^9$, $R^{10}$, $R^{11}$ or $R^*$ may optionally be bonded together to form a substituted or unsubstituted, saturated, partially unsaturated or aromatic, cyclic or polycyclic ring structure.

24. The transition metal compound of any of the above paragraphs wherein y is 1.

25. A transition metal compound represented by one or more of the following formulas:

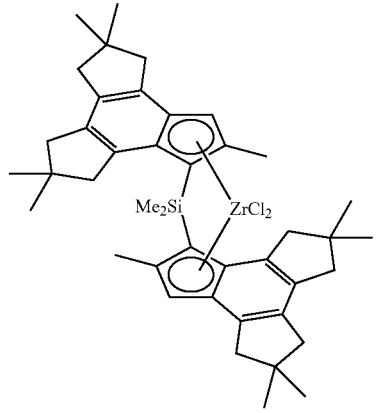

Complex A

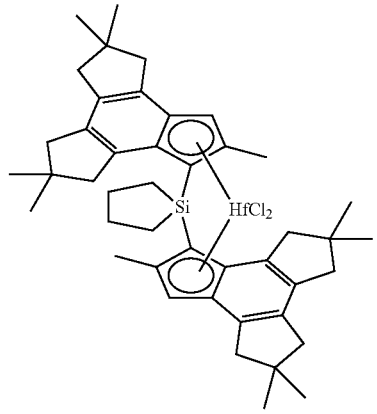

Complex B

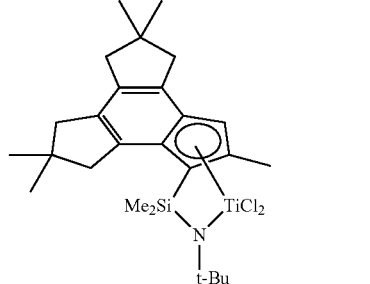

Complex C

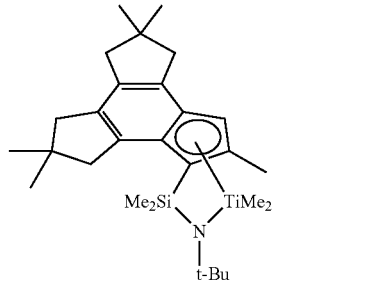

Complex D

-continued

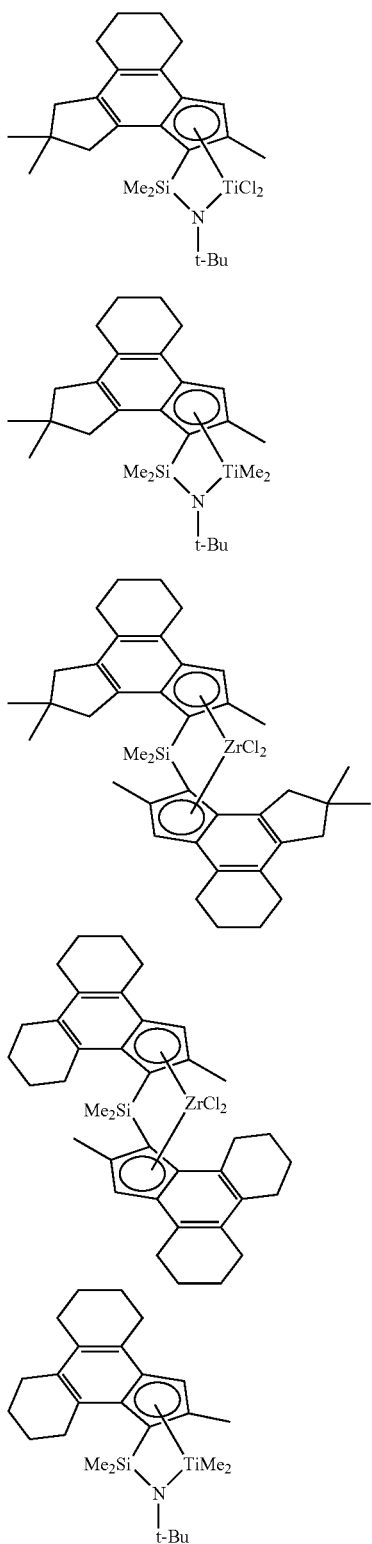

Complex E

Complex F

Complex G

26. A catalyst system comprising activator and transition metal compound of any of paragraphs 1 to 25.
27. The catalyst system of paragraph 26 wherein the activator comprises a non-coordinating anion activator.
28. The catalyst system of paragraph 26 wherein the activator comprises alumoxane.

29. The catalyst system of paragraph 26 wherein the activator is represented by the Formula (III): $(Z)_d{}^+(A^{d-})$, wherein Z is (L'-H) or a reducible Lewis Acid, L' is an neutral Lewis base; H is hydrogen; (L'-H)$^+$ is a Bronsted acid; $A^{d-}$ is a non-coordinating anion having the charge d–; and d is an integer from 1 to 3.

30. The catalyst system of paragraph 26 wherein the activator is represented by the Formula (V):

$$[R^{1'}R^{2'}R^{3'}EH]_d{}^+[Mt^{k+}Q_n]^{d-} \qquad (V)$$

wherein:
E is nitrogen or phosphorous;
d is 1, 2 or 3; k is 1, 2, or 3; n is 1, 2, 3, 4, 5, or 6; n–k=d;
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups,
wherein $R^{1'}$, $R^{2'}$, and $R^{3'}$ together comprise 15 or more carbon atoms;
Mt is an element selected from group 13 of the Periodic Table of the Elements; and
each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

31. The catalyst system of any of paragraphs 26, 28, 29 or 30 wherein the activator is soluble in non-aromatic hydrocarbon at a concentration of 10 mM or greater at 25° C.

32. The catalyst system of paragraph 26 wherein the activator comprises methylalumoxane, dimethylanilinium tetrakisperfluorophenylborate and/or dimethylanilinium tetrakisperfluoronaphthalenylborate.

33. The catalyst system of any of paragraphs 26-32 wherein the activator comprises one or more of:
N,N-di(hydrogenated tallow)methylammonium [tetrakis(perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate], N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl)borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate],
N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate], and
N-methyl-N-octylanilinium [tetrakis(perfluorophenyl)borate].

34. The catalyst system of any of paragraphs 26-32 wherein the activator comprises one or more of.
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
N,N-dimethylanilinium tetrakis(perfluoronaphthalenyl)borate,
N,N-dimethylanilinium tetrakis(perfluorobiphenyl)borate,
N,N-dimethylanilinium tetrakis(perfluorophenyl)borate,
N,N-dimethylanilinium tetrakis(3,5-bis(trifluoromethyl)phenyl)borate, triphenylcarbenium tetrakis(perfluoronaphthalenyl)borate,
triphenylcarbenium tetrakis(perfluorobiphenyl)borate,
triphenylcarbenium tetrakis(3,5-bis(trifluoromethyl)phenyl)borate,
triphenylcarbenium tetrakis(perfluorophenyl)borate,
trimethylammonium tetrakis(perfluorophenyl)borate,
1-(4-(tris(pentafluorophenyl)borate)-2,3,5,6-tetrafluorophenyl)pyrrolidinium, and
tetrakis(pentafluorophenyl)borate, 4-(tris(pentafluorophenyl)borate)-2,3,5,6-tetrafluoropyridine.

35. A process to polymerize olefins comprising contacting one or more olefins with the catalyst system of any of paragraphs 26 to 34.

36. The process of paragraph 35 wherein the process occurs at a temperature of from about 0° C. to about 300° C., at a pressure in the range of from about 0.35 MPa to about 10 MPa, and at a time up to 300 minutes.

37. The process of paragraph 35 or 36 wherein the olefins comprise one or more $C_2$ to $C_{20}$ alpha olefins.

38. The process of paragraphs 35 to 37 wherein the olefins comprise ethylene and/or propylene.

39. The process of paragraphs 35 to 38 wherein the olefins comprise diene.

40. The process of any of paragraphs 35 to 39 further comprising obtaining polymer.

41. The process of paragraph 40 wherein the polymer comprises one or more $C_2$ to $C_{20}$ alpha olefins.

42. The process of paragraph 40 or 41 wherein the polymer comprises ethylene and/or propylene.

43. The process of paragraph 40, 41, or 42 wherein the polymer comprises one or more of ethylene, propylene, butene, pentene, hexene, heptene, octene, nonene, decene, undecene, dodecene and isomers thereof.

44. A ligand represented by the Formula (5a) or (5b):

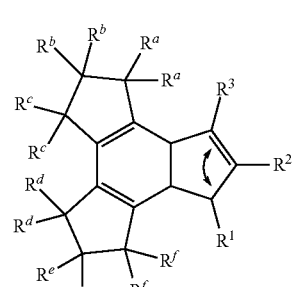

(5a)

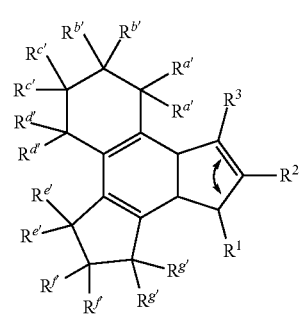

(5b)

wherein the double ended arrow indicates the two isomeric forms, each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^e$, $R^d$, $R^e$, $R^f$, $R^{a'}$, $R^{b'}$, $R^{c'}$, $R^{d'}$, $R^{e'}$, $R^{f'}$, $R^{g'}$ is independently $C_1$-$C_{10}$ alkyl or hydrogen; and $R^1$ is hydrogen or a hydrocarbyl.

EXPERIMENTAL

Starting Materials:

Toluene (Merck), THF (BASF), dichloromethane (Merck), n-hexane (Merck), $^n$BuLi in hexanes (Chemetall GmbH), MeMgBr in diethyl ether (Aldrich), KOH (BASF), $K_2CO_3$ (Merck), $Na_2SO_4$ (Akzo Nobel), silica gel 60 (40-63 um, Merck), methanol (Merck), $NaBH_4$ (Aldrich), TsOH (Aldrich), thionyl chloride (Merck), 12 M HCl (Reachim), 96% sulfuric acid (Reachim), $AlCl_3$ (Merck), iodomethane (Merck), hydrazine hydrate (Merck), ethylene glycol (Merck), 2-bromo-2-methylpropionyl bromide (Acros), CuCN (Merck), $SiCl_4$ (Acros), $Br(CH_2)_4Br$ (Acros), $Me_2SiCl_2$ (Merck), $ZrCl_4$ (Merck), $TiCl_4$ (Aldrich), $^tBuNH_2$ (Acros), potassium tert-butoxide (Acros), hydrazine hydrate (Merck) were used as received. Chloroform-$d_1$ (Deutero GmbH) was dried over molecular sieves 4A. 2,7,7-Trimethyl-1,6,7,8-tetrahydro-as-indacen-3(2H)-one was obtained as described in [US Patent Appl. 2016/0244535; Aug. 25, 2016]. 2-Methyl-1,2,6,7,8,9-hexahydro-3H-cyclopenta[a]naphthalen-3-one was obtained as described in [*Organometallics* 2006, v. 25(5), pp. 1217-1229]. Cyclotetramethylenedichlorosilane was obtained as described in [*J. Am. Chem. Soc.* 1954, v. 76(23), PP. 6012-6014]. $TiCl_4(THF)_2$ was obtained as described in [*Inorg. Synth.* 1982, v. 21, pp. 135-140].

Example 1: Synthesis of Rac-dimethylsilanediylbis [η$^5$-2,5,5,8,8-pentamethyl-4,5,6,7,8,9-hexahydrocyclopenta[e]as-indacen-1-yl)]zirconium dichloride (Complex A)

2,2,7,7-Tetramethyl-1,6,7,8-tetrahydro-as-indacen-3 (2H)-one

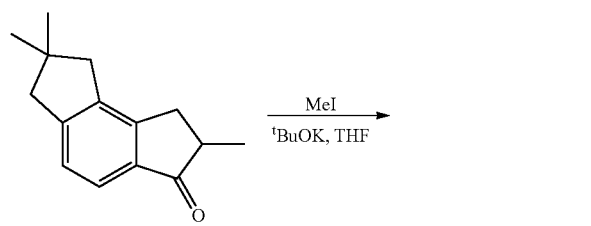

To a cooled to 0° C. mixture of 179 g (792 mmol) of 2,7,7-trimethyl-1,6,7,8-tetrahydro-as-indacen-3(2H)-one and 135 g (951 mmol, 1.2 equiv.) of MeI, a solution of 124 g (1.11 mol, 1.4 equiv.) of $^tBuOK$ in 1,000 ml of THF was added dropwise over 4 hours. The reaction mixture was stirred for 4 hours at room temperature, then evaporated to dryness, and 2,000 ml of water was added to the residue. Thus obtained mixture was extracted with 4×250 ml of dichloromethane. The combined organic extract was dried over $K_2CO_3$, then passed through a short pad of silica gel 60 (40-63 μm). The elute was evaporated to dryness to give a reddish oil. This oil was distilled in vacuum to give 172.5 g (96%) of the title material as a slightly orange oil which rapidly crystallized at room temperature, b.p. 116-127° C./5 mmHg. $^1$H NMR (CDCl$_3$): δ 7.57 (d, J=7.6 Hz, 1H), 7.19 (d, J=7.6 Hz, 1H), 2.84 (s, 2H), 2.80 (s, 2H), 2.70 (s, 2H), 1.23 (s, 6H), 1.19 (s, 6H). $^{13}$C{$^1$H} NMR (CDCl$_3$): δ 211.22, 151.23, 148.52, 140.67, 133.76, 124.06, 122.67, 48.16, 45.59, 44.87, 41.37, 40.30, 28.96, 25.43.

2,2,7,7-Tetramethyl-1,2,3,6,7,8-hexahydro-as-indacene

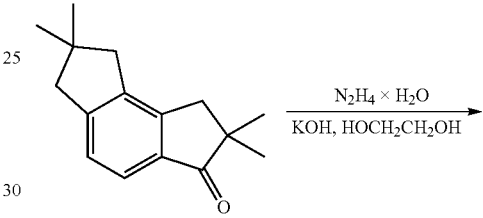

A mixture of 180 g (3.21 mol) of KOH, 173 g (756 mmol) of 2,2,7,7-tetramethyl-1,6,7,8-tetrahydro-as-indacen-3(2H)-one, 150 ml of hydrazine hydrate, and 1,250 ml of ethylene glycol was refluxed for 5.5 hours. Then, the reflux condenser was replaced by a Claisen distillation head with condenser, and a mixture of water, $NH_2NH_2$, the product and ethylene glycol was distilled off until the distillation temperature reached 201° C. (Caution! The product crystallizes in the condenser. Therefore, you should periodically stop the circulation of cold water, so that hot distillate melts and washed off the crystalline product on the walls of the condenser). The distillate was diluted with 1,000 ml of water. Further on, the crude product was extracted with 800 ml of dichloromethane. The organic phase was washed with 2×1,000 ml of water, dried over $K_2CO_3$, and then was evaporated to dryness to give a slightly yellowish oil. The product was isolated by flash-chromatography on silica gel 60 (40-63 μm; 300 ml; eluent: hexanes) followed by crystallization from n-hexane. This procedure gave 145 g (89%) of the title compound as a white microcrystalline solid. $^1$H NMR (CDCl$_3$): δ 6.93 (s, 2H), 2.70 (s, 4H), 2.59 (s, 4H), 1.14 (s, 12H). $^{13}$C{$^1$H} NMR (CDCl$_3$): δ 141.23, 139.46, 122.21, 47.71, 46.12, 40.08, 29.17.

67

2,5,5,8,8-Pentamethyl-2,3,4,5,6,7,8,9-octahydro-1H-cyclopenta[e]as-indacen-1-one

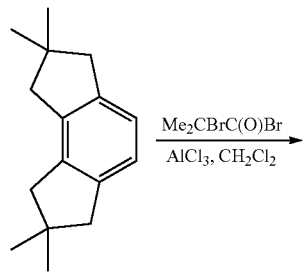

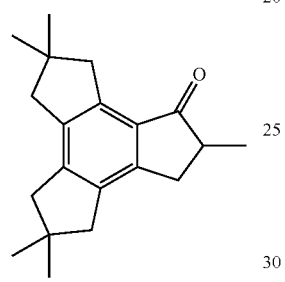

To a cooled to −40° C. suspension of 100 g (750 mol, 3.0 equiv.) of AlCl$_3$ in 160 ml of dichloromethane the following reagents were sequentially added: 57.5 g (250 mmol) of 2-bromo-2-methylpropionyl bromide (over 5 minutes) and 53.6 g (250 mmol) of 2,2,7,7-tetramethyl-1,2,3,6,7,8-hexahydro-as-indacene (in one portion). The cooling bath was then removed, and the solution was stirred for 6 hour at room temperature, then it was poured into 1 kg of crushed ice, and 500 ml of dichloromethane was added. The organic phase was separated. The water phase was extracted with 2×100 ml of dichloromethane. The combined organic extract was washed with aqueous K$_2$CO$_3$, dried over K$_2$CO$_3$, passed through a short pad of silica gel 60 (40-63 μm), then evaporated to dryness to give a white solid mass. The latter was recrystallized from 200 ml of hot n-hexane (overnight at +5° C.) to give 51.1 g of 2,5,5,8,8-pentamethyl-2,3,4,5,6,7,8,9-octahydro-1H-cyclopenta[e]as-indacen-1-one as a white cottony crystalline mass. The mother liquor was evaporated to dryness and the residue was crystallized from 700 ml of hot n-hexane (overnight at +5° C.) to give additional 6.65 g of 2,5,5,8,8-pentamethyl-2,3,4,5,6,7,8,9-octahydro-1H-cyclopenta[e]as-indacen-1-one. Thus, the total yield of the title product isolated in this synthesis was 57.8 g (81.8%). $^1$H NMR (CDCl$_3$): δ 3.20 (dd, J=16.8 Hz, J=7.7 Hz, 1H), 3.10-2.98 (m, 2H), 2.72-2.61 (m, 5H), 2.61-2.56 (m, 2H), 2.53 (dm, J=16.8 Hz, 1H), 1.29 (d, J=7.6 Hz, 3H), 1.20 (s, 3H), 1.19 (s, 3H), 1.17 (s, 3H), 1.16 (s, 3H). $^{13}$C{$^1$H} NMR (CDCl$_3$): δ 210.07, 147.94, 146.60, 140.76, 139.40, 138.20, 130.96, 46.77, 45.83, 45.39, 44.99, 42.25, 40.63, 40.33, 33.62, 29.26, 16.64.

68

2,2,5,5,8-Pentamethyl-2,3,4,5,6,7-hexahydro-1H-cyclopenta[e]as-indacene

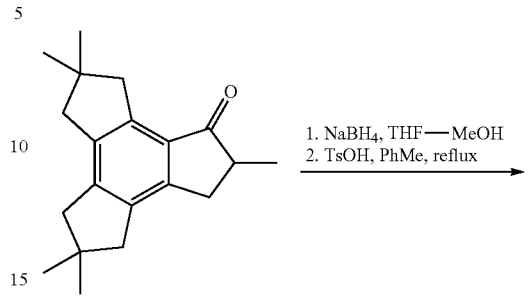

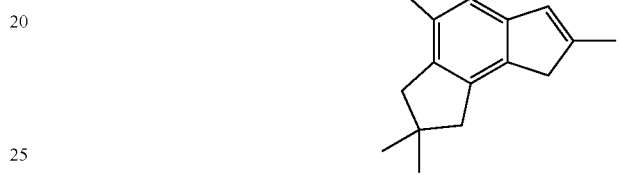

To a cooled to 5° C. (ice bath) solution of 57.8 g (205 mmol) of 2,5,5,8,8-pentamethyl-2,3,4,5,6,7,8,9-octahydro-1H-cyclopenta[e]as-indacen-1-one in 600 ml of THF, 12.0 g (317 mmol) of NaBH$_4$ was added. Further on, 200 ml of ethanol was added dropwise to this vigorously stirred mixture for ca. 5 hours at 5° C. The resulting mixture, after additional stirring at room temperature overnight, was evaporated to dryness, and the residue was partitioned between 1,000 ml of dichloromethane and 1,000 ml of 1 M HCl. The organic layer was separated, and the aqueous layer was additionally extracted with 250 ml of dichloromethane. The combined organic extract was evaporated to dryness to give a white solid mass. To a solution of this mass in 700 ml of toluene, 0.6 g of TsOH was added, and this mixture was refluxed with Dean-Stark head for 20 minutes, then cooled to room temperature using a water bath. The resulting solution was washed with 10% aqueous K$_2$CO$_3$. The organic layer was separated, and the aqueous layer was extracted with 150 ml of dichloromethane. The combined organic extract was dried over K$_2$CO$_3$ and then evaporated to dryness to yield yellowish solid mass. This mass was dissolved in ca. 1,400 ml of dichloromethane, and the resulting solution was passed through a short pad of silica gel 60 (40-63 μm). The silica gel pad was additionally washed by 100 ml of dichloromethane. The combined organic elute was evaporated to ca. 100 ml, and then 400 ml of n-hexane was added. The formed white fine-crystalline precipitate was filtered off (G3) and dried to give 37.7 g of 2,2,5,5,8-pentamethyl-2,3,4,5,6,7-hexahydro-1H-cyclopenta[e]as-indacene. The mother liquor was evaporated to dryness, the residue was dissolved in ca. 40 ml of dichloromethane, then 300 ml of hexane was added. Solid precipitated from this solution was collected and dried in vacuum to give the second crop of 7.93 g of the title material. Finally, the liquor was evaporated to dryness, and the residue was triturated with 100 ml of n-hexane. The precipitate was filtered off (G3), washed with 30 ml of n-hexane, and dried in vacuum to give additional 3.29 g of the title compound as a yellowish powder (impurities are barely visible on the $^1$H NMR spectrum). Thus, the total yield of the title product isolated in this reaction was 48.9 g (90%). $^1$H NMR (CDCl$_3$): δ 6.42 (s, 1H), 3.12 (s, 2H), 2.75 (s, 2H), 2.66 (s, 2H), 2.62 (s, 2H), 2.61 (s, 2H), 2.14 (s, 3H), 1.17 (s, 12H). $^{13}$C{$^1$H} NMR (CDCl$_3$): δ 144.42, 139.94, 137.56, 136.81, 135.97, 135.11, 132.55, 125.65, 46.29, 46.24, 46.02, 45.92, 41.32, 40.21, 40.16, 29.48, 29.41, 16.90.

Dimethyl[bis(2,5,5,8,8-pentamethyl-4,5,6,7,8,9-hexahydro-1H-cyclopenta[e]as-indacen-1-yl)]silane

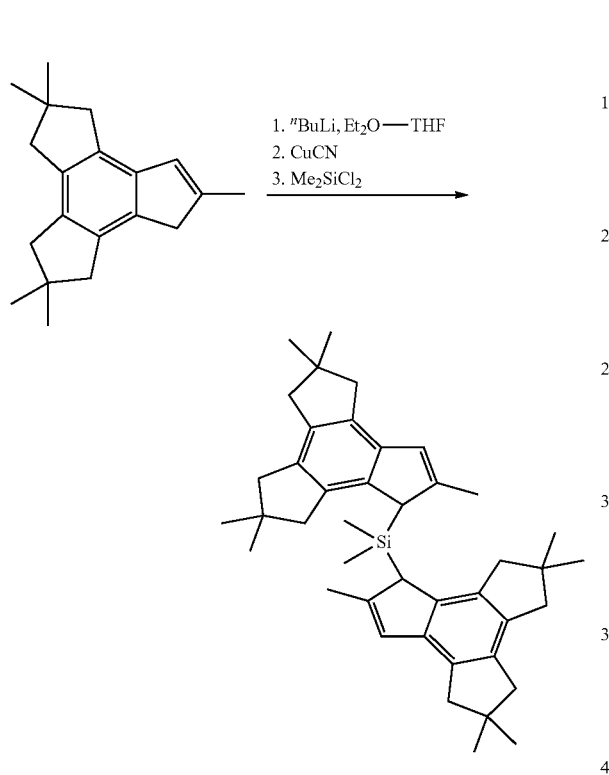

To a suspension of 13.3 g (50.0 mmol) of 2,2,5,5,8-pentamethyl-2,3,4,5,6,7-hexahydro-1H-cyclopenta[e]as-indacene in 250 ml of ether 20.6 ml (50.0 mmol) of 2.43 M $^n$BuLi in hexanes was added in one portion at –78° C. This mixture was stirred overnight at room temperature, when a large amount of precipitate formed, thereby 40 ml of THF was added to the reaction mixture. The resulting reddish transparent solution was cooled to –50° C., and 250 mg of CuCN was added. The obtained mixture was stirred for 30 minutes at –25° C., and then 3.23 g (25.0 mmol) of dimethyldichlorosilane was added in one portion. This mixture was stirred overnight at ambient temperature, then filtered through a pad of silica gel 60 (40-63 um) which was additionally washed with 2×50 ml of dichloromethane. The combined filtrate was evaporated under reduced pressure, and the residue was dried in vacuum to give 14.7 g (ca. 100%, purity ≥95%, a ca. 1:1 mixture of the isomers) of the title compound as slightly yellowish glass which was further used without an additional purification. $^1$H NMR (CDCl$_3$): δ 6.52 and 6.48 (2 s, sum 2H), 3.68 and 3.65 (2 s, sum 2H), 2.95-2.51 (m, 16H), 2.33 and 2.19 (2 s, sum 6H), 1.23 (s, 12H), 1.17 and 1.16 (2 s, sum 6H), 1.09 and 1.08 (2 s, sum 6H), –0.26, –0.29 and –0.35 (3 s, sum 6H). $^{13}$C{$^1$H} NMR (CDCl$_3$): 146.24, 146.18, 140.22, 140.07, 139.70, 136.50, 136.46, 134.89, 134.71, 134.64, 132.64, 124.96, 124.85, 48.15, 47.71, 47.32, 46.43, 46.19, 40.47, 40.33, 40.29, 29.45, 29.29, 29.25, 29.07, 18.41, 18.09, –1.58, –2.71, –3.42.

Rac-dimethylsilanediylbis[η$^5$-2,5,5,8,8-pentamethyl-4,5,6,7,8,9-hexahydrocyclopenta[e]as-indacen-1-yl)] zirconium dichloride (Complex A)

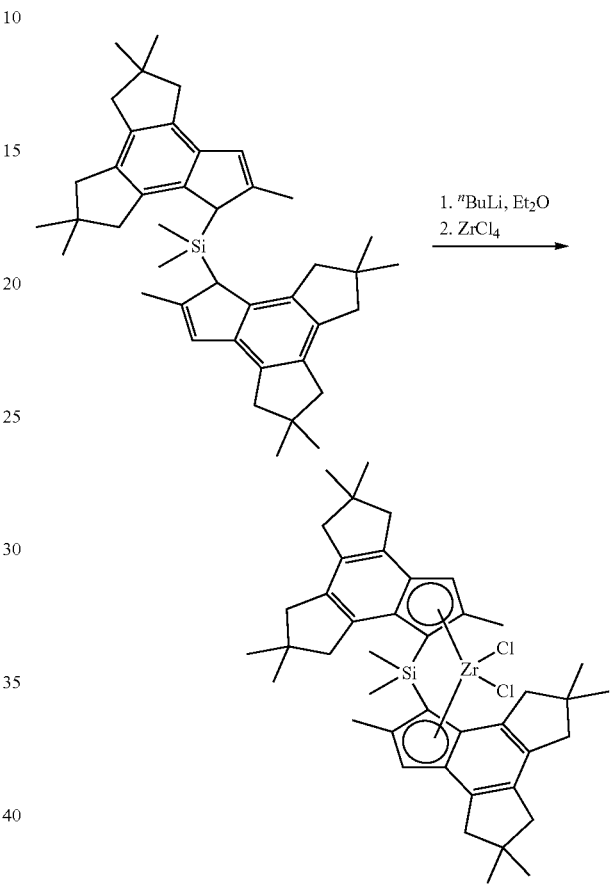

To a cooled to –78° C. solution of 14.7 g (25.0 mmol) of dimethyl[bis(2,5,5,8,8-pentamethyl-4,5,6,7,8,9-hexahydro-1H-cyclopenta[e]as-indacen-1-yl)]silane in 250 ml of ether, 20.6 ml (50.1 mmol) of 2.43 M $^n$BuLi in hexanes was added. This mixture was stirred overnight at room temperature, then the resulting transparent light orange solution was cooled to –78° C., and 5.83 g (25.02 mmol) of ZrCl$_4$ was added. This mixture was stirred for 48 hours at room temperature and then evaporated to dryness. The residue was stirred with 150 ml of hot toluene, and the formed suspension was filtered through a glass frit (G4). The filtrate was evaporated to ca. 45 ml and left to crystallize overnight at room temperature. The orange fine-crystalline precipitate fallen from this solution was collected and dried in vacuum. This procedure gave 1.68 g of the title rac-complex. The mother liquor was evaporated to dryness, and the residue was heated with 30 ml of n-hexane. Crystals precipitated from this solution overnight at –30° C. were collected and then dried in vacuum. This procedure gave additional 1.03 g of the title compound. Thus, the total yield of the desired rac-complex isolated in this synthesis was 2.71 g (14.5%). Anal. calc. for C$_{42}$H$_{54}$Cl$_2$SiZr: C, 67.34; H, 7.27. Found: C, 67.52; H, 7.45. $^1$H NMR (CDCl$_3$): δ 6.68 (s, 2H), 3.06 (d, J=15.6 Hz, 2H), 2.84 (d, J=15.6 Hz, 4H), 2.76 (d, J=15.6 Hz, 2H), 2.74 (d, J=15.6 Hz, 2H), 2.69 (d, J=15.6 Hz, 2H), 2.68 (d, J=15.6 Hz, 2H), 2.49 (d, J=15.6 Hz, 2H), 2.15 (s, 6H), 1.27 (s, 12H), 1.22 (s, 6H), 1.16 (s, 6H), 1.00 (s, 6H). $^{13}C\{^1H\}$NMR (CDCl$_3$): δ 140.94, 139.26, 137.14, 134.49, 132.23, 129.68, 129.56, 121.72, 81.93, 52.14, 47.38, 46.98, 46.70, 40.56, 39.77, 30.16, 30.09, 29.38, 29.31, 19.24, 6.07.

Example 2: Synthesis of Rac-1,1-silolanediylbis(ns-2,5,5,8,8-pentamethyl-4,5,6,7,8,9-hexahydrocyclopenta[e]as-indacen-1-yl)hafnium dichloride (Complex B)

1,1-Bis(2,5,5,8,8-pentamethyl-4,5,6,7,8,9-hexahydro-1H-cyclopenta[e]as-indacen-1-yl)silolane

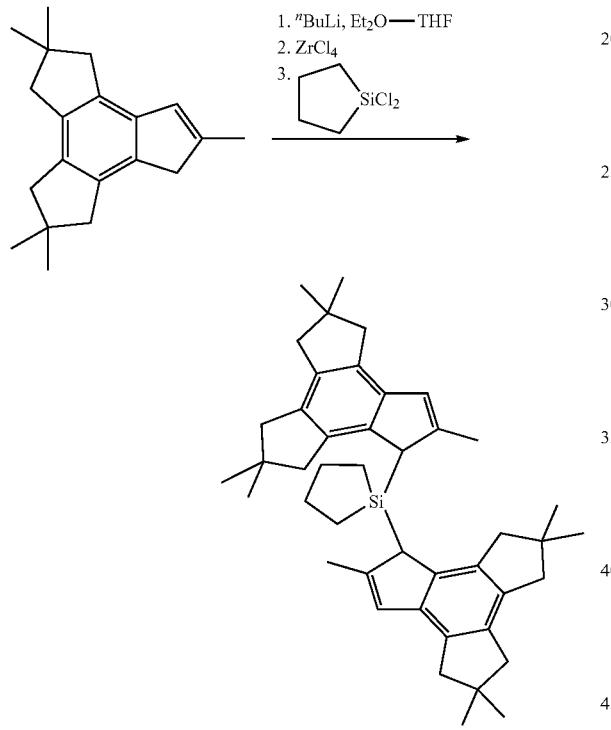

To a suspension of 13.3 g (50.0 mmol) of 2,2,5,5,8,8-pentamethyl-2,3,4,5,6,7-hexahydro-1H-cyclopenta[e]as-indacene in 250 ml of ether, 20.6 ml (50.0 mmol) of 2.43 M ″BuLi in hexanes was added in one portion at −78° C. This mixture was stirred overnight at room temperature, when a large amount of precipitate formed, thereby 40 ml of THF was added. The resulting reddish transparent solution was cooled to −50° C., and 250 mg of CuCN was added. The resulting mixture was stirred for 30 minutes at −25° C., and then 3.88 g (25.0 mmol) of cyclotetramethylenedichlorosilane was added in one portion. This mixture was stirred overnight at ambient temperature, then filtered through a pad of silica gel 60 (40-63 um) which was additionally washed with 2×50 ml of dichloromethane. The combined filtrate was evaporated under reduced pressure, and the residue was dried in vacuum to give 15.7 g (ca. 100%, purity ca. 85%, ca. 6:4 mixture of isomers) of the title material as a yellowish glassy solid which was further used without an additional purification. $^1$H NMR (CDCl$_3$): δ 6.45 and 6.41 (2 s, sum 2H), 3.27 and 3.14 (2 s, sum 2H), 2.89-2.49 (m, sum 16H), 2.25 and 1.92 (2 s, sum 6H), 1.24 (s), 1.15 (s), 1.14 (s), 1.13 (s), 1.12 (s), 1.07 (s), 0.97 (s) and 1.27-0.88 (m) {sum 28H}, 0.61-0.43 (m, 4H). $^{13}C\{^1H\}$ NMR (CDCl$_3$): δ 146.67, 146.58, 140.06, 139.97, 139.47, 139.30, 136.40, 136.37, 134.75, 134.60, 134.55, 134.50, 132.61, 132.51, 124.58, 124.50, 47.72, 46.94, 46.37, 46.33, 46.19, 46.18, 46.09, 45.89, 45.58, 40.46, 40.43, 40.35, 40.29, 29.46, 29.40, 29.36, 29.33, 29.20, 29.14, 26.35, 26.24, 18.16, 17.44, 12.88, 12.34.

Rac-1,1-silolanediylbis(η$^5$-2,5,5,8,8-pentamethyl-4,5,6,7,8,9-hexahydrocyclopenta[e]as-indacen-1-yl)hafnium dichloride (Complex B)

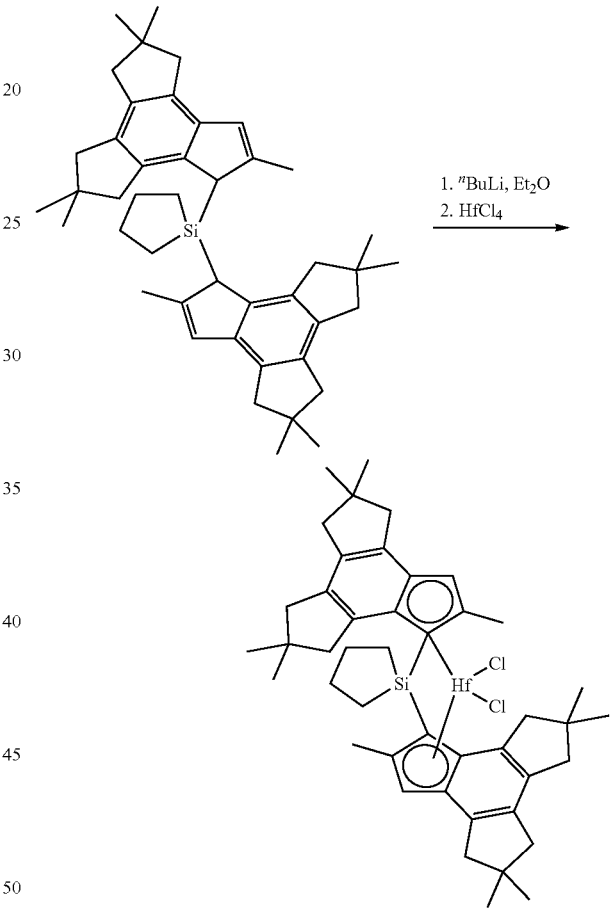

To a cooled to −78° C. solution of 15.7 g (ca. 25.0 mmol) of 1,1-bis(2,5,5,8,8-pentamethyl-4,5,6,7,8,9-hexahydro-1H-cyclopenta[e]as-indacen-1-yl)silolane in 250 ml of ether, 20.6 ml (50.1 mmol) of 2.43 M ″BuLi in hexanes was added. This mixture was stirred overnight at room temperature, then the resulting solution was cooled to −78° C., and 8.01 g (25.0 mmol) of HfCl$_4$ was added. The reaction mixture was stirred overnight at room temperature to give orange solution with yellow precipitate. This mixture was evaporated to dryness. The residue was stirred with 300 ml of hot toluene, and the formed suspension was filtered through a glass frit (G4). The filtrate was evaporated to ca. 30 ml and left to crystallize overnight at room temperature. Yellow precipitate fallen from this solution was collected and dried in vacuum. This procedure gave 8.11 g of the title rac-complex. The mother liquor was evaporated to dryness, and the residue was triturated with 25 ml of n-hexane. Yellow solid was filtered off (G4) and dried in vacuum. This procedure gave additional 0.59 g of the title compound. Thus, the total yield of the desired rac-complex isolated in this synthesis was 8.70 g (40.4%). Anal. calc. for $C_{44}H_{56}Cl_2HfSi$: C, 61.28; H, 6.55. Found: C, 61.50; H, 6.61. $^1$H NMR (CDCl$_3$): δ 6.57 (s, 2H), 3.18 (d, J=15.2 Hz, 2H), 2.92-2.62 (m, 12H), 2.57 (d, J=15.6 Hz, 2H), 2.26 (s, 6H), 2.13-1.93 (m, 6H), 1.78-1.63 (m, 2H), 1.26 (s, 6H), 1.24 (s, 6H), 1.15 (s, 6H), 1.09 (s, 6H). $^{13}$C{$^1$H} NMR (CDCl$_3$): δ 140.28, 139.03, 136.75, 134.24, 129.71, 129.22, 127.10, 119.26, 83.16, 52.25, 47.36, 47.00, 46.77, 39.84, 39.78, 30.15, 30.04, 29.70, 29.65, 26.83, 18.32, 18.13.

Example 3: Synthesis of Me$_2$Si($\eta^5$-2,5,5,8,8-pentamethyl-4,5,6,7,8,9-hexahydro-cyclopenta[e]as-indacen-1-yl)($\kappa^1$-N$^t$Bu)TiCl$_2$ (Complex C)

Chloro(dimethyl)(2,5,5,8,8-pentamethyl-4,5,6,7,8,9-hexahydro-1H-cyclopenta[e]as-indacen-1-yl)silane

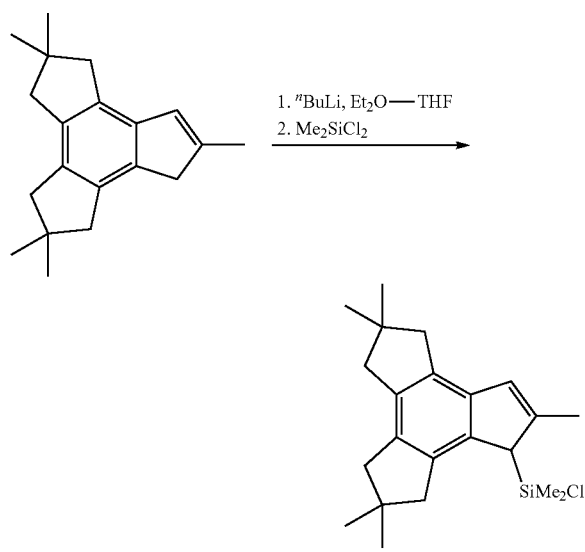

To a suspension of 10.9 g (41.1 mmol) of 2,2,5,5,8,8-pentamethyl-2,3,4,5,6,7-hexahydro-1H-cyclopenta[e]as-indacene in a mixture of 200 ml of ether and 10 ml of THF, 16.9 ml (41.1 mmol) of 2.43 M "BuLi in hexanes was added in one portion at –78° C. This mixture was stirred overnight at room temperature. The resulting white suspension was cooled to –78° C., and then 10 ml of THF and 26.5 g (205.3 mmol, 5 equivs.) of dimethyldichlorosilane were added in one portion. The formed mixture was stirred overnight at room temperature and then filtered through a glass frit (G3), the flask and filter cake were rinsed with 50 ml of toluene. The filtrate was evaporated to dryness to give 14.7 g (ca. 100%) of the title compound as a colorless oil which was further used without an additional purification. $^1$H NMR (CDCl$_3$): δ 6.56 (s, 1H), 3.57 (s, 1H), 2.97 (d, J=15.3 Hz, 1H), 2.83 (d, J=15.5 Hz, 1H), 2.78 (d, J=15.5 Hz, 1H), 2.75-2.54 (m, 5H), 2.30 (s, 3H), 1.28 (s, 3H), 1.24 (s, 3H), 1.18 (s, 3H), 1.09 (s, 3H), 0.40 (s, 3H), 0.17 (s, 3H). $^{13}$C{$^1$H} NMR (CDCl$_3$): δ 144.61, 139.81, 137.35, 137.29, 135.52, 135.26, 132.86, 126.03, 49.88, 47.60, 46.42, 46.14, 46.11, 40.70, 40.35, 29.44, 29.41, 29.09, 28.87, 17.83, 3.34, –0.03.

Me$_2$Si($\eta^5$-2,5,5,8,8-pentamethyl-4,5,6,7,8,9-hexahydro-cyclopenta[e]as-indacen-1-yl)($\kappa^1$-N$^t$Bu)TiCl$_2$ (Complex C)

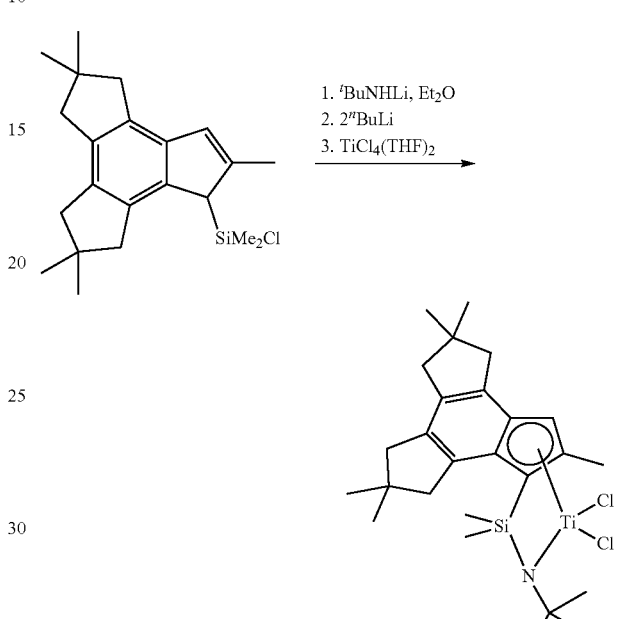

A solution of 3.00 g (41.0 mmol) of tert-butylamine in 200 mL of ether was treated at –50° C. with 16.9 ml (41.1 mmol) of 2.43 M "BuLi in hexanes. The reaction mixture was stirred for 3.5 hours at room temperature, then the resulting white suspension was treated at –50° C. with a solution of 14.7 g (41.1 mmol) of chloro(dimethyl)(2,5,5,8,8-pentamethyl-4,5,6,7,8,9-hexahydro-1H-cyclopenta[e]as-indacen-1-yl)silane (obtained as described above) in 200 ml of ether. Thus obtained mixture was allowed to warm to room temperature, stirred overnight at this temperature, then cooled to –50° C., and 33.8 ml (82.1 mmol) of 2.43 M nBuLi in hexanes was added. This mixture was stirred for 6 hours at room temperature, the resulting yellow suspension was cooled to –78° C., and 13.7 g (41.1 mmol) of TiCl$_4$(THF)$_2$ was added in one portion. This mixture was stirred for 24 hours at room temperature, then evaporation to dryness, and the residue was extracted with 100 ml of warm toluene. Thus obtained suspension was filtered while hot via a glass frit (G4). The filtrate was evaporated to dryness, the residue was triturated in 100 ml of n-hexane, the obtained suspension was filtered through glass frit (G3), and the filtrate was evaporated to ca. 60 ml. Burgundy crystalline material precipitated from this solution overnight at –30° C. was filtered off (G4), washed with n-hexane, and dried in vacuum. This procedure gave 8.50 g (40%) of the title complex. Anal. calc. for $C_{26}H_{39}Cl_2NSiTi$: C, 60.94; H, 7.67; N, 2.73. Found: C, 61.04; H, 7.75; N, 2.53. $^1$H NMR (CDCl$_3$): 356.97 (s, 1H), 2.93-2.77 (m, 4H), 2.77-2.51 (m, 4H), 2.41 (s, 3H), 1.38 (s, 9H), 1.22 (s, 6H), 1.21 (s, 3H), 1.10 (s, 3H), 0.86 (s, 3H), 0.76 (s, 3H).

Example 4: Synthesis of Me₂Si(η⁵-2,5,5,8,8-pentamethyl-4,5,6,7,8,9-hexahydro-cyclopenta[e]as-indacen-1-yl)(κ¹-N$^t$Bu)TiMe₂ (Complex D)

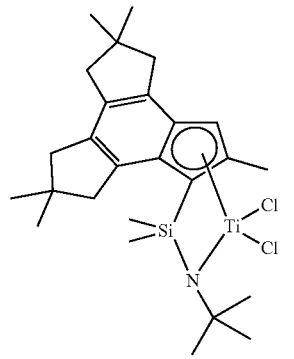

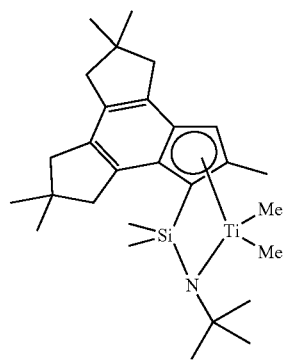

To a cooled to −30° C. solution of 2.56 g (5.0 mmol) of Me₂Si(η⁵-2,5,5,8,8-pentamethyl-4,5,6,7,8,9-hexahydro-cyclopenta[e]as-indacen-1-yl)(κ¹-N$^t$Bu)TiCl₂ in 30 ml of ether, 6.0 ml (15 mmol, 3.0 equivs.) of 2.5 M MeMgBr in ether was added, and the reaction mixture was stirred overnight at room temperature. The reaction mixture was filtered through glass frit (G4), the filtrate was evaporated to dryness, the residue was extracted with 3×10 ml of a warm mixture of n-hexane/toluene=10/1, vol. The combined extract was evaporated to dryness, and the residue was dissolved in 15 ml of n-hexane. This solution was filtered through glass frit (G4), the filtrate was evaporated to dryness, and the residue was dried in vacuum. This procedure gave 1.58 g (67%) of the title complex as a yellow solid mass. Anal. calc. for C₂₈H₄₅NSiTi: C, 71.31; H, 9.62; N, 2.97. Found: C, 71.64; H, 9.91; N, 2.75. ¹H NMR (CDCl₃): δ 6.85 (s, 1H), 2.94 (d, J=16.0 Hz, 1H), 2.77 (d, J=15.7 Hz, 1H), 2.75 (d, J=15.5 Hz, 1H), 2.70-2.61 (m, 4H), 2.52 (d, J=15.6 Hz, 1H), 2.20 (s, 3H), 1.49 (s, 9H), 1.26 (s, 3H), 1.19 (s, 3H), 1.16 (s, 3H), 1.05 (s, 3H), 0.63 (s, 3H), 0.57 (s, 3H), 0.43 (s, 3H), −0.65 (s, 3H).

Example 5: Synthesis of Me₂Si(η⁵-2,5,5-trimethyl-3,4,5,6,7,8,9,10-octahydrobenzo[e]as-indacen-3-yl)(κ¹-N$^t$Bu)TiCl₂ (Complex E)

2,2-Dimethyl-1,2,6,7,8,9-hexahydro-3H-cyclopenta[a]naphthalen-3-one

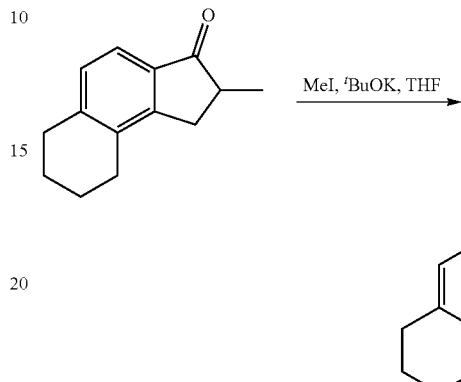

To a cooled to 0° C. mixture of 200 g (1.0 mol) of 2-methyl-1,2,6,7,8,9-hexahydro-3H-cyclopenta[a]naphthalen-3-one and 170 g (1.2 mol, 1.2 equivs.) of iodomethane, a solution of 157.4 g (1.4 mol, 1.4 equivs.) of $^t$BuOK in 1,600 ml of THF was added dropwise for 5 hours. The formed mixture was stirred for 4 hours at room temperature, then it was evaporated to dryness, and 2,000 ml of water was added to the residue. The obtained mixture was extracted with 3×500 ml of dichloromethane. The combined organic extract was dried over K₂CO₃, then passed through a short pad of silica gel 60 (40-63 μm), and the elute was evaporated to dryness to give 203 g (95%) of the title compound as a red oil which completely solidified on standing at room temperature. ¹H NMR (CDCl₃): 9.16 (d, J=8.3 Hz, 1H), 8.00 (d, J=8.3 Hz, 1H), 7.84 (d, J=8.1 Hz, 1H), 7.67-7.60 (m, 1H), 7.55-7.48 (m, 1H), 7.43 (d, J=8.3 Hz, 1H), 3.05 (s, 2H), 1.28 (s, 6H). ¹³C{¹H} NMR (CDCl₃): δ 211.85, 155.19, 135.72, 132.68, 129.73, 128.89, 128.71, 128.02, 126.37, 123.94, 123.90, 45.58, 43.10, 25.35.

2,2-Dimethyl-2,3,6,7,8,9-hexahydro-1H-cyclopenta[a]naphthalene

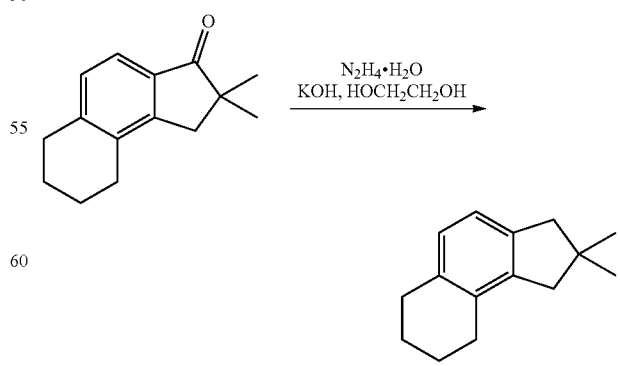

A mixture of 101 g (1.8 mol) of KOH, 100 g (467 mmol) of 2,2-dimethyl-1,2,6,7,8,9-hexahydro-3H-cyclopenta[a]

naphthalen-3-one, 84 ml of hydrazine hydrate, and 880 ml of ethylene glycol was refluxed for 5 hours. Then, the reflux condenser was replaced by a Claisen distillation head with condenser, and a mixture of $H_2O$, $NH_2NH_2$, the product, and ethylene glycol was distilled off until the distillation temperature reached 197° C. The residue was then allowed to cool to room temperature, 500 ml of ethylene glycol, the second portion of 2,2-dimethyl-1,2,6,7,8,9-hexahydro-3H-cyclopenta[a]naphthalen-3-one (100 g, 467 mmol), and hydrazine hydrate (84 ml) were added, and the reduction procedure was repeated as described above. The upper layer of the combined distillate (from two successive reductions) was separated, and the aqueous phase was diluted with 1,000 ml of water. The crude product was extracted from the aqueous phase using 3×300 ml of dichloromethane. The obtained extract was combined with the upper organic layer obtained above. The resulting solution was washed by 1 M HCl, dried over $K_2CO_3$, passed through a short pad of silica gel 60 (40-63 um), and the elute was evaporated to dryness. The residue was distilled in vacuum to give 173 g (92%) of the title material as a colorless liquid, b.p. 100-110° C./1 mm Hg. $^1$H NMR (CDCl$_3$): 6.91 (d, J=7.6 Hz, 1H), 6.86 (d, J=7.6 Hz, 1H), 2.77-2.71 (m, 2H), 2.70 (s, 2H), 2.58 (s, 2H), 2.60-2.54 (m, 2H), 1.84-1.72 (m, 4H), 1.15 (s, 6H). $^{13}$C{$^1$H} NMR (CDCl$_3$): δ 142.00, 140.15, 134.50, 133.18, 127.15, 121.63, 47.71, 46.03, 39.45, 29.50, 29.36, 26.77, 23.19.

A Mixture of 2,5,5-trimethyl-1,4,5,6,7,8,9,10-octahydrobenzo[e]as-indacen-3(2H)-one and 2,5,5-trimethyl-3,4,5,6,7,8,9,10-octahydrobenzo[e]as-indacen-1(2H)-one

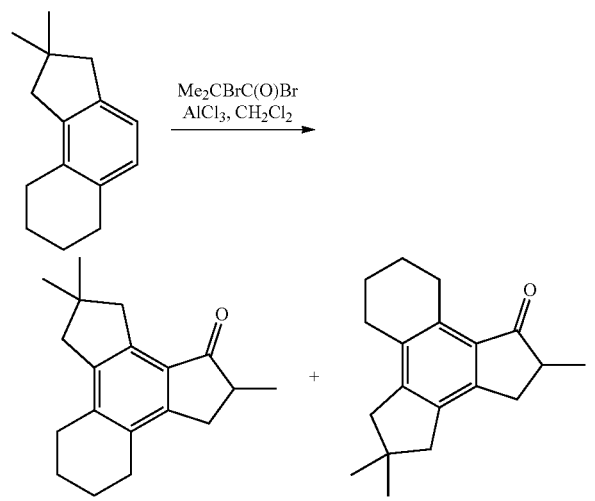

To a cooled to −40° C. suspension of 142 g (1.07 mol, 2.67 equiv.) of AlCl$_3$ in 150 ml of dichloromethane, 91.8 g (399 mmol) of 2-bromo-2-methylpropionyl bromide was added, then a solution of 80.0 g (399 mol) of 2,2-dimethyl-2,3,6,7,8,9-hexahydro-1H-cyclopenta[a]naphthalene in 150 ml of dichloromethane was added dropwise over 30 minutes by vigorous stirring. The cooling bath was then removed, and the solution was stirred for 5 hours at room temperature. The reaction mixture was poured into 1 kg of crushed ice, the organic phase was separated, and the aqueous phase was extracted by 3×200 ml of dichloromethane. The combined organic extract was washed with aqueous $K_2CO_3$, dried over $K_2CO_3$, passed through a short pad of silica gel 60 (40-63 um), and, finally, the elute was evaporated to dryness to give 108 g (ca. 100%) of a mixture of 2,5,5-trimethyl-1,4,5,6,7,8,9,10-octahydrobenzo[e]as-indacen-3(2H)-one and 2,5,5-trimethyl-3,4,5,6,7,8,9,10-octahydrobenzo[e]as-indacen-1(2H)-one in a ratio ca. 55:45 as an orange oil which completely solidified on standing at room temperature. $^1$H NMR (CDCl$_3$): 3.26-3.08 (m) and 3.04 (s) {sum 3H}, 2.74-2.55 (m, 7H), 2.52-2.48 (m) and 2.48-2.43 (m) {sum 1H}, 1.90-1.72 (m, 4H), 1.29 (d, J=7.3 Hz) and 1.28 (d, J=7.3 Hz) {sum 3H}, 1.20 (s), 1.19 (s), 1.17 (s) and 1.16 (s) {sum 6H}.

A Mixture of 2,2,5-trimethyl-1,2,3,4,7,8,9,10-octahydrobenzo[e]as-indacene and 2,2,5-trimethyl-1,2,3,6,7,8,9,10-octahydrobenzo[e]as-indacene

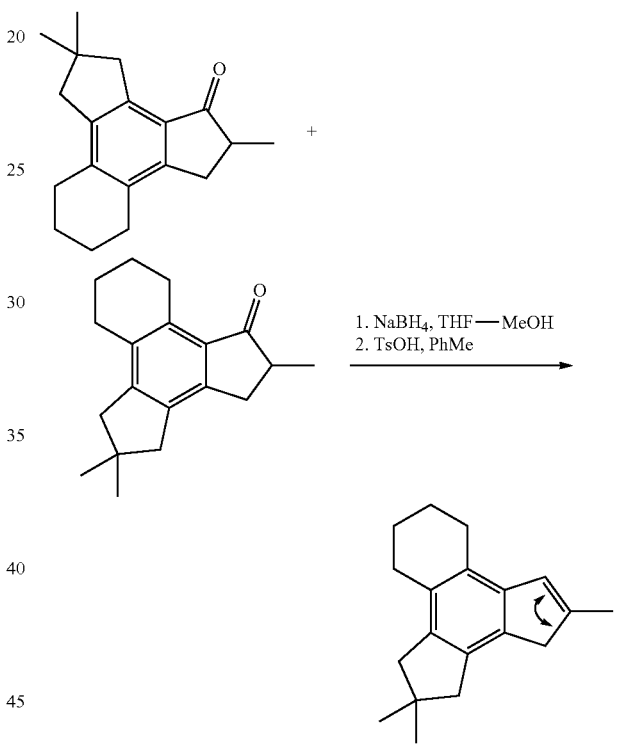

To a cooled to 5° C. solution of 108 g (ca. 399 mmol) of a mixture of 2,5,5-trimethyl-1,4,5,6,7,8,9,10-octahydrobenzo[e]as-indacen-3(2H)-one and 2,5,5-trimethyl-3,4,5,6,7,8,9,10-octahydrobenzo[e]as-indacen-1(2H)-one (obtained as described above) in 400 ml of THF, 22.7 g (600 mmol) of NaBH$_4$ was added. Further on, 200 ml of methanol was added dropwise to this vigorously stirred mixture for ca. 5 hours at 5° C. The resulting mixture was stirred for 3 hours at room temperature, then evaporated to dryness, and the residue was partitioned between 1,000 ml of dichloromethane and 600 ml of 1 M HCl. The organic layer was separated, and the aqueous layer was additionally extracted with 200 ml of dichloromethane. The combined organic extract was evaporated to dryness to give yellowish oil. To a solution of this oil in 800 ml of toluene 1 g of TsOH was added, and this mixture was refluxed with Dean-Stark head for 15 minutes and then cooled to room temperature using a water bath. The resulting solution was washed by 10% $K_2CO_3$. The organic layer was separated, and the aqueous layer was extracted with 2×150 ml of dichloromethane. The combined organic extract was dried over $K_2CO_3$ and then passed through a short pad of silica gel 60 (40-63 um). The silica gel pad was additionally washed by 100 ml of dichloromethane. The combined organic elute was evaporated to dryness to yield reddish oil which completely solidified at room temperature. This crude product was distilled in vacuum, b.p.128-140° C./1 mm Hg, and the distillate was recrystallized from n-hexane at −30° C. to give 73.6 g (73%) of a ca. 55:45 mixture of 2,2,5-trimethyl-1,2,3,4,7,8,9,10-octahydrobenzo[e]as-indacene and 2,2,5-trimethyl-1,2,3,6,7,8,9,10-octahydrobenzo[e]as-indacene as a white solid. $^1H$ NMR ($CDCl_3$): 6.53 (m) and 6.40 (m) {sum 1H}, 3.11 (s) and 3.09 (s) {sum 2H}, 2.80 (br.s, 1H), 2.76 (s, 1H), 2.67 (s, 2H), 2.63-2.55 (m, 4H), 2.14 (s, 3H), 1.86-1.76 (m, 4H), 1.18 (s) and 1.17 (s) {sum 6H}. $^{13}C\{^1H\}$ NMR ($CDCl_3$): δ 144.60, 144.06, 142.76, 140.37, 139.88, 138.71, 137.88, 135.87, 134.86, 131.56, 130.86, 129.53, 128.46, 126.26, 125.43, 125.18, 46.27, 46.06, 45.95, 41.34, 39.58, 39.54, 29.68, 29.60, 27.13, 27.02, 26.74, 26.55, 23.42, 23.25, 23.17, 23.06, 16.94, 16.89.

Chloro(dimethyl)(2,5,5-trimethyl-3,4,5,6,7,8,9,10-octahydrobenzo[e]as-indacen-3-yl)silane

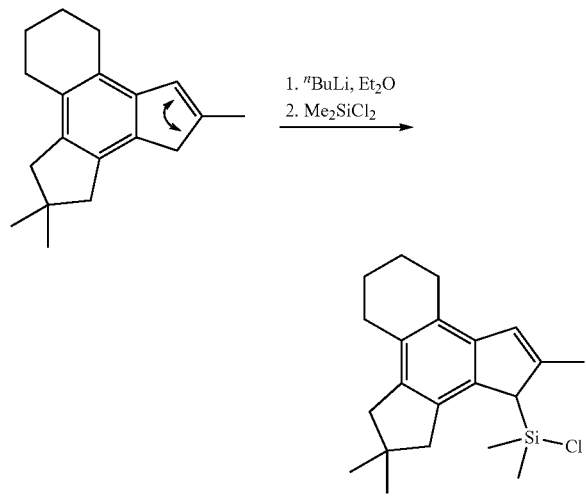

To a cooled to −50° C. solution of 12.6 g (50.0 mmol) of a mixture of 2,2,5-trimethyl-1,2,3,4,7,8,9,10-octahydrobenzo[e]as-indacene and 2,2,5-trimethyl-1,2,3,6,7,8,9,10-octahydrobenzo[e]as-indacene (obtained as described above) in 250 ml of ether, 20.6 ml (50.1 mmol) of 2.43 M $^n$BuLi in hexanes was added. The resulting heterogeneous mixture was stirred for 6 hours at room temperature, then cooled to −50° C., and 20 ml of THF was added followed by 32.3 g (250 mmol, 5 equivs.) of dichlorodimethylsilane. The resulting solution was stirred overnight at room temperature, then filtered through glass frit (G3), and the precipitate was additionally washed by 50 ml of toluene. The combined filtrate was evaporated to dryness to give 17.3 g (100%, purity ca. 85%) of the title material as a slightly yellowish viscous oil which was used further without additional purification. $^1H$ NMR ($CDCl_3$): 6.64 (m, 1H), 3.53 (s, 1H), 2.95 (d, J=15.3 Hz, 1H), 2.89-2.74 (m, 2H), 2.70-2.51 (m, 5H), 2.26 (s, 3H), 1.90-1.75 (m, 4H), 1.22 (s, 3H), 1.08 (s, 3H), 0.36 (s, 3H), 0.13 (s, 3H). $^{13}C\{^1H\}$ NMR ($CDCl_3$): δ 144.30, 142.66, 138.03, 136.30, 134.44, 130.54, 126.55, 125.61, 49.93, 47.56, 46.15, 39.97, 29.26, 29.09, 27.11, 26.60, 23.24, 23.12, 17.82, 3.39, 0.03.

$Me_2Si(\eta^5$-2,5,5-trimethyl-3,4,5,6,7,8,9,10-octahydrobenzo[e]as-indacen-3-yl)($\kappa^1$-$N^tBu$)$TiCl_2$ (Complex E)

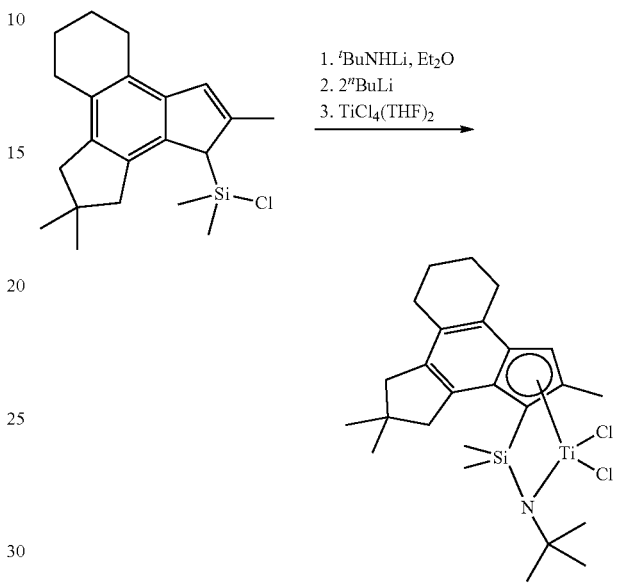

A solution of 3.66 g (50.0 mmol) of tert-butylamine in 200 mL of ether was treated at −50° C. with 20.6 ml (50.1 mmol) of 2.43 M $^n$BuLi in hexanes. The reaction mixture was stirred for 3.5 hours at room temperature, then the resulting white suspension was treated at −50° C. with a solution of 17.3 g (supposedly 50.0 mmol) of chloro(dimethyl)(2,5,5-trimethyl-3,4,5,6,7,8,9,10-octahydrobenzo[e]as-indacen-3-yl)silane (obtained as described above) in 200 ml of ether. The resulting mixture was allowed to warm to room temperature and then stirred overnight. Further on, it was cooled to −50° C., and 41.2 ml (100 mmol) of 2.43 M $^n$BuLi in hexanes was added. This mixture was stirred for 6 hours at room temperature, the resulting brownish-yellow suspension was cooled to −78° C., and 16.7 g (50.02 mmol) of $TiCl_4(THF)_2$ was added in one portion. Thus obtained mixture was stirred for 24 hours at room temperature and then evaporated to dryness. The residue was extracted with 100 ml of warm toluene, and the obtained suspension was filtered while hot through glass frit (G4). The filtrate was evaporated to dryness, the residue was triturated in 100 ml of n-hexane, the obtained suspension was filtered through glass frit (G4), and thus obtained filtrate was evaporated to ca. 60 ml. Burgundy crystals precipitated from this solution overnight at −30° C. were filtered off (G3), washed with n-hexane, and dried in vacuum. This procedure gave 13.7 g (55% based on 2,2,5-trimethyl-1,2,3,6,7,8,9,10-octahydrobenzo[e]as-indacene) of the title complex. Anal. calc. for $C_{25}H_{37}Cl_2NSiTi$: C, 60.24; H, 7.48; N, 2.81. Found: C, 60.47; H, 7.60; N, 2.77. $^1H$ NMR ($CDCl_3$): δ 7.06 (s, 1H), 2.92-2.74 (m, 4H), 2.73-2.54 (m, 4H), 2.41 (s, 3H), 1.93-1.75 (m, 4H), 1.38 (s, 9H), 1.22 (s, 3H), 1.10 (s, 3H), 0.86 (s, 3H), 0.75 (s, 3H). $^{13}C\{^1H\}$ NMR ($CDCl_3$): δ 144.98, 144.49, 136.80, 134.88, 134.03, 133.35, 131.78, 121.78, 95.77, 62.24, 50.50, 46.31, 39.61, 32.42, 29.33, 29.21, 26.99, 26.43, 22.54, 22.15, 20.18, 6.99, 6.91.

Example 6: Synthesis of Me$_2$Si($\eta^5$-2,5,5-trimethyl-3,4,5,6,7,8,9,10-octahydrobenzo[e]as-indacen-3-Yl)($\kappa^1$-N$^t$Bu)TiMe$_2$ (Complex F)

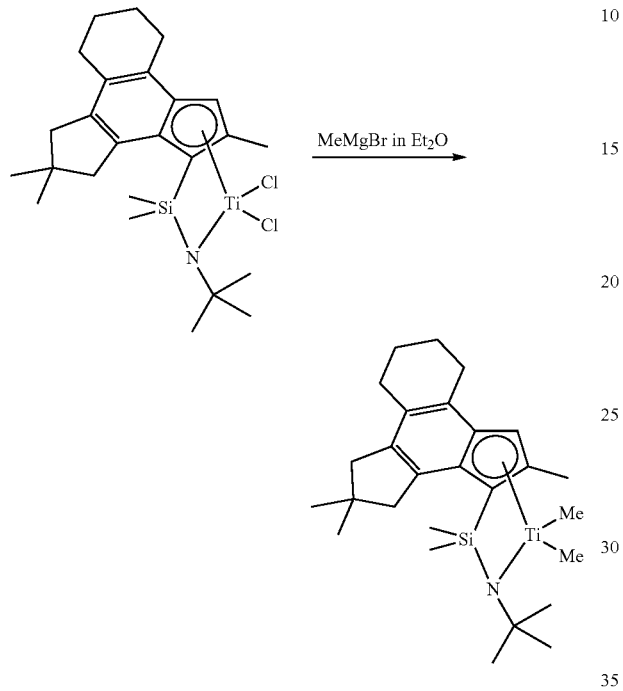

Example 7: Synthesis of Rac-dimethylsilanediylbis[$\eta^5$-2,5,5-trimethyl-3,4,5,6,7,8,9,10-octahydrobenzo[e]as-indacen-3-yl)]zirconium dichloride (Complex G)

Dimethyl[bis(2,5,5-trimethyl-3,4,5,6,7,8,9,10-octahydrobenzo[e]as-indacen-3-yl)]silane

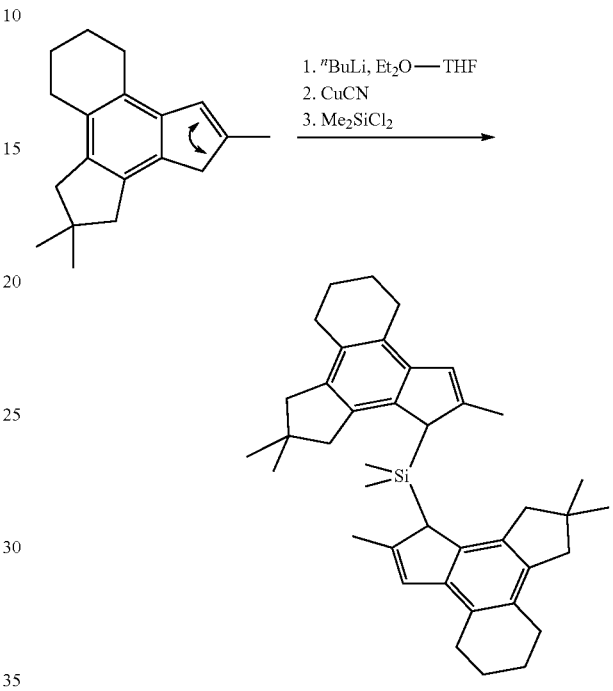

To a cooled to −20° C. solution of 4.98 g (10.0 mmol) of Me$_2$Si($\eta^5$-2,5,5-trimethyl-3,4,5,6,7,8,9,10-octahydrobenzo[e]as-indacen-3-yl)($\kappa^1$-N$^t$Bu)TiCl$_2$ in 100 ml of ether 12.0 ml (30 mmol, 3.0 equivs.) of 2.5 M MeMgBr in ether was added, and the reaction mixture was stirred overnight at room temperature. Further on, 50 ml of toluene was added to the reaction mixture, ether was evaporated under reduced pressure, and the resulting suspension was filtered through glass frit (G4). The filtrate was evaporated to dryness, and the residue was triturated in 50 ml of n-hexane. The obtained suspension was filtered while hot through glass frit (G4) to remove all insoluble materials, and the filtrate was evaporated to ca. 25 ml. Yellow crystals precipitated from this solution overnight at −30° C. were filtered off (G3) and then dried in vacuum. This procedure gave 1.56 g of the title complex. The mother liquor was evaporated to ca. 10 ml. Yellow crystalline solid precipitated from this solution overnight at −30° C. was filtered off (G3) and then dried in vacuum. This procedure gave additional 0.74 g of the title compound. Thus, the total yield of this Ti complex isolated in this synthesis was 2.30 g (50%). Anal. calc. for C$_{27}$H$_{43}$NSiTi: C, 70.87; H, 9.47; N, 3.06. Found: C, 70.99; H, 9.63; N, 9.95. $^1$H NMR (CDCl$_3$): δ 6.97 (s, 1H), 3.02-2.89 (m, 1H), 2.83-2.50 (m, 7H), 2.20 (s, 3H), 1.95-1.72 (m, 4H), 1.49 (s, 9H), 1.19 (s, 3H), 1.06 (s, 3H), 0.64 (s, 3H), 0.57 (s, 3H), 0.45 (s, 3H), −0.66 (s, 3H). $^{13}$C{$^1$H} NMR (CDCl$_3$): δ 141.17, 140.69, 136.56, 131.34, 131.28, 130.19, 129.71, 114.92, 88.23, 57.81, 52.90, 50.60, 48.54, 46.34, 39.39, 34.32, 29.43, 29.40, 26.91, 26.69, 23.05, 22.62, 19.43, 7.58, 7.51.

To a cooled to −50° C. suspension of 12.6 g (50.0 mmol) of a mixture of 2,2,5-trimethyl-1,2,3,4,7,8,9,10-octahydrobenzo[e]as-indacene and 2,2,5-trimethyl-1,2,3,6,7,8,9,10-octahydrobenzo[e]as-indacene (prepared as described above) in 250 ml of ether, 20.6 ml (50.1 mmol) of 2.43 M $^n$BuLi in hexanes was added. The resulting heterogeneous mixture was stirred for 5 hours at room temperature, then cooled to −50° C., and 20 ml of THF followed by 200 mg of CuCN were added. The resulting mixture was stirred for 30 minutes at −25° C., and then 3.23 g (25.0 mmol) of dimethyldichlorosilane was added in one portion. This mixture was stirred overnight at ambient temperature, then filtered through a pad of silica gel 60 (40-63 um) which was additionally washed with 2×50 ml of dichloromethane. The combined elute was evaporated to dryness under reduced pressure, and the residue was dried in vacuum to give a crude product as a brownish glass. This material was purified by flash-chromatography on silica gel 60 (40-63 μm; eluent: hexanes:dichloromethane=10:1, vol.) to give 9.93 g (71%) of a yellowish glassy solid containing ca. 75% of a 1:1 mixture of the diastereoisomers of dimethyl[bis(2,5,5-trimethyl-3,4,5,6,7,8,9,10-octahydrobenzo[e]as-indacen-3-yl)]silane and ca. 25% of other isomers. Dimethyl[bis(2,5,5-trimethyl-3,4,5,6,7,8,9,10-octahydrobenzo[e]as-indacen-3-yl)]silane (a mixture of two diastereomers). $^1$H NMR (CDCl$_3$): δ 6.82 (s) and 6.57 (s) {sum 1H}, 3.66 (s) and 3.63 (s) {sum 1H}, 2.92-2.70 (m, 3H), 2.69-2.50 (m, 5H), 2.35 (s) and 2.19 (s) {sum 3H}, 1.90-1.72 (m, 4H), 1.17 (s) and 1.08 (s) {sum 6H}, −0.29 (s), −0.33 (s) and −0.40 (s) {sum 3H}. $^{13}$C{$^1$H} NMR(CDCl$_3$): δ 145.82, 142.51, 139.12, 138.92, 137.46, 137.38, 133.92, 133.67, 129.75, 129.71, 126.33, 126.28, 124.55, 124.51, 48.18, 47.81, 47.61, 47.29, 46.19, 39.76, 29.48, 29.42, 29.29, 27.10, 26.65, 23.32, 23.20, 18.53, 18.15, −1.73, −2.85, −3.51.

Rac-dimethylsilanediylbis[η⁵-2,5,5-trimethyl-3,4,5, 6,7,8,9,10-octahydrobenzo[e]as-indacen-3-yl)]zirconium dichloride (Complex G)

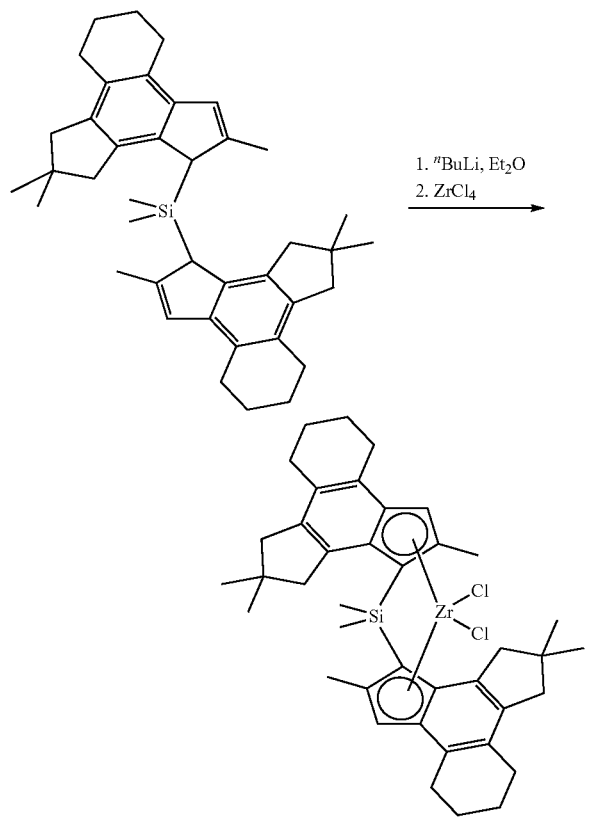

To a cooled to −50° C. solution of 9.93 g (17.7 mmol) of dimethyl[bis(2,5,5-trimethyl-3,4,5,6,7,8,9,10-octahydrobenzo[e]as-indacen-3-yl)]silane (prepared as described above) in 200 ml of ether, 14.6 ml (35.5 mmol) of 2.43 M $^n$BuLi in hexanes was added. This mixture was stirred overnight at room temperature, then the resulting orange solution was cooled to −60° C., and 4.13 g (17.7 mmol) of ZrCl₄ was added. The reaction mixture was stirred overnight at room temperature to give orange solution with orange precipitate. This mixture was evaporated to dryness. The residue was stirred with 250 ml of hot toluene, and the formed suspension was filtered through a glass frit (G4). The filtrate was evaporated to ca. 25 ml, 5 ml of n-hexane was added. Orange crystalline solid precipitated from this solution overnight at room temperature was collected and dried in vacuum. This procedure gave 0.78 g of rac-dimethylsilanediylbis[η⁵-2,5,5-trimethyl-3,4,5,6,7,8,9,10-octahydrobenzo[e]as-indacen-3-yl)]zirconium dichloride containing ca. 10% of the isomeric C₁-symmetry complex which is likely to have anti-orientation of the indenyl fragments. To the mother liquor 25 ml of ether was added, orange crystalline solid fallen from this solution was filtered off (G4) and dried in vacuum to give 1.30 g of the same mixture of the complexes. Thus, the total yield of rac-dimethylsilanediylbis[η⁵-2,5,5-trimethyl-3,4,5,6,7,8,9,10-octahydrobenzo[e]as-indacen-3-yl)]zirconium dichloride contaminated with ca. 10% of the isomeric C₁-symmetry complex was 2.08 g (16%). ¹H NMR (CDCl₃): δ 6.78 (s, 1H), 3.03 (d, J=15.5 Hz, 1H), 2.78-2.58 (m, 6H), 2.53 (d, J=15.9 Hz, 1H), 2.11 (s, 3H), 1.94-1.69 (m, 4H), 1.25 (s, 3H), 1.21 (s, 3H), 1.01 (s, 3H). ¹³C{¹H} NMR (CDCl₃): δ 143.42, 133.32, 132.59, 131.98, 131.49, 131.37, 128.15, 121.69, 81.57, 52.02, 46.55, 39.74, 29.51, 27.02, 26.50, 22.81, 22.33, 19.06, 5.85.

Polymerization Examples

Solutions of the pre-catalysts were made using toluene (ExxonMobil Chemical—anhydrous, stored under N₂) (98%). Pre-catalyst solutions were typically 0.5 mmol/L.

Solvents, polymerization grade toluene and/or isohexanes were supplied by ExxonMobil Chemical Co. and are purified by passing through a series of columns: two 500 cc Oxyclear cylinders in series from Labclear (Oakland, Calif.), followed by two 500 cc columns in series packed with dried 3 Å mole sieves (8-12 mesh; Aldrich Chemical Company), and two 500 cc columns in series packed with dried 5 Å mole sieves (8-12 mesh; Aldrich Chemical Company).

1-octene (C₈; 98%, Aldrich Chemical Company) was dried by stirring over NaK overnight followed by filtration through basic alumina (Aldrich Chemical Company, Brockman Basic 1).

Polymerization grade ethylene (C₂) was used and further purified by passing it through a series of columns: 500 cc Oxyclear cylinder from Labclear (Oakland, Calif.) followed by a 500 cc column packed with dried 3 Å mole sieves (8-12 mesh; Aldrich Chemical Company), and a 500 cc column packed with dried 5 Å mole sieves (8-12 mesh; Aldrich Chemical Company).

Polymerization grade propylene (C₃) was used and further purified by passing it through a series of columns: 2250 cc Oxiclear cylinder from Labclear followed by a 2250 cc column packed with 3 Å mole sieves (8-12 mesh; Aldrich Chemical Company), then two 500 cc columns in series packed with 5 Å mole sieves (8-12 mesh; Aldrich Chemical Company), then a 500 cc column packed with Selexsorb CD (BASF), and finally a 500 cc column packed with Selexsorb COS (BASF).

Activation of the pre-catalysts was either by methylalumoxane (MAO, 10 wt % in toluene, Albemarle Corp.; Act ID=1), dimethylanilinium tetrakisperfluorophenylborate (Boulder Scientific or W. R. Grace & Co.; Act ID=2) or dimethylanilinium tetrakisperfluoronaphthalenylborate (W. R. Grace & Co; Act ID=3). MAO was used as a 0.5 wt % or 1.0 wt % in toluene solution. Micromoles of MAO reported in the experimental section are based on the micromoles of aluminum in MAO. The formula weight of MAO is 58.0 grams/mole. Dimethylanilinium tetrakisperfluorophenylborate and dimethylanilinium tetrakis(perfluoronaphthalenyl)borate were typically used as a 5 mmol/L solution in toluene.

For polymerization runs using dimethylanilinium tetrakisperfluorophenylborate or dimethylanilinium tetrakisperfluoronaphthalenylborate, tri-n-octylaluminum (TnOAl, Neat, AkzoNobel) was also used as a scavenger prior to introduction of the activator and pre-catalyst into the reactor. TnOAl was typically used as a 5 mmol/L solution in toluene.

Reactor Description and Preparation:

Polymerizations were conducted in an inert atmosphere (N2) drybox using autoclaves equipped with an external heater for temperature control, glass inserts (internal volume of reactor=23.5 mL for C₂ and C₂/C₈; 22.5 mL for C₃ and C$_2$/C$_3$ runs), septum inlets, regulated supply of nitrogen, ethylene and propylene, and equipped with disposable PEEK mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-Octene Copolymerization (EO):

The reactor was prepared as described above, and then purged with ethylene. For MAO (Act ID=1) activated runs, toluene, 1-octene (100 µL when used), and activator (MAO) were added via syringe at room temperature and atmospheric pressure. The reactor was then brought to process temperature (80° C.) and charged with ethylene to process pressure (75 psig=618.5 kPa or 200 psig=1480.3 kPa) while stirring at 800 RPM. The pre-catalyst solution was then added via syringe to the reactor at process conditions. For dimethylanilinium tetrakisperfluorophenylborate (Act ID=2) activated runs, toluene, 1-octene (100 µL when used) and scavenger (TnOAl, 0.5 µmol) were added via syringe at room temperature and atmospheric pressure. The reactor was then brought to process temperature (80° C.) and charged with ethylene to process pressure (75 psig=618.5 kPa or 200 psig=1480.3 kPa) while stirring at 800 RPM. The activator solution, followed by the pre-catalyst solution, was injected via syringe to the reactor at process conditions. Ethylene was allowed to enter (through the use of computer controlled solenoid valves) the autoclaves during polymerization to maintain reactor gauge pressure (+/−2 psig). Reactor temperature was monitored and typically maintained within +/−1° C. Polymerizations were halted by addition of approximately 50 psi compressed air to the autoclave for approximately 30 seconds. The polymerizations were quenched after a predetermined cumulative amount of ethylene had been added (maximum quench value in psid) or for a maximum of 30 minutes polymerization time. Afterwards, the reactors were cooled and vented. Polymers were isolated after the solvent was removed in-vacuo. Yields reported include total weight of polymer and residual catalyst. Catalyst activity is reported as grams of polymer per mmol transition metal compound per hour of reaction time (g/mmol·hr). Ethylene homopolymerization runs are summarized in Table 1, and ethylene/1-octene copolymerization runs are summarized in Table 2.

Propylene Polymerization (PP):

The reactor was prepared as described above, then heated to 40° C., and then purged with propylene gas at atmospheric pressure. For MAO activated runs, toluene or isohexane, MAO, and liquid propylene (1.0 mL) were added via syringe. The reactor was then heated to process temperature (70° C. or 100° C.) while stirring at 800 RPM. The pre-catalyst solution was added via syringe with the reactor at process conditions. For dimethylanilinium tetrakisperfluorophenylborate or dimethylanilinium tetrakisperfluoronaphthalenylborate activated runs, toluene or isohexanes, liquid propylene (1.0 mL) and scavenger (TnOAl, 0.5 µmol) were added via syringe. The reactor was then brought to process temperature (70 or 100° C.) while stirring at 800 RPM. The activator solution, followed by the pre-catalyst solution, were injected via syringe to the reactor at process conditions. Reactor temperature was monitored and typically maintained within +/−1° C. Polymerizations were halted by addition of approximately 50 psi compressed air to the autoclaves for approximately 30 seconds. The polymerizations were quenched based on a predetermined pressure loss (maximum quench value) or for a maximum of 30 minutes. The reactors were cooled and vented. The polymers were isolated after the solvent was removed in-vacuo. The actual quench time (s) is reported as quench time (s). Yields reported include total weight of polymer and residual catalyst. Catalyst activity is reported as grams of polymer per mmol transition metal compound per hour of reaction time (g/mmol·hr). Propylene homopolymerization examples are reported in Table 3 with additional characterization in Table 4.

Propylene Polymerization and Ethylene-Propylene Copolymerization (EP):

The reactor was prepared as described above, then heated to 40° C. and then purged with ethylene gas at atmospheric pressure for reactors using ethylene. The listed ethylene pressure (0, 20, 40, 60 or 80 psid) was then added to the reactor. Isohexanes or toluene and scavenger (TnOAl, 0.5 µmol) were added via syringe. The stirrers were then started and maintained at 800 RPM. Liquid propylene (1.0 ml) was then injected into the reactor. The reactor was then brought to process temperature (70° C.). The activator solution, followed by the pre-catalyst solution, was injected via syringe to the reactor at process conditions. Reactor temperature was monitored and typically maintained within +/−1° C. Polymerizations were halted by addition of approximately 50 psi compressed air to the autoclaves for approximately 30 seconds. The polymerizations were quenched based on a predetermined pressure loss (quench value) of approximately 5-8 psid pressure loss or for a maximum of 30 minutes polymerization time. The reactors were cooled and vented. The polymer was isolated after the solvent was removed in-vacuo. The quench times are reported in Table 5 for each run. Yields reported include total weight of polymer and residual catalyst. Catalyst activity is reported as grams of polymer per mmol transition metal compound per hour of reaction time (g/mmol·hr). Propylene polymerization examples and ethylene/propylene copolymerization examples are collected in Table 5.

Polymer Characterization

For analytical testing, polymer sample solutions were prepared by dissolving polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 to 0.9 mg/mL with a BHT concentration of 1.25 mg BHT/mL of TCB. Samples were cooled to 135° C. for testing.

Gel Permeation Chromatography

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity index (PDI) of the polymer, were measured by Gel Permeation Chromatography using a Symyx Technology GPC equipped with evaporative light scattering detector (ELSD) and calibrated using polystyrene standards (Polymer Laboratories: Polystyrene Calibration Kit S-M-10: Mp (peak Mw) between 5,000 and 3,390,000). Alternatively, samples were measured by Gel Permeation Chromatography using a Symyx Technology GPC equipped with dual wavelength infrared detector and calibrated using polystyrene standards (Polymer Laboratories: Polystyrene Calibration Kit S-M-10: Mp (peak Mw) between 580 and 3,039,000). Samples (250 µL of a polymer solution in TCB were injected into the system) were run at an eluent flow rate of 2.0 mL/minute (135° C. sample temperatures, 165° C. oven/ columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards. Molecular weight data is reported in Tables 1, 2, 3 and 5 under the headings Mn, Mw and PDI as defined above. PDI values marked with an "*" indicate that the dual wavelength infrared detector was used; no additional marking indicates that the ELSD was used.

Differential Scanning Calorimetry

Differential Scanning Calorimetry (DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period. The results are reported in the Tables 1, 2, 3 and 5 under the heading, Tm (° C.).

FTIR

Samples for infrared analysis were prepared by depositing the stabilized polymer solution onto a silanized wafer. By this method, approximately between 0.12 and 0.24 mg of polymer is deposited on the wafer cell. The samples were subsequently analyzed on a Brucker Equinox 55 FTIR spectrometer equipped with Pikes' MappIR specular reflectance sample accessory. Spectra, covering a spectral range of 5,000 $cm^{-1}$ to 500 $cm^{-1}$, were collected at a 2 $cm^{-1}$ resolution with 32 scans. For ethylene-1-octene copolymers, the wt % octene in the copolymer was determined via measurement of the methyl deformation band at ~1375 $cm^{-1}$. The peak height of this band was normalized by the combination and overtone band at ~4321 $cm^{-1}$, which corrects for path length differences. The normalized peak height was correlated to individual calibration curves from $^1H$ NMR data to predict the wt % octene content within a concentration range of ~2 to 35 wt % for octene. Typically, $R^2$ correlations of 0.98 or greater are achieved. These numbers are reported in Table 2 under the heading $C_8$ (wt %).

For ethylene-propylene copolymers, the wt. % ethylene can be determined via measurement of the methylene rocking band (~770 $cm^{-1}$ to 700 cm-1). The peak area of this band is normalized by sum of the band areas of the combination and overtone bands in the 4,500 $cm^{-1}$ to 4,000 $cm^{-1}$ range. The normalized band area is then correlated to a calibration curve from $^{13}C$ NMR data to predict the wt. % ethylene within a concentration range of ~5 to 50 wt. %. Typically, $R^2$ correlations of 0.98 or greater are achieved. These numbers are reported in Table 5 under the heading $C_2$ wt. %.

$^1H$ NMR $^1H$ NMR data for EP copolymers was collected at 120° C. using a 5 mm broadband probe with a field strength of at least 500 MHz Bruker spectrometer with 1,1,2,2-tetrachloroethane-$d_2$ (tce-$d_2$) as the solvent. Samples were prepared with a concentration of 30 mg/mL at 140° C. Data was recorded with a 30° pulse, 5 second delay, and 512 transients. Chemical shift is referenced to the residual proton of the solvent at 5.98 ppm. Method for determination of composition and region assignments based on Cheng, H.; *J. Poly Sci. Part B: Poly Physics*, v. 25, pg. 2355 (1987) and Cheng and Lee *Poly. Bulletin*; pg. 12,463 (1984). This assumes no region defects or chain ends.

| Region | Chemical Shift Range (ppm) |
|---|---|
| A | 2-1.48 |
| B | 1.48-1.24 |
| C | 1.24-1.04 |
| D | 1.04-0.6 |

$^{13}C$ NMR $^{13}C$ NMR spectroscopy was used to characterize some polypropylene polymer samples produced in experiments collected in Table 3. This data is collected in Table 4. Unless otherwise indicated the polymer samples for $^{13}C$ NMR spectroscopy were dissolved in $d_2$-1,1,2,2-tetrachloroethane and the samples were recorded at 125° C. using a NMR spectrometer with a $^{13}C$ NMR frequency of 150 MHz. Polymer resonance peaks are referenced to mmmm=21.8 ppm. Calculations involved in the characterization of polymers by NMR follow the work of F. A. Bovey in "Polymer Conformation and Configuration" Academic Press, New York 1969 and J. Randall in "Polymer Sequence Determination, Carbon-13 NMR Method", Academic Press, New York, 1977.

The stereo-defects measured as "stereo defects/10,000 monomer units" are calculated from the sum of the intensities of mmrr, mmrr+rmrr, and rmrm resonance peaks times 5,000. The intensities used in the calculations are normalized to the total number of monomers in the sample. Methods for measuring 2,1 regio defects/10,000 monomers and 1,3 regio defects/10,000 monomers follow standard methods. Additional references include Grassi, A. et.al. *Macromolecules,* 1988, v. 21, pp. 617-622 and Busico et.al. *Macromolecules,* 1994, v. 27, pp. 7538-7543. The average meso run length=10000/[(stereo defects/10000 C)+(2,1-regio defects/10000 C)+(1,3-regio-defects/10000 C)].

Polymerization results are collected in Tables 1, 2, 3, 4, and 5 below. "EX #" stands for example number, and those numbers having a "*" after the number are comparative examples. "Cat ID" identifies the pre-catalyst used in the experiment. Corresponding letters identifying the pre-catalyst are located in the synthetic experimental section. "Cat (μmol)" is the amount of pre-catalyst added to the reactor. For all experiments using dimethylanilinium tetrakisperfluorophenylborate (Act ID=2) or dimethylanilinium tetrakisperfluoronaphthalenylborate (Act ID=3), the molar ratio of activator/pre-catalyst was 1.1. For all experiments using MAO (Act ID=1) as the activator, a 500 Al/M molar ratio was used. T(° C.) is the polymerization temperature which was typically maintained within +/−1° C. "Yield" is polymer yield, and is not corrected for catalyst residue. "Quench time (s)" is the actual duration of the polymerization run in seconds. "Quench Value (psid)" for ethylene based polymerization runs (no propylene) is the set maximum amount of ethylene uptake (conversion) for the experiment. If a polymerization quench time is less than the maximum time set, then the polymerization was run until the set maximum value of ethylene uptake was reached. For propylene homopolymerization runs and ethylene-propylene copolymerization runs, quench value indicates the maximum set pressure loss (conversion) of propylene (for PP runs) or ethylene and propylene combined (for EP runs) during the polymerization. Activity is reported at grams polymer per mmol of catalyst per hour. Pre-catalysts used in the polymerization experiments are summarized below:

Complex A
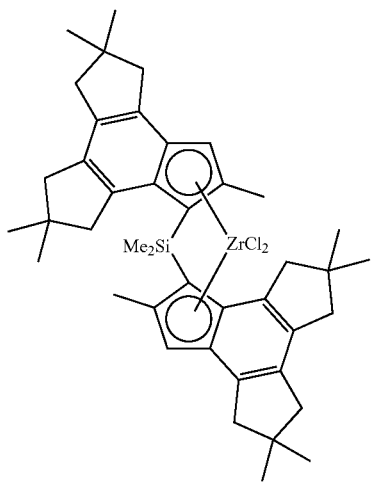
Complex B
Complex C
Complex D
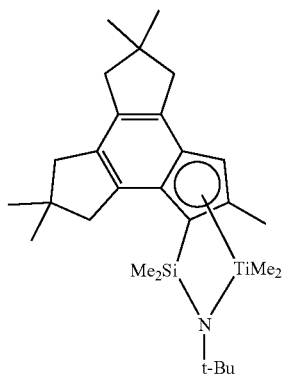
Complex E
Complex F
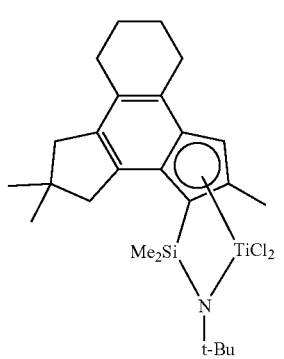
Complex G
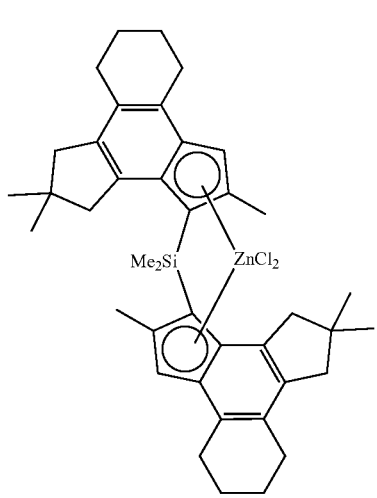

Comparative Complex H
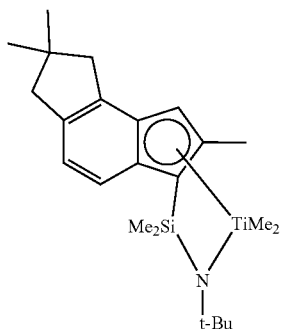
Comparative Complex J
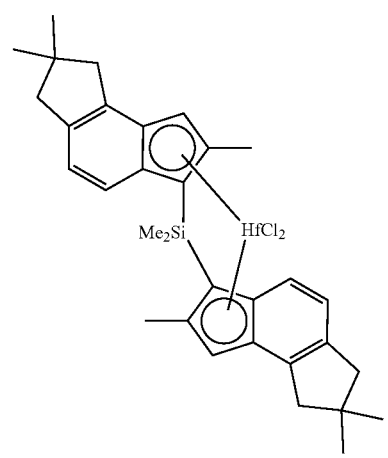
Comparative Complex I
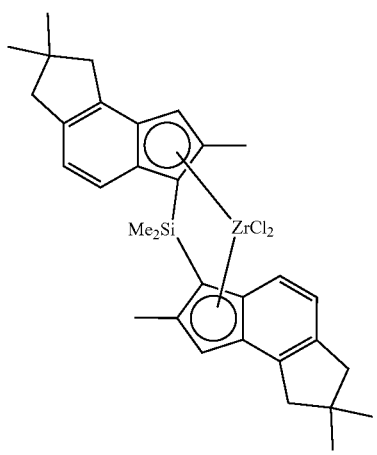
Comparative Complex K
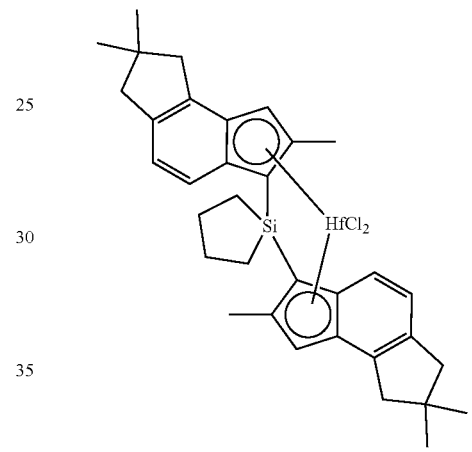
TABLE 1
Ethylene polymerization examples
| EX# | Cat ID | Act ID | quench time (s) | yield (g) | Activity (g P/mmol cat. hr) | Mn g/mol | Mw g/mol | Mz g/mol | PDI Mw/Mn | Tm (° C.) |
|---|---|---|---|---|---|---|---|---|---|---|
| 1 | A | 1 | 32 | 0.0890 | 400,500 | 227,552 | 405,365 | 881,439 | 1.78 | 135.3 |
| 2 | A | 1 | 34 | 0.0909 | 384,988 | 198,399 | 378,068 | 821,566 | 1.91 | 135.4 |
| 3 | A | 1 | 32 | 0.0933 | 419,850 | 169,888 | 367,667 | 847,924 | 2.16 | 135.8 |
| 4 | B | 1 | 140 | 0.0895 | 92,057 | 1,017,593 | 2,169,870 | 4,927,620 | 2.13 | 135.1 |
| 5 | B | 1 | 176 | 0.0918 | 75,109 | 760,245 | 1,647,065 | 4,115,173 | 2.17 | 134.2 |
| 6 | B | 1 | 140 | 0.0901 | 92,674 | 769,283 | 1,508,467 | 3,436,220 | 1.96 | 135.0 |
| 7 | G | 1 | 21 | 0.1062 | 728,229 | 199,656 | 371,488 | 1,020,277 | 1.86 | 135.7 |
| 8 | G | 1 | 37 | 0.1113 | 433,168 | 210,239 | 398,178 | 1,081,593 | 1.89 | 135.4 |
| 9 | G | 1 | 27 | 0.1050 | 560,000 | 201,098 | 343,918 | 684,098 | 1.71 | 135.9 |
| 10* | I | 1 | 14 | 0.0774 | 813,547 | 325,462 | 535,075 | | 1.64 | 135.9 |
| 11* | I | 1 | 63 | 0.0941 | 216,806 | 352,585 | 586,832 | | 1.66 | 134.1 |
| 12* | I | 1 | 64 | 0.0958 | 217,247 | 407,129 | 646,034 | | 1.59 | 133.6 |
| 13* | J | 1 | 238 | 0.0847 | 51,333 | 825,734 | 1,458,366 | | 1.77 | 134.7 |
| 14* | J | 1 | 283 | 0.0861 | 43,842 | | | | | |
| 15* | J | 1 | 153 | 0.0828 | 78,134 | 875,659 | 1,538,837 | | 1.76 | 134.4 |
| 16* | K | 1 | 148 | 0.1005 | 97,652 | 617,808 | 1,156,018 | | 1.87 | 135.9 |
| 17* | K | 1 | 309 | 0.0895 | 41,655 | 760,749 | 1,490,739 | | 1.96 | 134.9 |
| 18* | K | 1 | 255 | 0.0914 | 51,553 | 657,812 | 1,234,986 | | 1.88 | 135.6 |
| 19 | C | 1 | 264 | 0.0831 | 45,327 | 1,383,689 | 574,102 | 4,166,960 | 2.41 | 126.0 |
| 20 | C | 1 | 304 | 0.0777 | 36,805 | 438,725 | 1,343,154 | 5,255,307 | 3.06 | 126.3 |
| 21 | C | 1 | 252 | 0.0666 | 38,057 | 540,069 | 1,332,280 | 4,134,994 | 2.47 | 127.8 |
| 22 | D | 2 | 12 | 0.0927 | 1,112,400 | 1,252,691 | 2,695,820 | 5,850,227 | 2.15 | 135.6 |
| 23 | D | 2 | 24 | 0.0945 | 567,000 | 1,309,290 | 2,915,771 | 5,982,796 | 2.23 | 134.1 |
| 24 | D | 2 | 23 | 0.0952 | 596,035 | 1,097,079 | 2,786,853 | 5,877,394 | 2.54 | 135.6 |

TABLE 1-continued

Ethylene polymerization examples

| EX# | Cat ID | Act ID | quench time (s) | yield (g) | Activity (g P/mmol cat. hr) | Mn g/mol | Mw g/mol | Mz g/mol | PDI Mw/Mn | Tm (° C.) |
|---|---|---|---|---|---|---|---|---|---|---|
| 25 | D | 1 | 300 | 0.0824 | 39,552 | 487,917 | 1,171,918 | 3,853,022 | 2.40 | 133.6 |
| 26 | D | 1 | 381 | 0.0744 | 28,120 | 333,639 | 1,072,456 | 3,826,251 | 3.21 | |
| 27 | D | 1 | 300 | 0.0829 | 39,792 | 455,284 | 1,232,697 | 4,029,368 | 2.71 | 133.7 |
| 28 | E | 1 | 314 | 0.0898 | 41,182 | 430,093 | 1,400,731 | 4,413,994 | 3.26 | 133.5 |
| 29 | E | 1 | 223 | 0.0876 | 56,567 | 434,203 | 1,387,832 | 4,167,410 | 3.20 | 133.2 |
| 30 | E | 1 | 278 | 0.0957 | 49,571 | 473,485 | 1,496,426 | 4,333,421 | 3.16 | 133.1 |
| 31 | F | 2 | 30 | 0.0910 | 436,800 | | | | | 135.0 |
| 32 | F | 2 | 12 | 0.0926 | 1,111,200 | 1,218,964 | 2,807,146 | 5,527,833 | 2.30 | 134.8 |
| 33 | F | 2 | 23 | 0.0967 | 605,426 | 1,021,957 | 2,463,888 | 5,095,359 | 2.41 | 134.5 |
| 34 | F | 1 | 335 | 0.0754 | 32,411 | 414,515 | 977,612 | 3,009,600 | 2.36 | 133.9 |
| 35 | F | 1 | 302 | 0.0766 | 36,525 | 373,874 | 904,913 | 3,851,598 | 2.42 | 133.9 |
| 36 | F | 1 | 308 | 0.0831 | 38,852 | 427,551 | 995,219 | 3,281,278 | 2.33 | 134.0 |
| 37* | H | 2 | 12 | 0.0956 | 1,197,078 | 2,084,724 | 3,419,614 | | 1.64 | 132.1 |
| 38* | H | 2 | 16 | 0.0926 | 818,061 | 1,899,984 | 3,459,165 | | 1.82 | 133.4 |
| 39* | H | 2 | 19 | 0.0914 | 707,613 | 2,081,871 | 3,335,367 | | 1.60 | 132.2 |
| 40* | H | 1 | 269 | 0.0713 | 38,182 | 337,277 | 576,994 | | 1.71 | 132.8 |
| 41* | H | 1 | 323 | 0.0659 | 29,407 | 353,424 | 718,840 | | 2.03 | 133.0 |
| 42* | H | 1 | 253 | 0.0667 | 38,039 | 301,429 | 521,674 | | 1.73 | 132.9 |

*Indicates a comparative example

General reaction conditions: Total solvent volume including catalyst and activator diluents was 5.0 ml toluene; 0.025 umol pre-catalyst and 500 equiv. Act 1 or 1.1 equiv. Act 2; 80° C. polymerization temperature; 75 psi of ethylene with uptake; Quench Value was set at 20 psid ethylene uptake or for a maximum time of 30 minutes.

TABLE 2

Ethylene-1-octene copolymerization examples

| EX# | Cat ID | Act ID | C2 (psig) | quench time (s) | yield (g) | Activity (g P/mmol cat. hr) | Mn g/mol | Mw g/mo; | Mz g/mol | PDI Mw/Mn | C8 (wt %) | Tm (° C.) |
|---|---|---|---|---|---|---|---|---|---|---|---|---|
| 43 | A | 1 | 75 | 31 | 0.1027 | 477,058 | 118,009 | 251,907 | 587,802 | 2.13 | 19.5 | 112.9 |
| 44 | A | 1 | 75 | 28 | 0.1007 | 517,886 | 98,701 | 235,159 | 616,104 | 2.38 | 16.5 | 113.4 |
| 45 | A | 1 | 75 | 28 | 0.1042 | 535,886 | 122,302 | 251,730 | 601,245 | 2.06 | 16.4 | 113.6 |
| 46 | A | 1 | 200 | 27 | 0.2031 | 1,083,200 | 135,148 | 270,530 | 643,424 | 2.00 | 7.2 | 124.2 |
| 47 | A | 1 | 200 | 33 | 0.2049 | 894,109 | 134,190 | 261,315 | 622,605 | 1.95 | 11.6 | 122.6 |
| 48 | A | 1 | 200 | 27 | 0.2061 | 1,099,200 | 168,517 | 303,709 | 698,595 | 1.80 | 8.1 | 123.2 |
| 49 | B | 1 | 75 | 344 | 0.1149 | 48,098 | 283,460 | 845,045 | 2,789,987 | 2.98 | 36.0 | 109.8 |
| 50 | B | 1 | 75 | 290 | 0.1125 | 55,862 | 319,552 | 867,214 | 2,399,855 | 2.71 | 33.2 | 111.7 |
| 51 | B | 1 | 75 | 298 | 0.1138 | 54,991 | 310,563 | 879,357 | 2,929,186 | 2.83 | 40.4 | 108.0 |
| 52 | B | 1 | 200 | 66 | 0.1974 | 430,691 | 527,222 | 1,244,525 | 4,459,487 | 2.36 | 11.4 | 118.0 |
| 53 | B | 1 | 200 | 88 | 0.2142 | 350,509 | 389,666 | 1,079,545 | 3,076,004 | 2.77 | 13.9 | 116.6 |
| 54 | B | 1 | 200 | 94 | 0.2112 | 323,540 | 482,788 | 1,135,329 | 3,139,584 | 2.35 | 15.2 | 116.7 |
| 55 | G | 1 | 75 | 38 | 0.0823 | 311,874 | 158,162 | 292,735 | 705,691 | 1.85 | 8.0 | 120.3 |
| 56 | G | 1 | 75 | 33 | 0.0943 | 411,491 | 147,112 | 272,918 | 638,580 | 1.86 | 9.5 | 121.3 |
| 57 | G | 1 | 75 | 39 | 0.0893 | 329,723 | 125,821 | 266,927 | 689,686 | 2.12 | 7.9 | 120.5 |
| 58 | G | 1 | 200 | 25 | 0.2036 | 1,172,736 | 133,051 | 273,612 | 658,777 | 2.06 | 6.7 | 126.4 |
| 59 | G | 1 | 200 | 20 | 0.1770 | 1,274,400 | 172,413 | 296,084 | 742,472 | 1.72 | 7.1 | 126.2 |
| 60 | G | 1 | 200 | 23 | 0.1738 | 1,088,139 | 157,987 | 315,670 | 819,969 | 2.00 | 5.7 | 126.9 |
| 61* | I | 1 | 75 | 41 | 0.1052 | 374,044 | 193,791 | 333,558 | | 1.72 | 20.6 | 102.0 |
| 62* | I | 1 | 75 | 48 | 0.1149 | 343,270 | 172,913 | 320,715 | | 1.85 | 20.3 | 108.9 |
| 63* | I | 1 | 75 | 49 | 0.4140 | 1,219,141 | 172,459 | 323,262 | | 1.87 | 21.3 | 109.5 |
| 64* | I | 1 | 200 | 36 | 0.1959 | 783,600 | 212,901 | 359,220 | | 1.69 | 7.4 | 121.5 |
| 65* | I | 1 | 200 | 45 | 0.2006 | 643,350 | 215,835 | 389,440 | | 1.80 | 8.0 | 120.9 |
| 66* | I | 1 | 200 | 43 | 0.2063 | 695,719 | 197,190 | 349,667 | | 1.77 | 10.3 | 120.7 |
| 67* | J | 1 | 75 | 116 | 0.0750 | 93,345 | 428,305 | 760,892 | | 1.78 | 17.0 | 109.2 |
| 68* | J | 1 | 75 | 120 | 0.0752 | 90,165 | 441,445 | 798,584 | | 1.81 | 18.0 | 109.3 |
| 69* | J | 1 | 75 | 118 | 0.0814 | 99,000 | 424,104 | 747,317 | | 1.76 | 18.6 | 108.2 |
| 70* | J | 1 | 200 | 125 | 0.1831 | 210,426 | 353,003 | 752,818 | | 2.13 | 13.6 | 116.4 |
| 71* | J | 1 | 200 | 114 | 0.1843 | 233,209 | 385,833 | 818,606 | | 2.12 | 12.3 | 116.8 |
| 72* | J | 1 | 200 | 110 | 0.1809 | 235,957 | 395,743 | 848,736 | | 2.14 | 12.0 | 116.2 |
| 73* | K | 1 | 75 | 122 | 0.0636 | 75,007 | 436,418 | 719,009 | | 1.65 | 11.2 | 110.4 |
| 74* | K | 1 | 75 | 145 | 0.1027 | 102,274 | 351,200 | 711,031 | | 2.02 | 21.5 | 107.2 |
| 75* | K | 1 | 75 | 110 | 0.0783 | 102,876 | 420,857 | 700,468 | | 1.66 | 13.7 | 109.4 |
| 76* | K | 1 | 200 | 107 | 0.1838 | 247,126 | 370,293 | 748,712 | | 2.02 | 8.1 | 118.1 |
| 77* | K | 1 | 200 | 130 | 0.1930 | 213,456 | 307,148 | 842,951 | | 2.74 | 12.8 | 116.2 |
| 78* | K | 1 | 200 | 133 | 0.1901 | 206,599 | 330,605 | 787,487 | | 2.38 | 9.5 | 117.0 |
| 79 | C | 1 | 75 | 142 | 0.0559 | 56,687 | 398,034 | 899,646 | 2,464,223 | 2.26 | 20.6 | 116.4 |
| 80 | C | 1 | 75 | 287 | 0.0858 | 43,049 | 410,119 | 1,166,209 | 4,195,512 | 2.84 | 11.3 | 121.2 |
| 81 | C | 1 | 75 | 156 | 0.0599 | 55,292 | 392,940 | 1,008,078 | 3,349,005 | 2.57 | 15.9 | 122.7 |

TABLE 2-continued

Ethylene-1-octene copolymerization examples

| EX# | Cat ID | Act ID | $C_2$ (psig) | quench time (s) | yield (g) | Activity (g P/mmol cat. hr) | Mn g/mol | Mw g/mo; | Mz g/mol | PDI Mw/Mn | $C_8$ (wt %) | Tm (° C.) |
|---|---|---|---|---|---|---|---|---|---|---|---|---|
| 82 | C | 1 | 200 | 78 | 0.1096 | 202,338 | 511,604 | 1,232,305 | 3,649,843 | 2.41 | 11.1 | 121.6 |
| 83 | C | 1 | 200 | 84 | 0.1244 | 213,257 | 619,086 | 1,335,742 | 3,840,758 | 2.16 | 11.4 | 122.2 |
| 84 | C | 1 | 200 | 74 | 0.1139 | 221,643 | 603,132 | 1,324,851 | 3,931,772 | 2.20 | 7.4 | 125.6 |
| 85 | D | 2 | 75 | 565 | 0.1234 | 31,451 | 134,655 | 730,741 | 3,837,691 | 5.43 | 36.5 | 77.5 |
| 86 | D | 2 | 75 | 487 | 0.1202 | 35,542 | 120,432 | 731,560 | 3,738,484 | 6.07 | 35.7 | 87.3 |
| 87 | D | 2 | 75 | 469 | 0.1227 | 37,673 | 209,840 | 970,177 | 4,201,843 | 4.62 | 32.6 | 88.5 |
| 88 | D | 2 | 200 | 38 | 0.1893 | 717,347 | 272,554 | 1,276,754 | 4,363,529 | 4.68 | 14.7 | 104.2 |
| 89 | D | 2 | 200 | 21 | 0.1746 | 1,197,257 | 293,816 | 1,485,950 | 6,680,601 | 5.06 | 12.6 | 107.4 |
| 90 | D | 2 | 200 | 34 | 0.1890 | 800,471 | 236,273 | 1,240,495 | 4,175,301 | 5.25 | 14.9 | 105.2 |
| 91 | D | 1 | 75 | 177 | 0.0612 | 49,790 | 269,405 | 502,692 | 1,174,762 | 1.87 | 20.1 | 87.6 |
| 92 | D | 1 | 75 | 317 | 0.0925 | 42,019 | 252,054 | 505,545 | 1,116,193 | 2.01 | 23.7 | 90.3 |
| 93 | D | 1 | 75 | 295 | 0.0917 | 44,762 | 251,099 | 500,726 | 1,105,473 | 1.99 | 23.7 | 88.4 |
| 94 | D | 1 | 200 | 144 | 0.1409 | 140,900 | 343,251 | 867,064 | 2,618,065 | 2.53 | 11.9 | 107.5 |
| 95 | D | 1 | 200 | 129 | 0.1489 | 166,214 | 465,530 | 916,504 | 2,424,804 | 1.97 | 12.1 | 106.9 |
| 96 | D | 1 | 200 | 160 | 0.1562 | 140,580 | 451,636 | 964,873 | 3,240,322 | 2.14 | 10.9 | 106.8 |
| 97 | E | 1 | 75 | 403 | 0.1026 | 36,661 | 501,414 | 902,614 | 2,065,728 | 1.80 | 20.8 | 117.0 |
| 98 | E | 1 | 75 | 380 | 0.1026 | 38,880 | 468,117 | 961,777 | 2,589,705 | 2.05 | 24.3 | 115.0 |
| 99 | E | 1 | 75 | 443 | 0.1110 | 36,081 | 342,131 | 901,698 | 3,758,593 | 2.64 | 19.6 | 118.1 |
| 100 | E | 1 | 200 | 120 | 0.2085 | 250,200 | 554,199 | 1,362,047 | 3,531,163 | 2.46 | 13.1 | 120.9 |
| 101 | E | 1 | 200 | 113 | 0.1571 | 200,198 | 642,545 | 1,339,387 | 3,403,958 | 2.08 | 8.4 | 119.9 |
| 102 | E | 1 | 200 | 115 | 0.1642 | 205,607 | 506,284 | 1,443,032 | 4,364,760 | 2.85 | 7.2 | 122.9 |
| 103 | F | 2 | 75 | 158 | 0.1300 | 118,481 | 123,126 | 743,545 | 2,922,439 | 6.04 | 32.0 | 96.6 |
| 104 | F | 2 | 75 | 411 | 0.1262 | 44,216 | 116,496 | 887,769 | 3,962,993 | 7.62 | 28.5 | 98.6 |
| 105 | F | 2 | 75 | 705 | 0.1294 | 26,431 | 106,632 | 857,376 | 6,182,522 | 8.04 | 34.6 | 92.4 |
| 106 | F | 2 | 200 | 36 | 0.1747 | 698,800 | 253,454 | 1,130,281 | 3,233,515 | 4.46 | 14.9 | 106.7 |
| 107 | F | 2 | 200 | 36 | 0.1972 | 788,800 | 193,575 | 1,182,353 | 3,983,020 | 6.11 | 15.2 | 106.6 |
| 108 | F | 2 | 200 | 22 | 0.1908 | 1,248,873 | 112,173 | 1,058,483 | 3,939,967 | 9.44 | 15.2 | 106.9 |
| 109 | F | 1 | 75 | 264 | 0.0943 | 51,436 | 331,210 | 587,180 | 1,190,021 | 1.77 | 23.5 | 89.8 |
| 110 | F | 1 | 75 | 191 | 0.0778 | 58,655 | 390,984 | 633,666 | 1,357,913 | 1.62 | 21.3 | 87.5 |
| 111 | F | 1 | 75 | 364 | 0.0991 | 39,204 | 264,692 | 588,628 | 1,533,088 | 2.22 | 25.8 | 89.8 |
| 112 | F | 1 | 200 | 148 | 0.1705 | 165,892 | 396,140 | 833,837 | 1,918,423 | 2.10 | 15.3 | 106.7 |
| 113 | F | 1 | 200 | 146 | 0.1596 | 157,414 | 434,035 | 894,349 | 2,210,976 | 2.06 | 10.7 | 107.6 |
| 114 | F | 1 | 200 | 97 | 0.1586 | 235,447 | 392,313 | 962,463 | 2,957,824 | 2.45 | 11.4 | 107.4 |
| 115* | H | 2 | 75 | 149 | 0.1153 | 111,133 | 1,375,747 | 3,496,302 | | 2.54 | 30.6 | 108.2 |
| 116* | H | 2 | 75 | 136 | 0.1220 | 128,892 | 384,273 | 2,633,127 | | 6.85 | 35.3 | 84.7 |
| 117* | H | 2 | 75 | 168 | 0.1239 | 106,453 | 194,282 | 822,800 | | 4.24 | 34.7 | 84.2 |
| 118* | H | 2 | 200 | 24 | 0.1863 | 1,136,746 | 394,939 | 1,349,003 | | 3.42 | 19.8 | 100.0 |
| 119* | H | 2 | 200 | 26 | 0.2028 | 1,114,626 | 424,547 | 1,479,876 | | 3.49 | 17.8 | 100.2 |
| 120* | H | 2 | 200 | 21 | 0.1959 | 1,356,231 | 479,622 | 1,379,324 | | 2.88 | 17.7 | 102.8 |
| 121* | H | 1 | 75 | 164 | 0.0598 | 52,668 | 298,340 | 454,828 | | 1.52 | 22.3 | 82.4 |
| 122* | H | 1 | 75 | 176 | 0.0552 | 45,267 | 286,979 | 438,553 | | 1.53 | 23.3 | 82.1 |
| 123* | H | 1 | 75 | 154 | 0.0614 | 57,376 | 309,383 | 474,611 | | 1.53 | 22.9 | 85.2 |
| 124* | H | 1 | 200 | 154 | 0.1413 | 132,296 | 432,263 | 752,916 | | 1.74 | 12.2 | 105.0 |
| 125* | H | 1 | 200 | 135 | 0.1136 | 120,905 | 484,543 | 805,718 | | 1.66 | 9.7 | 107.2 |
| 126* | H | 1 | 200 | 164 | 0.1486 | 130,558 | 449,409 | 786,122 | | 1.75 | 11.8 | 103.9 |

*Indicates a comparative example

General reaction conditions: Total solvent volume including catalyst and activator diluents was 4.9 ml toluene; 0.1 ml 1-octene; 0.025 umol pre-catalyst and 500 equiv. Act 1 or 1.1 equiv. Act 2; 80° C. polymerization temperature; 75 psi of ethylene with uptake; Quench Value was set at 20 psid ethylene uptake when 75 psi of ethylene was used and for 15 psid ethylene uptake when 200 psi of ethylene was used, or for a maximum time of 30 minutes.

TABLE 3

Propylene polymerization examples

| EX# | Cat ID | Act ID | Cat (umol) | Iso-hexane (uL) | Toluene (uL) | T (° C.) | Quench value (psi) | quench time (s) | yield (g) | Activity (g P/mmol cat. hr) | Mn g/mol | Mw g/mol | Mz g/mol | PDI Mw/Mn | Tm (° C.) |
|---|---|---|---|---|---|---|---|---|---|---|---|---|---|---|---|
| 127 | A | 1 | 0.040 | 0 | 4099 | 70 | 8 | 193 | 0.1424 | 66,404 | 90,622 | 157,384 | 327,808 | 1.74 | 153.2 |
| 128 | A | 1 | 0.040 | 0 | 4099 | 70 | 8 | 188 | 0.1382 | 66,160 | 71,742 | 144,543 | 331,945 | 2.01 | 150.7 |
| 129 | A | 1 | 0.040 | 0 | 4099 | 70 | 8 | 209 | 0.1433 | 61,708 | 101,267 | 177,832 | 396,057 | 1.76 | 153.0 |
| 130 | A | 1 | 0.040 | 0 | 4099 | 100 | 8 | 112 | 0.1325 | 106,473 | 26,121 | 45,944 | 97,425 | 1.76 | 147.4 |
| 131 | A | 1 | 0.040 | 0 | 4099 | 100 | 8 | 108 | 0.1353 | 112,750 | 26,040 | 45,101 | 90,011 | 1.73 | 147.9 |
| 132 | A | 1 | 0.040 | 0 | 4099 | 100 | 8 | 111 | 0.1196 | 96,973 | 27,015 | 46,403 | 95,055 | 1.72 | 148.8 |
| 133 | B | 1 | 0.040 | 0 | 4099 | 70 | 8 | 148 | 0.2550 | 155,068 | 158,739 | 349,325 | 897,025 | 2.20 | 157.3 |
| 134 | B | 1 | 0.040 | 0 | 4099 | 70 | 8 | 151 | 0.2624 | 156,397 | 205,147 | 369,441 | 855,273 | 1.80 | 156.4 |
| 135 | B | 1 | 0.040 | 0 | 4099 | 70 | 8 | 150 | 0.1988 | 119,280 | 183,270 | 390,196 | 983,905 | 2.13 | 157.9 |
| 136 | B | 1 | 0.040 | 0 | 4099 | 100 | 8 | 117 | 0.1205 | 92,692 | 63,244 | 109,710 | 214,672 | 1.73 | 154.4 |
| 137 | B | 1 | 0.040 | 0 | 4099 | 100 | 8 | 114 | 0.1306 | 103,105 | 58,833 | 100,574 | 203,251 | 1.71 | 154.3 |

TABLE 3-continued

Propylene polymerization examples

| EX# | Cat ID | Act ID | Cat (umol) | Iso-hexane (uL) | Toluene (uL) | T (° C.) | Quench value (psi) | quench time (s) | yield (g) | Activity (g P/mmol cat. hr) | Mn g/mol | Mw g/mol | Mz g/mol | PDI Mw/Mn | Tm (° C.) |
|---|---|---|---|---|---|---|---|---|---|---|---|---|---|---|---|
| 138 | B | 1 | 0.040 | 0 | 4099 | 100 | 8 | 121 | 0.1258 | 93,570 | 50,081 | 96,143 | 197,867 | 1.92 | 153.4 |
| 139 | G | 1 | 0.040 | 0 | 4099 | 70 | 8 | 509 | 0.0837 | 14,800 | 34,890 | 69,133 | 165,122 | 1.98 | 137.7 |
| 140 | G | 1 | 0.040 | 0 | 4099 | 70 | 8 | 475 | 0.0786 | 14,893 | 43,995 | 71,591 | 135,496 | 1.63 | 137.9 |
| 141 | G | 1 | 0.040 | 0 | 4099 | 70 | 8 | 562 | 0.0878 | 14,060 | 43,605 | 71,688 | 147,678 | 1.64 | 137.7 |
| 142 | G | 1 | 0.040 | 0 | 4099 | 100 | 8 | 271 | 0.0639 | 21,221 | 9,505 | 17,994 | 38,074 | 1.89 | 131.1 |
| 143 | G | 1 | 0.040 | 0 | 4099 | 100 | 8 | 271 | 0.0631 | 20,956 | 9,905 | 18,356 | 39,776 | 1.85 | 131.0 |
| 144 | G | 1 | 0.040 | 0 | 4099 | 100 | 8 | 45 | 0.0018 | 3,600 | | | | | |
| 145* | I | 1 | 0.040 | 3841 | 258 | 70 | 20 | 109 | 0.2222 | 184,313 | 52,101 | 89,804 | | 1.72 | 151.0 |
| 146* | I | 1 | 0.040 | 3841 | 258 | 70 | 20 | 120 | 0.3208 | 240,600 | 51,152 | 90,217 | | 1.76 | 151.2 |
| 147* | I | 1 | 0.040 | 3841 | 258 | 70 | 20 | 113 | 0.3072 | 244,240 | 55,793 | 95,130 | | 1.71 | 151.5 |
| 148* | I | 1 | 0.040 | 3841 | 258 | 100 | 20 | 91 | 0.2633 | 261,268 | 18,656 | 33,646 | | 1.80 | 143.6 |
| 149* | I | 1 | 0.040 | 3841 | 258 | 100 | 20 | 89 | 0.2390 | 242,503 | 17,895 | 32,404 | | 1.81 | 143.5 |
| 150* | I | 1 | 0.040 | 3841 | 258 | 100 | 20 | 93 | 0.2382 | 229,775 | 18,236 | 32,576 | | 1.79 | 143.6 |
| 151* | J | 1 | 0.040 | 3841 | 258 | 70 | 20 | 1534 | 0.1743 | 10,229 | 140,365 | 238,564 | | 1.70 | 155.8 |
| 152* | J | 1 | 0.040 | 3841 | 258 | 70 | 20 | 1371 | 0.1788 | 11,739 | 130,479 | 219,647 | | 1.68 | 157.1 |
| 153* | J | 1 | 0.040 | 3841 | 258 | 70 | 20 | 1671 | 0.1787 | 9,624 | 139,454 | 232,168 | | 1.66 | 156.4 |
| 154* | J | 1 | 0.040 | 3841 | 258 | 100 | 20 | 794 | 0.1452 | 16,461 | 33,798 | 54,318 | | 1.61 | 148.8 |
| 155* | J | 1 | 0.040 | 3841 | 258 | 100 | 20 | 820 | 0.1508 | 16,543 | 31,327 | 50,410 | | 1.61 | 149.1 |
| 156* | J | 1 | 0.040 | 3841 | 258 | 100 | 20 | 1007 | 0.1400 | 12,519 | 30,639 | 49,987 | | 1.63 | 148.1 |
| 157* | K | 1 | 0.040 | 0 | 4099 | 70 | 15 | 586 | 0.1320 | 20,266 | 117,061 | 193,977 | | 1.66 | 156.4 |
| 158* | K | 1 | 0.040 | 0 | 4099 | 70 | 15 | 649 | 0.1319 | 18,302 | 121,768 | 202,573 | | 1.66 | 156.4 |
| 159* | K | 1 | 0.040 | 0 | 4099 | 70 | 15 | 535 | 0.1281 | 21,541 | 124,933 | 207,468 | | 1.66 | 156.9 |
| 160* | K | 1 | 0.040 | 0 | 4099 | 100 | 15 | 530 | 0.1052 | 17,854 | 29,729 | 48,263 | | 1.62 | 148.6 |
| 161* | K | 1 | 0.040 | 0 | 4099 | 100 | 15 | 747 | 0.1079 | 13,005 | 30,558 | 49,866 | | 1.63 | 148.8 |
| 162* | K | 1 | 0.040 | 0 | 4099 | 100 | 15 | 743 | 0.0989 | 11,988 | 28,482 | 45,997 | | 1.61 | 148.6 |
| 163 | C | 1 | 0.040 | 0 | 4099 | 70 | 8 | 624 | 0.0818 | 11,798 | 286,999 | 526,491 | 1,034,238 | 1.83 | — |
| 164 | C | 1 | 0.040 | 0 | 4099 | 70 | 8 | 624 | 0.0843 | 12,159 | 317,131 | 544,248 | 1,035,077 | 1.72 | — |
| 165 | C | 1 | 0.040 | 0 | 4099 | 70 | 8 | 593 | 0.0802 | 12,172 | 347,245 | 586,103 | 1,198,694 | 1.69 | — |
| 166 | C | 1 | 0.040 | 0 | 4099 | 100 | 8 | 1800 | 0.0520 | 2,600 | 96,916 | 165,574 | 347,343 | 1.71 | — |
| 167 | C | 1 | 0.040 | 0 | 4099 | 100 | 8 | 1647 | 0.0540 | 2,951 | 99,908 | 159,314 | 300,267 | 1.59 | — |
| 168 | C | 1 | 0.040 | 0 | 4099 | 100 | 8 | 29 | 0.0017 | 5,276 | | | | | |
| 169 | D | 1 | 0.040 | 0 | 4099 | 70 | 8 | 839 | 0.0805 | 8,635 | 251,541 | 409,761 | 815,636 | 1.63 | — |
| 170 | D | 1 | 0.040 | 0 | 4099 | 70 | 8 | 751 | 0.0728 | 8,724 | 251,657 | 401,879 | 740,037 | 1.60 | — |
| 171 | D | 1 | 0.040 | 0 | 4099 | 70 | 8 | 792 | 0.0776 | 8,818 | 235,442 | 394,346 | 756,552 | 1.67 | — |
| 172 | D | 1 | 0.040 | 0 | 4099 | 100 | 8 | 1720 | 0.0548 | 2,867 | 86,407 | 139,097 | 260,086 | 1.61 | — |
| 173 | D | 1 | 0.040 | 0 | 4099 | 100 | 8 | 1593 | 0.0566 | 3,198 | 80,810 | 129,239 | 241,274 | 1.60 | — |
| 174 | D | 1 | 0.040 | 0 | 4099 | 100 | 8 | 1519 | 0.0562 | 3,330 | 83,300 | 138,210 | 268,135 | 1.66 | — |
| 175 | E | 1 | 0.040 | 0 | 4099 | 70 | 8 | 507 | 0.0856 | 15,195 | 307,579 | 563,575 | 1,160,079 | 1.83 | — |
| 176 | E | 1 | 0.040 | 0 | 4099 | 70 | 8 | 474 | 0.0866 | 16,443 | 321,145 | 594,582 | 1,468,920 | 1.85 | — |
| 177 | E | 1 | 0.040 | 0 | 4099 | 70 | 8 | 470 | 0.0873 | 16,717 | 362,875 | 601,162 | 1,185,694 | 1.66 | — |
| 178 | E | 1 | 0.040 | 0 | 4099 | 100 | 8 | 1123 | 0.0569 | 4,560 | 81,407 | 166,494 | 352,356 | 2.05 | — |
| 179 | E | 1 | 0.040 | 0 | 4099 | 100 | 8 | 1090 | 0.0602 | 4,971 | 83,601 | 159,717 | 329,873 | 1.91 | — |
| 180 | E | 1 | 0.040 | 0 | 4099 | 100 | 8 | 18 | 0.0018 | 9,000 | | | | | |
| 181 | F | 2 | 0.025 | 3895 | 205 | 70 | 8 | 100 | 0.1559 | 224,496 | 178,463 | 288,063 | 558,428 | 1.61 | — |
| 182 | F | 2 | 0.025 | 3895 | 205 | 70 | 8 | 102 | 0.1730 | 244,235 | 165,739 | 292,754 | 620,928 | 1.77 | — |
| 183 | F | 2 | 0.025 | 3895 | 205 | 70 | 8 | 88 | 0.1551 | 253,800 | 151,690 | 278,433 | 615,248 | 1.84 | — |
| 184 | F | 2 | 0.025 | 3895 | 205 | 100 | 8 | 296 | 0.0971 | 47,238 | 60,626 | 98,936 | 186,780 | 1.63 | — |
| 185 | F | 2 | 0.025 | 3895 | 205 | 100 | 8 | 265 | 0.1041 | 56,568 | 61,746 | 98,711 | 184,993 | 1.60 | — |
| 186 | F | 2 | 0.025 | 3895 | 205 | 100 | 8 | 240 | 0.0964 | 57,840 | 60,618 | 102,115 | 201,357 | 1.68 | — |
| 187 | F | 1 | 0.040 | 0 | 4099 | 70 | 8 | 473 | 0.0881 | 16,763 | 273,395 | 494,259 | 1,124,738 | 1.81 | — |
| 188 | F | 1 | 0.040 | 0 | 4099 | 70 | 8 | 489 | 0.0924 | 17,006 | 257,267 | 454,946 | 929,200 | 1.77 | — |
| 189 | F | 1 | 0.040 | 0 | 4099 | 70 | 8 | 402 | 0.0805 | 18,022 | 261,037 | 462,460 | 1,070,965 | 1.77 | — |
| 190 | F | 1 | 0.040 | 0 | 4099 | 100 | 8 | 934 | 0.0593 | 5,714 | 85,951 | 138,519 | 253,496 | 1.61 | — |
| 191 | F | 1 | 0.040 | 0 | 4099 | 100 | 8 | 795 | 0.0590 | 6,679 | 82,815 | 135,147 | 265,760 | 1.63 | — |
| 192 | F | 1 | 0.040 | 0 | 4099 | 100 | 8 | 798 | 0.0618 | 6,970 | 91,663 | 149,036 | 292,551 | 1.63 | — |
| 193* | H | 2 | 0.040 | 3810 | 290 | 70 | 8 | 52 | 0.2483 | 430,578 | 92,313 | 150,999 | | 1.64 | — |
| 194* | H | 2 | 0.040 | 3810 | 290 | 70 | 8 | 51 | 0.2248 | 395,930 | 94,929 | 155,552 | | 1.64 | — |
| 195* | H | 2 | 0.040 | 3810 | 290 | 70 | 8 | 52 | 0.2453 | 424,558 | 93,805 | 152,317 | | 1.62 | — |
| 196* | H | 2 | 0.040 | 3810 | 290 | 100 | 8 | 79 | 0.1248 | 142,719 | 41,631 | 63,994 | | 1.54 | — |
| 197* | H | 2 | 0.040 | 3810 | 290 | 100 | 8 | 97 | 0.1100 | 102,484 | 36,799 | 56,980 | | 1.55 | — |
| 198* | H | 2 | 0.040 | 3810 | 290 | 100 | 8 | 68 | 0.1397 | 185,716 | 42,511 | 65,536 | | 1.54 | — |
| 199* | H | 1 | 0.040 | 0 | 4099 | 70 | 8 | 644 | 0.0697 | 9,748 | 284,055 | 466,491 | | 1.64 | — |
| 200* | H | 1 | 0.040 | 0 | 4099 | 70 | 8 | 649 | 0.0654 | 9,071 | 268,758 | 438,021 | | 1.63 | — |
| 201* | H | 1 | 0.040 | 0 | 4099 | 70 | 8 | 561 | 0.0563 | 9,035 | 264,957 | 429,558 | | 1.62 | — |
| 202* | H | 1 | 0.040 | 0 | 4099 | 100 | 8 | 1802 | 0.0347 | 1,733 | 53,152 | 86,220 | | 1.62 | — |
| 203* | H | 1 | 0.040 | 0 | 4099 | 100 | 8 | 1598 | 0.0265 | 1,493 | 47,330 | 76,569 | | 1.62 | — |
| 204* | H | 1 | 0.040 | 0 | 4099 | 100 | 8 | 1801 | 0.0488 | 2,439 | 65,794 | 106,068 | | 1.61 | — |

*Indicates a comparative example; — indicates no Tm.

TABLE 4

$^{13}$C NMR data for select polypropylene examples

| EX#** | Cat ID | m | r | mmmm | mmmr | rmmr | mmrr | mmrm + rmrr | rmrm | rrrr | mrrr | mrrm | stereo defects/ 10000 monomer | 2,1-regio (ee) defects/ 10000 monomer | 1,3 regio defects/ 10000 monomer | ave. meso run length |
|---|---|---|---|---|---|---|---|---|---|---|---|---|---|---|---|---|
| 127 | A | 0.862 | 0.138 | 0.724 | 0.035 | 0.026 | 0.037 | 0.079 | 0.039 | 0.012 | 0.024 | 0.024 | 768.6 | 31.4 | 5.1 | 12 |
| 132 | A | 0.989 | 0.011 | 0.968 | 0.011 | 0.000 | 0.008 | 0.010 | 0.001 | 0.001 | 0.000 | 0.001 | 94.5 | 31.2 | 38.6 | 61 |
| 135 | B | 0.984 | 0.016 | 0.958 | 0.005 | 0.010 | 0.009 | 0.009 | 0.004 | 0.001 | 0.002 | 0.002 | 106.6 | 11.1 | 15.9 | 75 |
| 137 | B | 0.993 | 0.007 | 0.973 | 0.007 | 0.006 | 0.006 | 0.004 | 0.003 | 0.000 | 0.001 | 0.000 | 58.6 | 0.0 | 33.3 | 109 |
| 139-141 | G | 0.812 | 0.188 | 0.661 | 0.006 | 0.031 | 0.061 | 0.116 | 0.051 | 0.012 | 0.030 | 0.032 | 1115.2 | 78.1 | 12.3 | 8 |
| 157-159* | K | 0.979 | 0.021 | 0.953 | 0.021 | 0.002 | 0.007 | 0.000 | 0.000 | 0.002 | 0.000 | 0.016 | 35.8 | 10.4 | 12.7 | 170 |
| 160-162* | K | 0.934 | 0.066 | 0.879 | 0.026 | 0.015 | 0.018 | 0.005 | 0.007 | 0.004 | 0.001 | 0.047 | 146.4 | 0.0 | 29.0 | 57 |

**The following polymer samples were mixed for $^{13}$C NMR. analysis: 139, 140, and 141; 157*, 158*, and 159*; 160*, 161*, and 162*.

TABLE 5

Propylene polymerization examples and ethylene-propylene copolymerization examples
General reaction conditions: Total solvent volume including catalyst and activator diluents was 4.1 ml toluene; 1.0 ml propylene; pre-catalyst amount is indicated in the table and 1.1 equiv. Act 2 was used; TnOAl (0.5 umol) was used when Act 2 was used; 70° C. polymerization temperature; Indicated pressure of $C_2$ (if any was used), and was added prior to the catalyst injection - no additional $C_2$ was added; Quench was set for the psi loss as indicated in the table or for a maximum time of 30 minutes.

| EX# | Cat ID | Cat (umol) | Isohexane (uL) | Toluene (uL) | $C_2$ (psi) | Quench value (psi) | Actual quench time (s) | Yield (g) | Activity (g P/mmol cat. hr) | Mn g/mol | Mw g/mol | Mz g/mol | PDI Mw/Mn | $C_2$ (wt %) by 1H NMR |
|---|---|---|---|---|---|---|---|---|---|---|---|---|---|---|
| 205 | D | 0.040 | 3832 | 268 | 0 | 8 | 58 | 0.2460 | 381,724 | 134,975 | 239,850 | 548,525 | 1.78 | |
| 206 | D | 0.040 | 3832 | 268 | 0 | 8 | 63 | 0.2330 | 332,857 | 124,132 | 244,853 | 645,858 | 1.97 | |
| 207 | D | 0.025 | 3875 | 205 | 20 | 5 | 18 | 0.2860 | 2,288,000 | 93,091 | 258,905 | 857,708 | 2.78 | |
| 208 | D | 0.025 | 3875 | 205 | 20 | 5 | 29 | 0.2585 | 1,283,586 | 95,957 | 312,373 | 1,220,124 | 3.26 | |
| 209 | D | 0.025 | 3855 | 205 | 40 | 5 | 14 | 0.3070 | 3,157,714 | 78,984 | 278,854 | 1,124,384 | 3.53 | 14.4 |
| 210 | D | 0.025 | 3855 | 205 | 40 | 5 | 16 | 0.2684 | 2,415,600 | 63,210 | 279,124 | 1,424,425 | 4.42 | |
| 211 | D | 0.025 | 3835 | 205 | 60 | 5 | 5 | 0.2815 | 8,107,200 | 63,572 | 272,894 | 1,143,762 | 4.29 | 19.2 |
| 212 | D | 0.025 | 3835 | 205 | 60 | 5 | 7 | 0.3464 | 7,125,943 | 76,022 | 303,814 | 1,156,820 | 4.00 | |
| 213 | D | 0.025 | 3815 | 205 | 80 | 5 | 6 | 0.3258 | 7,819,200 | 71,882 | 343,191 | 1,439,578 | 4.77 | 21.9 |
| 214 | D | 0.025 | 3815 | 205 | 80 | 5 | 4 | 0.3400 | 12,240,000 | 45,503 | 271,680 | 1,019,336 | 5.97 | |
| 215 | D | 0.025 | 3795 | 205 | 100 | 5 | 4 | 0.3415 | 12,294,000 | 49,826 | 321,088 | 1,400,098 | 6.44 | 25.4 |
| 216 | D | 0.025 | 3795 | 205 | 100 | 5 | 5 | 0.3204 | 9,227,520 | 54,552 | 376,028 | 2,156,477 | 6.89 | |
| 217 | F | 0.040 | 3832 | 268 | 0 | 8 | 67 | 0.2469 | 331,657 | 126,629 | 261,633 | 701,631 | 2.07 | |
| 218 | F | 0.040 | 3832 | 268 | 0 | 8 | 70 | 0.2422 | 311,400 | 131,597 | 247,136 | 573,815 | 1.88 | |
| 219 | F | 0.025 | 3875 | 205 | 20 | 5 | 27 | 0.3171 | 1,691,200 | 87,233 | 266,504 | 1,056,085 | 3.06 | |
| 220 | F | 0.025 | 3875 | 205 | 20 | 5 | 24 | 0.2694 | 1,616,400 | 101,143 | 263,890 | 917,381 | 2.61 | |
| 221 | F | 0.025 | 3855 | 205 | 40 | 5 | 20 | 0.3348 | 2,410,560 | 76,448 | 274,475 | 1,196,067 | 3.59 | 13.6 |
| 222 | F | 0.025 | 3855 | 205 | 40 | 5 | 21 | 0.3388 | 2,323,200 | 72,036 | 268,864 | 1,089,529 | 3.73 | |
| 223 | F | 0.025 | 3835 | 205 | 60 | 5 | 13 | 0.3540 | 3,921,231 | 56,589 | 284,307 | 1,274,693 | 5.02 | 17.2 |
| 224 | F | 0.025 | 3835 | 205 | 60 | 5 | 12 | 0.3247 | 3,896,400 | 60,301 | 292,092 | 1,434,104 | 4.84 | |
| 225 | F | 0.025 | 3815 | 205 | 80 | 5 | 8 | 0.3211 | 5,779,800 | 53,683 | 322,944 | 1,440,335 | 6.02 | 21.7 |
| 226 | F | 0.025 | 3815 | 205 | 80 | 5 | 10 | 0.3837 | 5,525,280 | 60,207 | 299,804 | 1,204,026 | 4.98 | |
| 227 | F | 0.025 | 3795 | 205 | 100 | 5 | 4 | 0.3370 | 12,132,000 | 44,313 | 309,863 | 1,196,456 | 6.99 | 25.9 |
| 228 | F | 0.025 | 3795 | 205 | 100 | 5 | 4 | 0.3712 | 13,363,200 | 76,545 | 339,262 | 1,258,977 | 4.43 | |
| 229* | H | 0.030 | 3748 | 352 | 0 | 5 | 33 | 0.2220 | 807,273 | 103,398 | 208,140 | 515,506 | 2.01 | |
| 230* | H | 0.030 | 3748 | 352 | 0 | 5 | 29 | 0.1530 | 633,103 | 98,741 | 212,586 | 556,429 | 2.15 | |
| 231* | H | 0.018 | 3809 | 251 | 20 | 5 | 36 | 0.3220 | 1,788,889 | 105,259 | 255,616 | 802,186 | 2.43 | |
| 232* | H | 0.018 | 3809 | 251 | 20 | 5 | 36 | 0.3350 | 1,861,111 | 107,511 | 246,100 | 749,266 | 2.29 | |
| 233* | H | 0.018 | 3789 | 251 | 40 | 5 | 26 | 0.3950 | 3,038,462 | 74,452 | 249,098 | 1,048,056 | 3.35 | 16.3 |
| 234* | H | 0.018 | 3789 | 251 | 40 | 5 | 25 | 0.3880 | 3,104,000 | 71,988 | 245,602 | 919,405 | 3.41 | 16.0 |
| 235* | H | 0.018 | 3769 | 251 | 60 | 5 | 21 | 0.4050 | 3,857,143 | 82,813 | 264,063 | 1,042,256 | 3.19 | 18.8 |
| 236* | H | 0.018 | 3749 | 251 | 80 | 5 | 19 | 0.4280 | 4,505,263 | 65,265 | 276,217 | 1,236,435 | 4.23 | 21.5 |
| 237* | H | 0.018 | 3749 | 251 | 80 | 5 | 23 | 0.4360 | 3,791,304 | 64,167 | 255,570 | 1,004,640 | 3.98 | |

*Indicates a comparative example

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

The invention claimed is:

1. A transition metal compound represented by the Formula (1):

$$T_yLAMX_{n-2} \tag{1}$$

wherein:

M is a group 3-6 metal;

n is the oxidation state of M;

A is a substituted or unsubstituted polycyclic arenyl ligand bonded to M wherein the polycyclic ligand contains an indenyl fragment with two partially unsaturated rings annulated to the phenyl ring of the indenyl ligand fragment;

L is substituted or unsubstituted monocyclic or polycyclic arenyl ligand bonded to M, or a substituted or unsubstituted monocyclic or polycyclic heteroarenyl ligand bonded to M, or is represented by the formula: $JR'_{z-y}$ where J is a group 15 or 16 heteroatom bonded to M, R' is a substituted or unsubstituted hydrocarbyl substituent bonded to J, and z is 2 when J is a group 15 heteroatom and z is 1 when J is a group 16 heteroatom;

T is a bridging group;

y is 1 or 0, indicating the presence or absence of bridging group T;

each X is independently a univalent anionic ligand, or two Xs are joined and bound to the metal atom to form a metallocycle ring, or two Xs are joined to form a chelating ligand, a diene ligand, or an alkylidene ligand.

2. The transition metal compound of claim 1, wherein A is a substituted or unsubstituted hexahydro-cyclopenta[e]-as-indacenyl, octahydrobenzo[e]-as-indacenyl or octahydro-cyclopenta[l]phenanthrenyl ligand.

3. The transition metal compound of claim 1, wherein L is a substituted or unsubstituted cyclopentadienyl, indenyl, fluorenyl, cyclopenta[a]naphthalenyl (also called benz[e]indenyl), cyclopenta[b]naphthalenyl (also called benz[f]indenyl), tetrahydrocyclopenta[a]naphthalenyl, tetrahydrocyclopenta[b]naphthalenyl, tetrahydro-s-indacenyl, tetrahydro-as-indacenyl, hexahydrocyclopenta[e]-as-indacenyl, octahydrobenzo[e]-as-indacenyl or octahydro-cyclopenta[l]phenanthrenyl ligand.

4. The transition metal compound of claim 1, wherein L is substituted or unsubstituted hydrocarbyl amido or hydrocarbyl phosphido, oxo (—O—), or thio (—S—) when y is 1, or is a substituted or unsubstituted dihydrocarbyl amido or dihydrocarbyl phosphido, hydrocarbyloxy, or hydrocarbylthio when y is 0.

5. The transition metal compound of claim 1 wherein, L is the same as A.

6. The transition metal compound of claim 1, wherein M is a group 4 metal.

7. A transition metal compound represented by Formula (2a) or (2b):

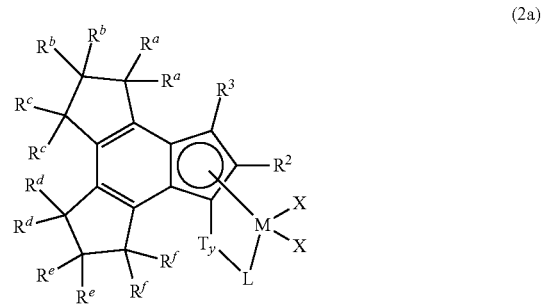

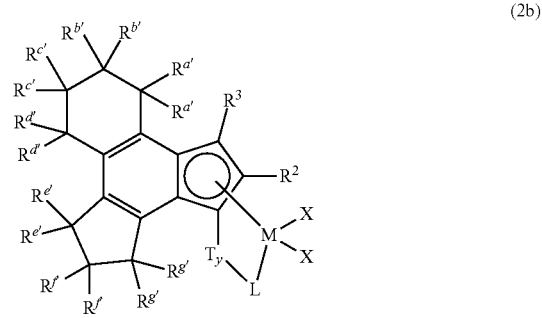

wherein M is a group 4 metal;

L is a substituted or unsubstituted monocyclic or polycyclic arenyl ligand bonded to M, or a substituted or unsubstituted monocyclic or polycyclic heteroarenyl ligand bonded to M, or is represented by the formula $JR'_{z-y}$ where J is a group 15 or 16 heteroatom bonded to M, R' is a substituted or unsubstituted hydrocarbyl substituent bonded to J, and z is 2 when J is a group 15 heteroatom and z is 1 when J is a group 16 heteroatom;

T is a bridging group;

y is 1 or 0, indicating the presence or absence of bridging group T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently $C_1$-$C_{10}$ alkyl, or hydrogen; and each X is independently a univalent anionic ligand, or two Xs are joined and bound to the metal atom to form a metallocycle ring, or two Xs are joined to form a chelating ligand, a diene ligand, or an alkylidene ligand.

8. The transition metal compound of claim 1, wherein, L is a substituted or unsubstituted cyclopentadienyl, indenyl, fluorenyl, cyclopenta[a]naphthalenyl (also called benz[e]indenyl), cyclopenta[b]naphthalenyl (also called benz[/]indenyl), tetrahydrocyclopenta[a]naphthalenyl, tetrahydrocyclopenta[h]naphthalenyl, tetrahydro-s-indacenyl, tetrahydro-as-indacenyl, hexahydro-cyclopenta[e]-as-indacenyl, octahydrobenzo[e]-as-indacenyl or octahydro-cyclopenta[l]phenanthrenyl ligand.

9. The transition metal compound of claim 1, L is a substituted or unsubstituted hydrocarbyl amido or hydrocarbyl phosphido, oxo (—O—), or thio (—S—) when y is I or is substituted or unsubstituted dihydrocarbyl amido or dihydrocarbyl phosphido, hydrocarbyloxy, or hydrocarbylthio when y is 0.

10. A transition metal compound represented by Formula (4a) or (4b):

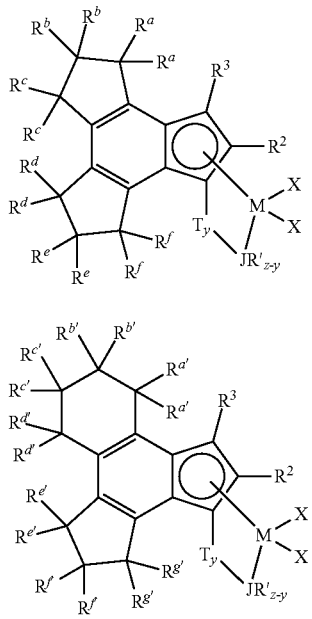

(4a)

(4b)

wherein M is a group 4 metal;

T is a bridging group; y is 1 or 0, indicating the presence or absence of T:

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently $C_1$-$C_{10}$ alkyl or hydrogen;

J is a group 15 or 16 heteroatom bonded to M;

R' is a substituted or unsubstituted hydrocarbyl substituent bonded to J, and z is 2 when J is a group 15 heteroatom and z is 1 when J is a group 16 heteroatom; and each X is independently a univalent anionic ligand, or two Xs are joined and bound to the metal atom to form a metallocycle ring, or two Xs are joined to form a chelating ligand, a diene ligand or an alkylidene ligand.

11. The transition metal compound of claim 1, wherein J is N, S, O or P.

12. The transition metal compound of claim 1, wherein R' is a $C_1$ to $C_{20}$ substituted or unsubstituted hydrocarbyl.

13. The transition metal compound of claim 6, wherein each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently is independently hydrogen, methyl, ethyl, propyl, butyl, pentyl, hexyl, heptyl, octyl, nonyl, decyl, or an isomer thereof.

14. The transition metal compound of claim 6, wherein M is Hf or Zr, T is a bridging group; y is 1, indicating the presence T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently hydrogen, methyl, ethyl, propyl, butyl, pentyl, hexyl, heptyl, octyl, nonyl, decyl, or an isomer thereof;

J is a N or P;

R' is a substituted or unsubstituted hydrocarbyl substituent bonded to J, and z is 2; and each X is, independently, selected from halides, aryls r $C_1$ to $C_{20}$ alkyl groups.

15. A transition metal compound represented by Formula (3a) or (3b):

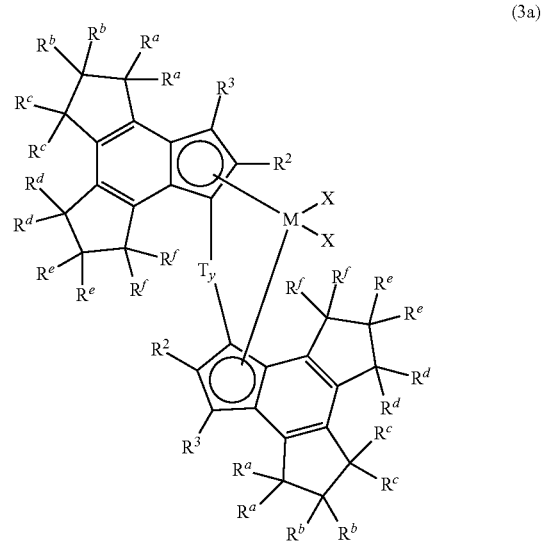

(3a)

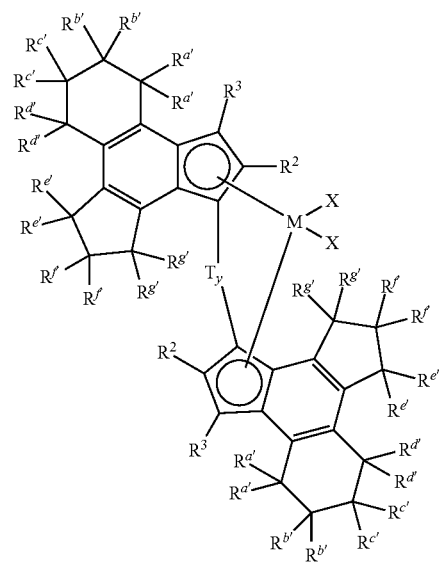

(3b)

wherein M is a group 4 metal;

T is a bridging group;

y is 1 or 0, indicating the presence or absence of T;

each $R^2$ and $R^3$ is independently hydrogen, or a $C_1$-$C_{50}$ substituted or unsubstituted hydrocarbyl, halocarbyl or silylcarbyl;

each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently $C_1$-$C_{10}$ alkyl or hydrogen; and each X is independently a univalent anionic ligand, or two Xs are joined and bound to the metal atom to form a metallocycle ring, or two Xs are joined to form a chelating ligand, a diene ligand or an alkylidene ligand.

16. The transition metal compound of claim 15, wherein each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently hydrogen, methyl, ethyl, propyl, butyl, pentyl, hexyl, heptyl, octyl, nonyl, decyl or an isomer thereof.

17. The transition metal compound of claim 15, wherein M is Hf or Zr;
T is a bridging group; y is 1, indicating the presence T;
each $R^2$ and $R^3$ is independently hydrogen, or a $C_1$-$C_{50}$ substituted or unsubstituted hydrocarbyl, halocarbyl or silylcarbyl; and
each $R^a$, $R^b$, $R^c$, $R^d$, $R^e$, $R^f$, $R^{a'}$, $R^{b'}$, $R^{c'}$, $R^{d'}$, $R^{e'}$, $R^{f'}$ and $R^{g'}$ is independently hydrogen, methyl, ethyl, propyl, butyl, pentyl, hexyl, heptyl, octyl, nonyl, decyl or an isomer thereof.

18. The transition metal compound of claim 6, wherein $R^2$ and $R^3$ are independently linear, branched, or cyclic $C_1$ to $C_{20}$ alkyl.

19. The transition metal compound of claim 6, wherein $R^a$, $R^b$, $R^c$, $R^d$, $R^e$, and $R^f$, are independently hydrogen, methyl, ethyl, propyl, butyl, pentyl, hexyl, heptyl, octyl, nonyl, decyl or an isomer thereof.

20. The transition metal compound of claim 6, wherein $R^{a'}$, $R^{b'}$, $R^{c'}$, $R^{d'}$, $R^{e'}$, $R^{f'}$ and $R^{g'}$ are independently hydrogen, methyl, ethyl, propyl, butyl, pentyl, hexyl, heptyl, octyl, nonyl, decyl or an isomer thereof.

21. The transition metal compound of claim 1, wherein each X is independently selected from the group consisting of substituted or unsubstituted hydrocarbyl radical, hydride, amide, alkoxide, sulfide, phosphide, halide, amine, phosphine and ether.

22. The transition metal compound of claim 1, wherein M is Hf, Ti or Zr.

23. The transition metal compound of claim 1, wherein T is selected from $(CR^8R^9)_x$, $(SiR^8R^9)_x$, $CR^8R^9SiR^8R^9$, $GeR^{10}R^{11}$, $P(=S)R^{12}$, $P(=Se)R^{12}$, $P(=O)R^{12}$, $R^*C=CR^*$, $R^*C=CR^*CR^*_2$, $R^*_2CCR^*=CR^*CR^*_2$, $R^*C=CR^*CR^*=CR^*$, $R^*C=CR^*CR^*_2CR^*_2$, $R^*_2CSiR^*_2$, $R^*_2SiOSiR^*_2$, $R^*_2CSiR^*_2CR^*_2$, $R^*_2SiCR^*_2SiR^*_2$, $R^*C=CR^*SiR^*_2$, $R^*_2CGeR^*_2$, $R^*_2GeGeR^*_2$, $R^*_2SiGeR^*_2$, $R^*C=CR^*GeR^*_2$, $R^*_2CGeR^*_2CR^*_2$, $R^*_2GeCR^*_2GeR^*_2$, $R^*_2C-BR^*$, $R^*_2C-BR^*$ $CR^*_2$, $R^*_2C-O-CR^*_2$, $R^*_2CR^*_2C-O-CR^*_2CR^*_2$, $R^*_2C-O-CR^*_2CR^*_2$, $R^*_2C-O-CR^*=CR^*$, $R^*_2C-S-CR^*_2$, $R^*_2CR^*_2C-S-CR^*_2CR^*_2$, $R^*_2C-S-CR^*_2CR^*_2$, $R^*_2C-S-CR^*=CR^*$, $R^*_2C-Se-CR^*_2$, $R^*_2CR^*_2C-Se-CR^*_2CR^*_2$, $R^*_2C-Se-CR^*_2CR^*_2$, $R^*_2C-Se-CR^*=CR^*$, $R^*C-N=CR^*$, $R^*C-NR^*CR^*_2$, $R^*C-NR^*CR^*CR^*_2$, $R^*_2C-NR^*-CR^*=CR^*$, $R^*_2CR^*C-NR^*-CRCR^*_2$, $R^*C-P=CR^*$, $R^*C-PR^*-CR^*_2$, O, S, Se, Te, $BR^{12}$, $NR^{12}$, $PR^{12}$, $ABR^{12}$, $SbR^{12}$, O-O, S-S, $R^{12}N-NR^{12}$, $R^{12}P-PR^{12}$, O-S, O-$NR^{12}$, O-$PR^{12}$, S-$NR^{12}$, S-$PR^{12}$, and $R^{12}N-PR^{12}$ where x is 1, 2, 3 or 4; each $R^8$, $R^9$ and $R^*$ are independently selected from hydrogen, substituted or unsubstituted hydrocarbyl, halocarbyl, and silylcarbyl; each $R^{10}$, $R^{11}$, and $R^{12}$ are independently selected from substituted or unsubstituted hydrocarbyl, halocarbyl, and silylcarbyl; and any two or more adjacent $R^8$, $R^9$, $R^{10}$, $R^{11}$ or $R^*$ may optionally be bonded together to form a substituted or unsubstituted, saturated, partially unsaturated or aromatic, cyclic or polycyclic ring structure.

24. The transition metal compound of claim 1, wherein y is 1.

25. A transition metal compound represented by one or more of the following formulas:

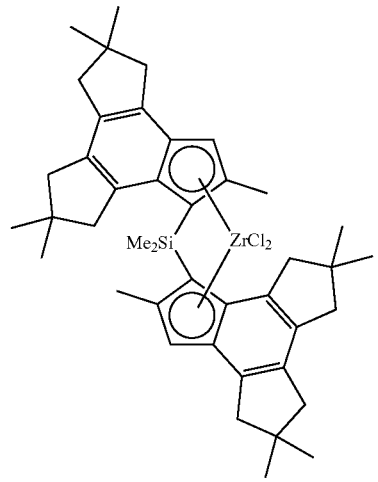

Complex A

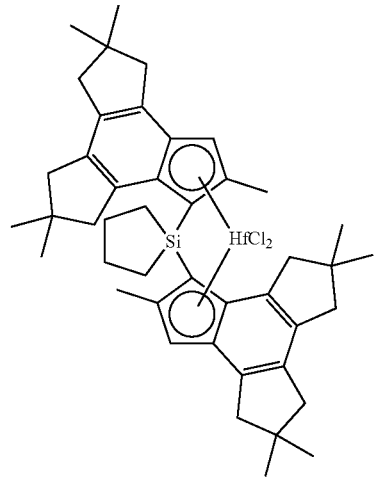

Complex B

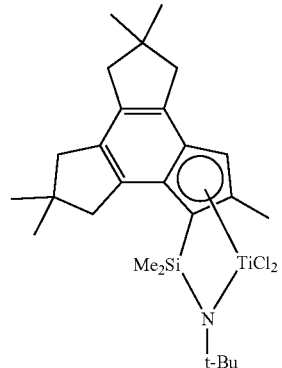

Complex C

Complex D
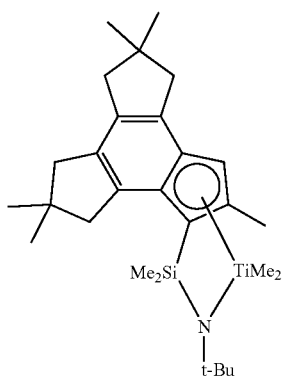
Complex E
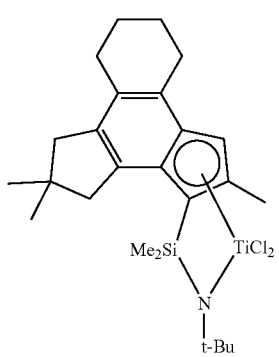
Complex F
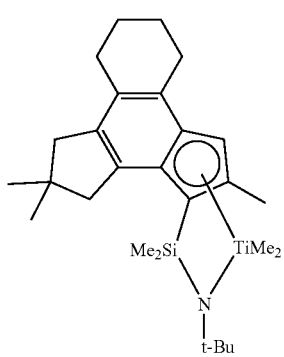
Complex G
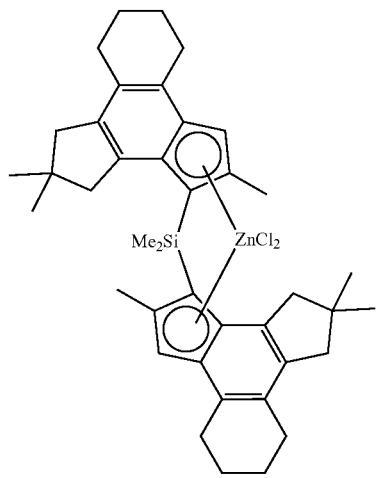
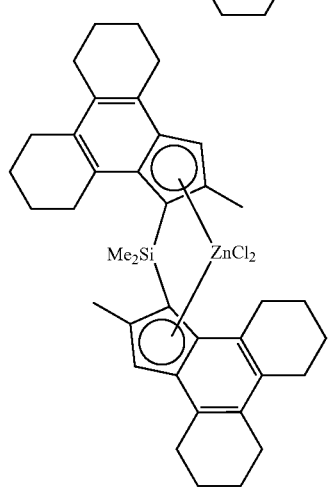
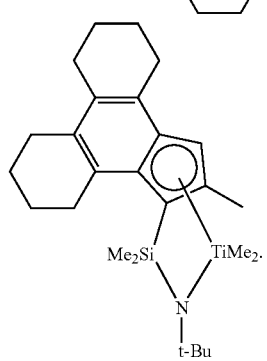
26. A process to polymerize olefins comprising:
  contacting one or more olefins with a catalyst system, the catalyst system including the transition metal compound of claim 25 and an activator; and
  obtaining a polymer.
* * * * *